(12) United States Patent
Yamagishi

(10) Patent No.: US 10,397,654 B2
(45) Date of Patent: *Aug. 27, 2019

(54) TRANSMISSION AND RECEPTION APPARATUSES, METHODS, AND SYSTEMS FOR FILTERING CONTENT

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,352

(22) Filed: Sep. 12, 2017

(65) Prior Publication Data
US 2018/0098121 A1 Apr. 5, 2018

Related U.S. Application Data

(63) Continuation of application No. 14/926,323, filed on Oct. 29, 2015, now Pat. No. 9,769,526, which is a
(Continued)

(51) Int. Cl.
*H04N 7/10* (2006.01)
*H04N 7/025* (2006.01)
(Continued)

(52) U.S. Cl.
CPC ......... *H04N 21/458* (2013.01); *H04H 60/33* (2013.01); *H04L 67/42* (2013.01); *H04N 21/235* (2013.01);
(Continued)

(58) Field of Classification Search
CPC ............. H04N 21/458; H04N 21/235; H04N 21/23614; H04N 21/2668; H04N 21/4532;
(Continued)

(56) References Cited

U.S. PATENT DOCUMENTS 5,915,243 A 6/1999 Smolen
7,984,468 B2 * 7/2011 Westberg ........... H04N 5/44543
725/45
(Continued)

FOREIGN PATENT DOCUMENTS

EP 0963119 B1 10/2006
JP 2002-175326 A 6/2002
(Continued)

OTHER PUBLICATIONS

Office Action dated Sep. 10, 2015 in Japanese Patent Application No. 2012-530643.
(Continued)

*Primary Examiner* — Mulugeta Mengesha
(74) *Attorney, Agent, or Firm* — Oblon, McClelland, Maier & Neustadt, L.L.P.

(57) ABSTRACT

Disclosed herein is a transmission apparatus for distributing a content to a client, including: a question generation section configured to generate question information representative of a question regarding liking of a user of the client; and a transmission section configured to transmit the question information and provider side answer information in the form of a bit string representative of an answer set by a provider which provides the content to the question regarding the liking of the user to the client.

12 Claims, 68 Drawing Sheets

Related U.S. Application Data continuation of application No. 14/493,661, filed on Sep. 23, 2014, now Pat. No. 9,215,295, which is a continuation of application No. 13/071,238, filed on Mar. 24, 2011, now Pat. No. 8,875,169.

(60) Provisional application No. 61/377,808, filed on Aug. 27, 2010.

(51) Int. Cl.

| | | |
|---|---|---|
| *H04N 21/458* | (2011.01) | |
| *H04N 21/475* | (2011.01) | |
| *H04H 60/33* | (2008.01) | |
| *H04N 21/236* | (2011.01) | |
| *H04N 21/2668* | (2011.01) | |
| *H04N 21/45* | (2011.01) | |
| *H04N 21/454* | (2011.01) | |
| *H04N 21/235* | (2011.01) | |
| *H04L 29/06* | (2006.01) | |
| *H04H 60/65* | (2008.01) | |
| *H04N 21/8543* | (2011.01) | |
| *H04H 60/73* | (2008.01) | |

(52) U.S. Cl.
CPC ... *H04N 21/23614* (2013.01); *H04N 21/2668* (2013.01); *H04N 21/454* (2013.01); *H04N 21/4532* (2013.01); *H04N 21/4755* (2013.01); *H04N 21/4758* (2013.01); *H04H 60/65* (2013.01); *H04H 60/73* (2013.01); *H04N 21/8543* (2013.01)

(58) Field of Classification Search
CPC ............. H04N 21/454; H04N 21/4755; H04N 21/4758; H04N 21/8543; H04H 60/33; H04H 60/65; H04H 60/73; H04L 67/42
See application file for complete search history.

(56) References Cited

U.S. PATENT DOCUMENTS

| | | |
|---|---|---|
| 8,595,783 B2 | 11/2013 | Dewa |
| 8,705,933 B2 | 4/2014 | Eyer |
| 8,839,338 B2 | 9/2014 | Eyer |
| 8,842,974 B2 | 9/2014 | Kitazato |
| 8,863,171 B2 | 10/2014 | Blanchard et al. |
| 8,872,888 B2 | 10/2014 | Kitazato |
| 8,875,169 B2 | 10/2014 | Yamagishi |
| 8,875,204 B2 | 10/2014 | Kitazato |
| 8,884,800 B1 | 11/2014 | Fay |
| 8,886,009 B2 | 11/2014 | Eyer |
| 8,892,636 B2 | 11/2014 | Yamagishi |
| 8,893,210 B2 | 11/2014 | Eyer |
| 8,896,755 B2 | 11/2014 | Kitazato et al. |
| 8,898,720 B2 | 11/2014 | Eyer |
| 8,898,723 B2 | 11/2014 | Eyer |
| 8,904,417 B2 | 12/2014 | Kitahara et al. |
| 8,908,103 B2 | 12/2014 | Kitazato |
| 8,909,694 B2 | 12/2014 | Yamagishi et al. |
| 8,914,832 B2 | 12/2014 | Yamagishi |
| 8,918,801 B2 | 12/2014 | Kitazato et al. |
| 8,918,828 B2 | 12/2014 | Eyer et al. |
| 8,918,928 B2 | 12/2014 | Eyer |
| 8,925,016 B2 | 12/2014 | Eyer |
| 8,930,988 B2 | 1/2015 | Kitazato et al. |
| 8,938,756 B2 | 1/2015 | Kitazato |
| 8,941,779 B2 | 1/2015 | Eyer |
| 8,966,564 B2 | 2/2015 | Kitazato |
| 8,988,612 B2 | 3/2015 | Kitazato |
| 9,015,785 B2 | 4/2015 | Yamagishi |
| 9,038,095 B2 | 5/2015 | Fay et al. |
| 9,043,857 B2 | 5/2015 | Dewa |
| 9,078,031 B2 | 7/2015 | Kitazato et al. |
| 9,137,566 B2 | 9/2015 | Fay |
| 9,148,676 B2 | 9/2015 | Fay et al. |
| 9,154,840 B2 | 10/2015 | Kitazato et al. |
| 2002/0124253 A1 | 9/2002 | Eyer et al. |
| 2003/0004884 A1 | 1/2003 | Kitazato |
| 2003/0144899 A1* | 7/2003 | Kokubo ............ G06Q 30/02 705/7.32 |
| 2003/0189668 A1 | 10/2003 | Newnam et al. |
| 2004/0172650 A1 | 9/2004 | Hawkins et al. |
| 2005/0141870 A1 | 6/2005 | Suzuki |
| 2005/0278741 A1 | 12/2005 | Robarts et al. |
| 2007/0016935 A1 | 1/2007 | Brookfield |
| 2007/0124755 A1 | 5/2007 | Shintani |
| 2008/0090513 A1 | 4/2008 | Collins et al. |
| 2009/0018915 A1 | 1/2009 | Fisse |
| 2009/0070319 A1 | 3/2009 | Hronopoulos |
| 2009/0189668 A1 | 7/2009 | Morino |
| 2011/0088075 A1 | 4/2011 | Eyer |
| 2011/0202946 A1* | 8/2011 | Block .............. H04L 65/4092 725/13 |
| 2011/0231868 A1 | 9/2011 | Martens |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Kitazato et al. |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |
| 2013/0198768 A1 | 8/2013 | Kitazato |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0215327 A1 | 8/2013 | Kitazato et al. |
| 2013/0250173 A1 | 9/2013 | Eyer |
| 2013/0254824 A1 | 9/2013 | Eyer |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Eyer |
| 2013/0291049 A1 | 10/2013 | Kitazato |
| 2013/0340007 A1 | 12/2013 | Eyer |
| 2014/0013347 A1 | 1/2014 | Yamagishi |
| 2014/0013379 A1 | 1/2014 | Kitazato et al. |
| 2014/0020038 A1 | 1/2014 | Dewa |
| 2014/0020042 A1 | 1/2014 | Eyer |
| 2014/0040965 A1 | 2/2014 | Kitazato et al. |

(56) References Cited

U.S. PATENT DOCUMENTS

| | | |
|---|---|---|
| 2014/0040968 A1 | 2/2014 | Kitazato et al. |
| 2014/0043540 A1 | 2/2014 | Kitazato et al. |
| 2014/0053174 A1 | 2/2014 | Eyer et al. |
| 2014/0067922 A1 | 3/2014 | Yamagishi et al. |
| 2014/0099078 A1 | 4/2014 | Kitahara et al. |
| 2014/0122528 A1 | 5/2014 | Yamagishi |
| 2014/0137153 A1 | 5/2014 | Fay et al. |
| 2014/0137165 A1 | 5/2014 | Yamagishi |
| 2014/0150040 A1 | 5/2014 | Kitahara et al. |
| 2014/0157304 A1 | 6/2014 | Fay et al. |
| 2014/0173661 A1 | 6/2014 | Yamagishi |
| 2014/0186008 A1 | 7/2014 | Eyer |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Eyer et al. |
| 2014/0327825 A1 | 11/2014 | Eyer |
| 2014/0348488 A1 | 11/2014 | Eyer |
| 2014/0351877 A1 | 11/2014 | Eyer |
| 2014/0354890 A1 | 12/2014 | Eyer |
| 2015/0007215 A1 | 1/2015 | Fay et al. |
| 2015/0007219 A1 | 1/2015 | Blanchard et al. |
| 2015/0012588 A1 | 1/2015 | Yamagishi |
| 2015/0012955 A1 | 1/2015 | Kitazato |
| 2015/0020146 A1 | 1/2015 | Eyer |
| 2015/0026730 A1 | 1/2015 | Eyer |
| 2015/0026739 A1 | 1/2015 | Kitazato |
| 2015/0033280 A1 | 1/2015 | Fay |
| 2015/0038100 A1 | 2/2015 | Fay |
| 2015/0046937 A1 | 2/2015 | Kitazato et al. |
| 2015/0046942 A1 | 2/2015 | Eyer |
| 2015/0058410 A1 | 2/2015 | Yamagishi |
| 2015/0058875 A1 | 2/2015 | Kitahara et al. |
| 2015/0058906 A1 | 2/2015 | Kitazato et al. |
| 2015/0058911 A1 | 2/2015 | Kitazato et al. |
| 2015/0062428 A1 | 3/2015 | Eyer |
| 2015/0067713 A1 | 3/2015 | Yamagishi |
| 2015/0074704 A1 | 3/2015 | Kitazato |
| 2015/0082367 A1 | 3/2015 | Kitazato et al. |
| 2015/0100997 A1 | 4/2015 | Kitazato |
| 2015/0163557 A1 | 6/2015 | Kitazato |
| 2015/0195605 A1 | 7/2015 | Eyer |
| 2015/0215673 A1 | 7/2015 | Yamagishi |
| 2015/0222941 A1 | 8/2015 | Fay et al. |
| 2015/0222963 A1 | 8/2015 | Dewa |
| 2015/0281781 A1 | 10/2015 | Kitazato et al. |

FOREIGN PATENT DOCUMENTS

| | | |
|---|---|---|
| JP | 2003-9119 A | 1/2003 |
| JP | 2005-269678 A | 9/2005 |
| JP | 2009-178363 A | 8/2009 |
| JP | 2010-021988 A | 1/2010 |

OTHER PUBLICATIONS

International Search Report dated Sep. 27, 2011, in Patent Application No. PCT/JP2011/068678 (with English-language translation).

Extended European Search Report dated May 14, 2014, in European Patent Application No. 11819852.2.

\* cited by examiner

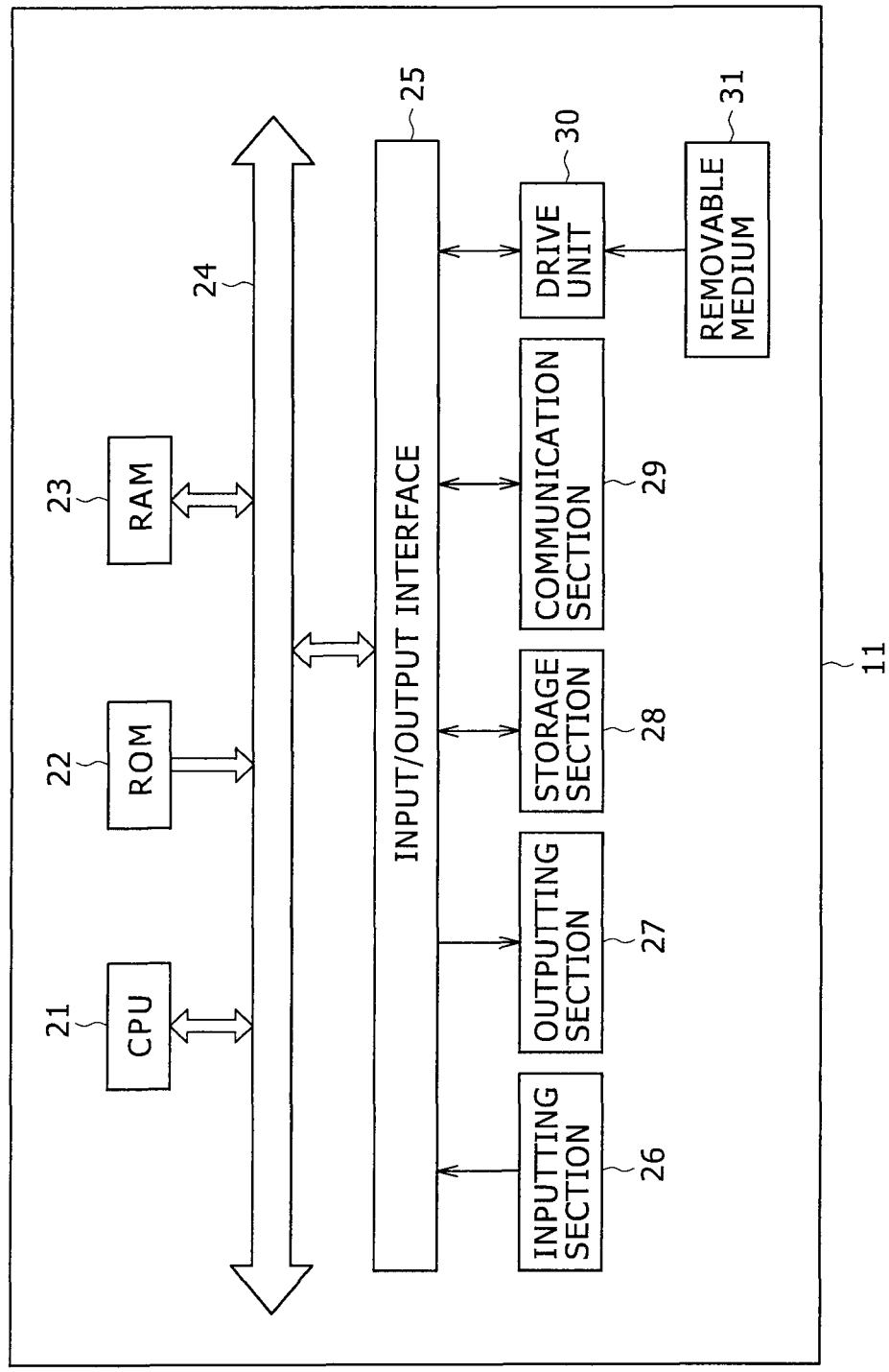
F I G . 2

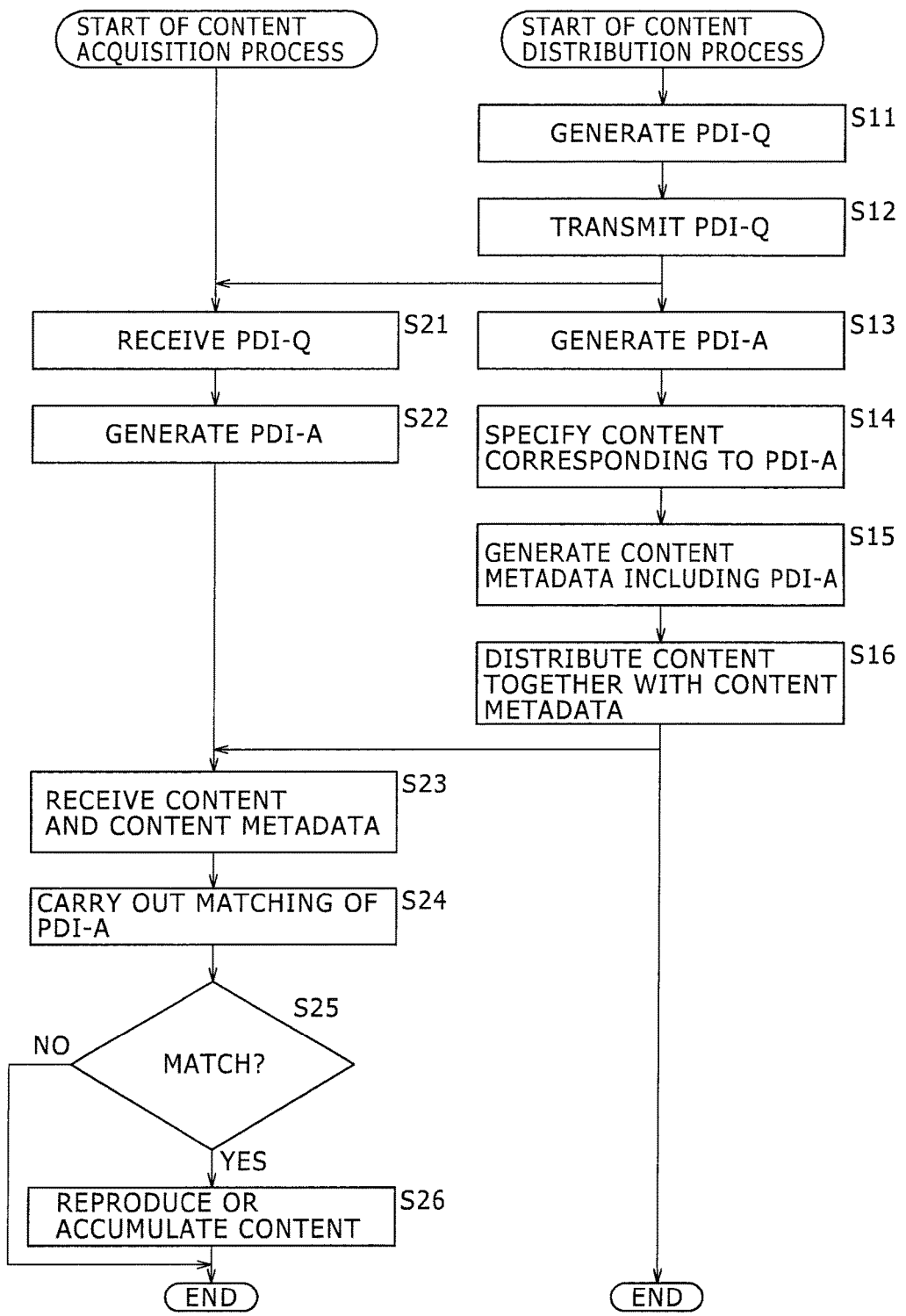

FIG. 6 A

```
1 : <xs:schema xmlns:xs="http://www.w3.org/2001/XMLSchema" elementFormDefault="qualified"
    attributeFormDefault="unqualified")
2 :      <xs:element name="PDItable" type="PDItableType"/>
3 :      <xs:complexType name="PDItableType">
4 :           <xs:choice maxOccurs="unbounded">
5 :                <xs:element name="QIA" type="IntegerAnswerType"/>
6 :                <xs:element name="QBA" type="BooleanAnswerType"/>
7 :                <xs:element name="QSA" type="SelectionAnswerType"/>
8 :                <xs:element name="QTA" type="TextAnswerType"/>
9 :                <xs:element name="QAA" type="AnyAnswerType"/>
10:           </xs:choice>
11:           <xs:attribute name="transactional" type="xs:boolean" use="optional"/>
12:      </xs:complexType>
13:      <xs:complexType name="IntegerAnswerType">
14:           <xs:sequence>
15:                <xs:element name="id" type="xs:anyURI"/>
16:                <xs:element name="q" type="xs:string" minOccurs="0"/>
17:                <xs:element name="a" type="xs:integer" minOccurs="0"/>
18:           </xs:sequence>
19:           <xs:attribute name="minInclusive" type="xs:integer" use="optional"/>
20:           <xs:attribute name="maxInclusive" type="xs:integer" use="optional"/>
21:      </xs:complexType>
22:      <xs:complexType name="BooleanAnswerType">
23:           <xs:sequence>
24:                <xs:element name="id" type="xs:anyURI"/>
25:                <xs:element name="q" type="xs:string" minOccurs="0"/>
26:                <xs:element name="a" type="xs:boolean" minOccurs="0"/>
27:           </xs:sequence>
28:      </xs:complexType>
29:      <xs:complexType name=""SelectionAnswerType">
30:           <xs:sequence>
31:                <xs:element name="id" type="xs:anyURI"/>
32:                <xs:element name="q" type="xs:string" minOccurs="0"/>
33:                <xs:element name="a" type="xs:string" minOccurs="0"
    maxOccurs="unbounded"/>
```

FIG. 6 B

```
34:                </xs:sequence>
35:                <xs:attribute name="minChoice" type="xs:integer" use="optional"/>
36:                <xs:attribute name="maxChoice" type="xs:integer" use="optional"/>
37:        </xs:complexType>
38:        <xs:complexType name="TextAnswerType">
39:                <xs:sequence>
40:                        <xs:element name="id" type="xs:anyURI"/>
41:                        <xs:element name="q" type="xs:string" minOccurs="0"/>
42:                        <xs:element name="a" type="xs:string" minOccurs="0"/>
43:                </xs:sequence>
44:        </xs:complexType>
45: </xs:schema>
```

FIG. 7

```
 1: <PDItable transactional="true" >
 2:   <QBA>
 3:     <id>Common:111</id>
 4:     <q>Are you currently employed?</q>
 5:   </QBA>
 6:   <QIA minInclusive="10" maxInclusive="100">
 7:     <id>Common:222</id>
 8:     <q>What is the age of the oldest member of the household who watches television?</q>
 9:   </QIA>
10:   <QSA minChoice="1" maxChoice="3">
11:     <id>ProviderA:123</id>
12:     <q>In which of the following sports are you most interested? (Multiple selection allowed)</q>
13:     <a>Baseball</a>
14:     <a>Basketball</a>
15:     <a>Soccer</a>
16:     <a>Hockey</a>
17:   </QSA>
18:   <QSA maxChoice="1">
19:     <id>ProviderA:ProgramX:123</id>
20:     <q>Do you enjoy camping and outdoor recreation?(Only one selection)</q>
21:     <a>Never</a>
22:     <a>Occasionally</a>
23:     <a>Frequently</a>
24:   </QSA>
25:   <QTA>
26:     <id>ProviderA:321</id>
27:     <q> Who's products are you most interested in recently? </q>
28:   </QTA>
29: </PDItable>
```

FIG. 8

QUESTION: Are you currently employed? — 61

Yes — 62-1

No — 62-2

CHOOSE ONE

F I G . 9

QUESTION: What is the age of the oldest member of the household who watches television? — 71

ENTER AGE — 72

FIG. 10

QUESTION: In which of the following sports are you most interested? (Multiple selection allowed) — 81

82-1 Baseball
82-2 Basketball
82-3 Soccer
82-4 Hockey

CHOOSE ONE TO THREE ANSWERS

FIG.11

QUESTION: Do you enjoy camping and outdoor recreation? (Only one selection) ~91

92-1 Never
92-2 Occasionally
92-3 Frequently

CHOOSE ONE

FIG.12

QUESTION: Who's products are you most interested in recently? — 101

WRITE ANYTHING — 102

FIG.13

```
 1: <PDItable >
 2:     <QBA>
 3:         <id>Common:111</id>
 4:         <a>true</a>
 5:     </QBA>
 6:     <QIA>
 7:         <id>Common:222</id>
 8:         <a>34</a>
 9:     </QIA>
10:     <QSA>
11:         <id>ProviderA:123</id>
12:         <a>Baseball</a>
13:         <a>Soccer</a>
14:         <a>Hockey</a>
15:     </QSA>
16:     <QSA>
17:         <id>ProviderA:ProgramX:123</id>
18:         <a>Occasionally</a>
19:     </QSA>
20:     <QTA>
21:         <id>ProviderA:321</id>
22:         <a>Sony</a>
23:     </QTA>
24: </PDItable>
```

FIG.14

```
1 : <PDItable>
2 :   <QBA>
3 :     <id>Common:111</id>
4 :     <a>false</a>
5 :   </QBA>
6 :   <QSA>
7 :     <id>ProviderA:123</id>
8 :     <a>Baseball</a>
9 :   </QSA>
10:   <QSA>
11:     <id>ProviderA:ProgramX:123</id>
12:     <a>Never</a>
13:   </QSA>
14: </PDItable>
```

FIG.15

```
 1 : <PDItable>
 2 :   <QSA>
 3 :     <id>ProviderA:123</id>
 4 :     <a>Basketball</a>
 5 :   </QSA>
 6 :   <QSA>
 7 :     <id>ProviderA:ProgramX:123</id>
 8 :     <a>Never</a>
 9 :   </QSA>
10 : </PDItable>
```

FIG. 23

Service
    id
    version
    validFrom
    validTo
    globalServiceID
    weight
    baseCID
    ServiceType
    Name
    Description
    AudioLanguage
        languageSDPTag
    TextLanguage
        languageSDPTag
    ParentalRating
        ratingSystem
        ratingValueName
    Genre
    Extesion
        url
        Description
    PreviewDataReference
        idRef
        usage
    PrivateExt
        PDI-A

FIG.24

```
Schedule
    id
    version
    defaultSchedule
    onDemand
    validFrom
    validTo
    ServiceReference
        idRef
    ContentReference
        idRef
        contentLocation
        PresentationWindow
            startTime
            endTime
    PrivateExt
        PDI-A
```

FIG.25

```
Content
    id
    version
    validFrom
    validTo
    globalContent ID
    baseCID
    ServiceReference
        idRef
        weight
    Name
    Description
    StartTime
    EndTime
    AudioLanguage
        languageSDPTag
    TextLanguage
        languageSDPTag
    Length
    ParentalRating
        ratingSystem
        ratingValueName
    Genre
    Extension
        url
        Description
    PrevewDataReference
        idRef
        usage
    PrivateExt
        PDI-A
```

FIG. 30

| Syntax | No. of bits | Format |
|---|---|---|
| PDI_descriptor() { | | |
| descriptor_tag | 8 | 0x(TBD) |
| descriptor_length | 8 | uimsbf |
| length | 8 | uimsbf |
| PDI_Q or PDI_A or PDI_A_Query | var | - |
| } | | |

FIG. 34 A

```
1 : <xs:schema xmlns:xs="http://www.w3.org/2001/XMLSchema" elementFormDefault="qualified"
    attributeFormDefault="unqualified")
2 :     <xs:element name="PDItable" type="PDItableType"/>
3:      <xs:complexType name="PDItableType">
4:          <xs:choice maxOccurs="unbounded">
5:              <xs:element name="QIA" type="IntegerAnswerType"/>
6:              <xs:element name="QBA" type="BooleanAnswerType"/>
7:              <xs:element name="QSA" type="SelectionAnswerType"/>
8:              <xs:element name="QTA" type="TextAnswerType"/>
9:              <xs:element name="QAA" type="AnyAnswerType"/>
10:         </xs:choice>
11:         <xs:attribute name="transactional" type="xs:boolean" use="optional"/>
12:     </xs:complexType>
13:     <xs:complexType name="IntegerAnswerType">
14:         <xs:sequence>
15:             <xs:element name="id" type="xs:anyURI"/>
16:             <xs:element name="q" type="xs:string" minOccurs="0"/>
17:             <xs:element name="a" type="xs:integer" minOccurs="0"/>
18:         </xs:sequence>
19:         <xs:attribute name="minInclusive" type="xs:integer" use="optional"/>
20:         <xs:attribute name="maxInclusive" type="xs:integer" use="optional"/>
21:     </xs:complexType>
22:     <xs:complexType name="BooleanAnswerType">
23:         <xs:sequence>
24:             <xs:element name="id" type="xs:anyURI"/>
25:             <xs:element name="q" type="xs:string" minOccurs="0"/>
26:             <xs:element name="a" type="xs:boolean" minOccurs="0"/>
27:         </xs:sequence>
28:     </xs:complexType>
29:     <xs:complexType name=""SelectionAnswerType">
30:         <xs:sequence>
31:             <xs:element name="id" type="xs:anyURI"/>
32:             <xs:element name="q" type="xs:string" minOccurs="0"/>
33:             <xs:element name="a" type="xs:string" minOccurs="0"
    maxOccurs="unbounded"/>
```

FIG. 34 B

```
34:              </xs:sequence>
35:              <xs:attribute name="minChoice" type="xs:integer" use="optional"/>
36:              <xs:attribute name="maxChoice" type="xs:integer" use="optional"/>
37:          </xs:complexType>
38:          <xs:complexType name="TextAnswerType">
39:              <xs:sequence>
40:                  <xs:element name="id" type="xs:anyURI"/>
41:                  <xs:element name="q" type="xs:string" minOccurs="0"/>
42:                  <xs:element name="a" type="xs:string" minOccurs="0"/>
43:              </xs:sequence>
44:          </xs:complexType>
45:          <xs:complexType name="AnyAnswerType")
46:              <xs:sequence>
47:                  <xs:element name="id" type="xs:anyURI"/>
48:                  <xs:element name="a" type="xs:base64Binary"/>
49:              </xs:sequence>
50:          </xs:complex Type>
51: </xs:schema>
```

REFERENCE THE RECENT VIEWING LOG AND,
IF YOU WANT TO AUTOMATICALLY GENERATE AN ANSWER TO THE QUERY BELOW:
In which of the following sports are you most interested? (Multiple selection allowed)
CLICK THIS BUTTON.

IF YOU WANT TO SPECIFY THE ANSWER BY YOURSELF, CHOOSE ONE TO THREE ANSWERS BELOW:

| Baseball | 342-1 |
| basketball | 342-2 |
| Soccer | 342-3 |
| Hockey | 342-4 |

FIG. 37

REFERENCE THE RECENT BEHAVIOR LOG AND,
IF YOU WANT TO AUTOMATICALLY GENERATE AN ANSWER TO THE QUERY BELOW:
Do you enjoy camping and outdoor recreation? (Only one selection)
CLICK THIS BUTTON.

IF YOU WANT TO SPECIFY THE ANSWER BY YOURSELF, CHOOSE ONE BELOW:

- Never
- Occasionally
- Frequently

FIG. 40

THE FOLLOWING THREE CANDIDATES ARE POSSIBLE AS A RESULT OF CHOOSING BY ANALOGY OF VARIOUS LOG INFORMATION OF YOURS AS AN ANSWER TO THE QUERY:
In which of the following sports are you most interested? (Multiple selection allowed) CHOOSE ONE OR MORE.

- basketball
- Soccer
- Hockey

FIG. 41

```
 1 : <PDItable>
 2 :   <QSA>
 3 :     <id>ProviderA:123</id>
 4 :     <a>Baseball</a>
 5 :     <a>Soccer</a>
 6 :     <a>Hockey</a>
 7 :   </QSA>
 8 :   <QSA>
 9 :     <id>ProviderA:ProgramX:123</id>
10 :     <a>Occasionally</a>
11 :   </QSA>
12 :   <QTA>
13 :     <id>ProviderA:321</id>
14 :     <a>Somy</a>
15 :   </QTA>
16 :   <QAA>
17 :     <id>ProviderA:Special:999</id>
18 :     <a>jIKK3Q==</a>
19 :   </QAA>
20 : </PDItable>
```

FIG.42

```
 1: <PDItable xmlns:xsi="http://www.w3.org/2001/XMLSchema-instance" xsi:noNamespaceSchemaLocation="PDItable.xsd">
 2:     <QSA>
 3:         <id>ProviderA:123</id>
 4:         <a>Baseball</a>
 5:     </QSA>
 6:     <QSA>
 7:         <id>ProviderA:ProgramX:123</id>
 8:         <a>Never</a>
 9:     </QSA>
10: </PDItable>
```

FIG. 43

```
 1: <PDItable xmlns:xsi="http://www.w3.org/2001/XMLSchema-instance" xsi:noNamespaceSchemaLocation="PDItable.xsd">
 2:     <QSA>
 3:         <id>ProviderA:123</id>
 4:         <a>Basketball</a>
 5:     </QSA>
 6:     <QSA>
 7:         <id>ProviderA:ProgramX:123</id>
 8:         <a>Never</a>
 9:     </QSA>
10: </PDItable>
```

FIG. 50

| Syntax | No. of bits | Format |
|---|---|---|
| PDI_descriptor() { | | |
| descriptor_tag | 8 | 0x(TBD) |
| descriptor_length | 8 | uimsbf |
| length | 8 | uimsbf |
| PDI_S or PDI_A or PDI_A_Query | var | - |
| } | | |

FIG. 54 A

```
1 : <xs:schema xmlns:xs="http://www.w3.org/2001/XMLSchema" elementFormDefault="qualified"
    attributeFormDefault="unqualified")
2 :      <xs:element name="PDItable" type="PDItableType"/>
3:       <xs:complexType name="PDItableType">
4:           <xs:choice maxOccurs="unbounded">
5:               <xs:element name="QIA" type="IntegerAnswerType"/>
6:               <xs:element name="QBA" type="BooleanAnswerType"/>
7:               <xs:element name="QSA" type="SelectionAnswerType"/>
8:               <xs:element name="QTA" type="TextAnswerType"/>
9:               <xs:element name="QAA" type="AnyAnswerType"/>
10:          </xs:choice>
11:          <xs:attribute name="transactional" type="xs:boolean" use="optional"/>
12:      </xs:complexType>
13:      <xs:complexType name="IntegerAnswerType">
14:          <xs:sequence>
15:              <xs:element name="id" type="xs:anyURI"/>
16:              <xs:element name="q" type="xs:string" minOccurs="0"/>
17:              <xs:element name="a" type="xs:integer" minOccurs="0"/>
18:          </xs:sequence>
19:          <xs:attribute name="minInclusive" type="xs:integer" use="optional"/>
20:          <xs:attribute name="maxInclusive" type="xs:integer" use="optional"/>
21:      </xs:complexType>
22:      <xs:complexType name="BooleanAnswerType">
23:          <xs:sequence>
24:              <xs:element name="id" type="xs:anyURI"/>
25:              <xs:element name="q" type="xs:string" minOccurs="0"/>
26:              <xs:element name="a" type="xs:boolean" minOccurs="0"/>
27:          </xs:sequence>
28:      </xs:complexType>
29:      <xs:complexType name=""SelectionAnswerType">
30:          <xs:sequence>
31:              <xs:element name="id" type="xs:anyURI"/>
32:              <xs:element name="q" type="xs:string" minOccurs="0"/>
```

FIG. 54 B

```
33:                    <xs:element name="a" type="xs:string" minOccurs="0" maxOccurs="unbounded"/>
34:                </xs:sequence>
35:                <xs:attribute name="minChoice" type="xs:integer" use="optional"/>
36:                <xs:attribute name="maxChoice" type="xs:integer" use="optional"/>
37:            </xs:complexType>
38:            <xs:complexType name="TextAnswerType">
39:                <xs:sequence>
40:                    <xs:element name="id" type="xs:anyURI"/>
41:                    <xs:element name="q" type="xs:string" minOccurs="0"/>
42:                    <xs:element name="a" type="xs:string" minOccurs="0"/>
43:                </xs:sequence>
44:            </xs:complexType>
45:            <xs:complexType name="AnyAnswerType")
46:                <xs:sequence>
47:                    <xs:element name="id" type="xs:anyURI"/>
48:                    <xs:element name="a" type="xs:base64Binary"/>
49:                </xs:sequence>
50:            </xs:complex Type>
51:            <xs:complexType name="BitmapAnyURI Type">
52:                <xs:simpleContent>
53:                    <xs:extension base="xs:anyURI">
54:                        <xs:attribute name="bmi" type="xs:string" use="optional"/>
55:                    </xs:extension>
56:                </xs:simpleContent>
57:            </xs:complexType>
58:            <xs:complexType name="BitmapBooleanType">
59:                <xs:simpleContent>
60:                    <xs:extension base="xs:boolean">
61:                        <xs:attribute name="bmi" type="xs:string" use="optional"/>
62:                    </xs:extension>
```

FIG. 55

```
63:                </xs:simpleContent>
64:        </xs:complexType>
65:        <xs:complexType name="BitmapStringType">
66:                <xs:simpleContent>
67:                        <xs:extension base="xs:string">
68:                                <xs:attribute name="bmi" type="xs:string" use="optional"/>
69:                        </xs:extension>
70:                </xs:simpleContent>
71:        </xs:complexType>
72:        <xs:complexType name="BitmapBase64BinaryType">
73:                <xs:simpleContent>
74:                        <xs:extension base="xs:base64Binary">
75:                                <xs:attribute name="bmi" type="xs:string" use="optional"/>
76:                        </xs:extension>
77:                </xs:simpleContent>
78:        </xs:complexType>
79: </xs:schema>
```

FIG.56

```
 1: <PDItable xmlns:xsi="http://www.w3.org/2001/XMLSchema-instance" xsi:noNamespaceSchemaLocation="PDItable.xsd">
 2:   <QBA>
 3:     <id bmi="00000000000000101">Common:111</id>
 4:     <q>Are you currently employed?</q> <!--True=1, False=0 -->
 5:   </QBA>
 6:   <QIA minInclusive="10" maxInclusive="100">
 7:     <id>Common:222</id>
 8:     <q>What is the age of the oldest member of the household who watches television?</q>
 9:   </QIA>
10:   <QSA minChoice="1" maxChoice="3">
11:     <id bmi="00000100000111">ProviderA:123</id>
12:     <q>In which of the following sports are you most interested? (Multiple selection allowed)</q>
13:     <a bmi="0001">Baseball</a>
14:     <a bmi="0010">Basketball</a>
15:     <a bmi="0100">Soccer</a>
16:     <a bmi="1000">Hockey</a>
17:   </QSA>
18:   <QSA maxChoice="1">
19:     <id bmi="00000100000101">ProviderA:ProgramX:123</id>
20:     <q>Do you enjoy camping and outdoor recreation?(Only one selection)</q>
21:     <a bmi="001">Never</a>
22:     <a bmi="010">Occasionally</a>
23:     <a bmi="100">Frequently</a>
24:   </QSA>
25:   <QTA>
26:     <id>ProviderA:321</id>
27:     <q>Who's products are you most interested in recently?</q>
28:   </QTA>
29: </PDItable>
```

FIG.62

```
Service
    id
    version
    validFrom
    validTo
    glovalServiceID
    weight
    baseCID
    ServiceType
    Name
    Description
    AudioLanguage
        languageSDPTag
    TextLanguage
        languageSDPTag
    ParentalRating
        ratingSystem
        ratingValueName
    Genre
    Extesion
        url
        Description
    PreviewDataReference
        idRef
        usage
    PrivateExt
        PDI-BA
```

FIG.63

```
Schedule
    id
    version
    defaultSchedule
    onDemand
    validFrom
    validTo
    ServiceReference
        idRef
    ContentReference
        idRef
        contentLocation
        PresentationWindow
            startTime
            endTime
    PrivateExt
        PDI-BA
```

FIG.64

```
Content
    id
    version
    validFrom
    validTo
    globalContentID
    baseCID
    ServiceReference
        idRef
        weight
    Name
    Description
    StartTime
    EndTime
    AudioLanguage
        languageSDPTag
    TextLanguage
        languageSDPTag
    Length
    ParentalRating
        ratingSystem
        ratingValueName
    Genre
    Extension
        url
        Description
    PrevewDataReference
        idRef
        usage
    PrivateExt
        PDI-BA
```

FIG.65

| Syntax | No. of bits | Format |
|---|---|---|
| PDI_descriptor() { | | |
| descriptor_tag | 8 | 0x(TBD) |
| descriptor_length | 8 | uimsbf |
| PDI_length | 8 | uimsbf |
| PDI_BA | var | - |
| } | | |

TRANSMISSION AND RECEPTION APPARATUSES, METHODS, AND SYSTEMS FOR FILTERING CONTENT

CROSS-REFERENCE TO RELATED APPLICATIONS

The present application is a continuation of U.S. application Ser. No. 14/926,323, filed Oct. 29, 2015, which is a continuation of U.S. application Ser. No. 14/493,661, filed Sep. 23, 2014, now U.S. Pat. No. 9,215,295, which is a continuation of U.S. application Ser. No. 13/071,238, filed Mar. 24, 2011, now U.S. Pat. No. 8,875,169, which is a non-provisional application of and claims the benefit of priority from U.S. Application No. 61/377,808, filed Aug. 27, 2010, the entire contents of which are incorporated herein by reference.

BACKGROUND OF THE INVENTION

1. Field of the Invention

This invention relates to a transmission apparatus and method, a reception apparatus and method, and a transmission and reception system, and more particularly to a transmission apparatus and method, a reception apparatus and method, and a transmission and reception system by which a content can be acquired in response to metadata.

2. Description of the Related Art

In recent years, together with digitalization of television broadcasting, the amount of information which can be broadcast at a time has increased dramatically, and various data are broadcast simultaneously together with a television program or content to be viewed on the real time basis.

Further, as a communication path for a content, a content download service which selectively uses the television broadcasting described above and the Internet which allows high speed downloading of data has been proposed and is disclosed, for example, in Japanese Patent Laid-Open No. 2010-21988.

Incidentally, in general content download services, a filtering attribute also called filtering index, filtering metadata or the like set by a server on the provider side which provides or distributes contents such as the content provider side or the service provider side is added as metadata to a content. Consequently, a client which receives or acquires the content can carry out filtering of the content.

The filtering attribute is set as a value of an element of metadata selected from within a metadata set prescribed by a standardization organization such as ATSC (Advanced Television Standard Committee) or ARIB (Association of Radio Industries and Businesses).

In particular, a content to which filtering attributes that "viewing target" is selected as an element of metadata and that "years of life between ten and nineteen" is set as a value regarding the element of the metadata are applied is provided to clients which carry out filtering so as to acquire a "content for a viewer whose "viewing target is viewers whose years of life are between ten and nineteen."

SUMMARY OF THE INVENTION

However, it is not available to apply metadata or a filtering attribute which is not included in a metadata set prescribed by a standardization organization to a content.

For example, even if the provider side wants to distribute a content whose "watching target is viewers of years of life between ten and nineteen" to viewers who "are interested in job-hunting," if a metadata set prescribed by a standardization organization does not include "whether or not a viewer is interested in job-hunting" as an element of metadata, then the provider side cannot apply a filtering attribute that "interested in job-hunting" is set as an element of metadata to the content.

Accordingly, the provider side cannot distribute a content to which a matter which satisfies current needs such as, for example, to take a trend into consideration and in which a viewer is interested is applied as metadata.

Further, in such a case as described above, the client side cannot carry out filtering so that a content which satisfies the needs at the time is obtained.

Therefore, it is desirable to provide a transmission apparatus and method, a reception apparatus and method, and a transmission and reception system by which a content which satisfies needs at the time can be acquired.

According to a first embodiment of the present invention, there is provided a transmission apparatus for distributing a content to a client, including question generation means for generating question information representative of a question regarding liking of a user of the client, and transmission means for transmitting the question information and provider side answer information in the form of a bit string representative of an answer set by a provider which provides the content to the question regarding the liking of the user to the client.

The transmission apparatus may further include metadata generation means for generating metadata including the provider side answer information as metadata of the content corresponding to the answer set by the provider, the transmission means transmitting the metadata to the client.

According to the first embodiment of the present invention, there is provided also a transmission method for a transmission apparatus for distributing a content to a client, including the steps of generating question information representative of a question regarding liking of a user of the client, and transmitting the question information and provider side answer information the form of a bit string representative of an answer set by a provider which provides the content to the question regarding the liking of the user to the client.

In the transmission apparatus and the transmission method, question information representative of a question regarding liking of a user of the client is generated. Then, the generated question information and provider side answer information in the form of a bit string representative of an answer set by a provider which provides the content to the question regarding the liking of the user are transmitted to the client.

According to a second embodiment of the present invention, there is provided a reception apparatus for acquiring a content distributed from a server, including answer generation means for generating, in response to question information representative of a question regarding liking of a user and transmitted from the server to the reception apparatus, user side answer information in the form of a bit string representative of an answer of the user to the question, and matching means for carrying out matching between the answer information and provider side answer information in the form of a bit string representative of an answer set by a provider which provides the content to the question and transmitted from the server to the reception apparatus to determine acquisition of the content distributed from the server.

The matching means may carry out the matching to determine acquisition of the content corresponding to metadata including the provider side answer information.

According to the second embodiment of the present invention, there is provided also a reception method for a reception apparatus for acquiring a content distributed from a server, including the steps of generating, in response to question information representative of a question regarding liking of a user and transmitted from the server to the reception apparatus, user side answer information in the form of a bit string representative of an answer of the user to the question, and carrying out matching between the answer information and provider side answer information in the form of a bit string representative of an answer set by a provider which provides the content to the question and transmitted from the server to the reception apparatus to determine acquisition of the content distributed from the server.

In the reception apparatus and the reception method, in response to question information representative of a question regarding liking of a user and transmitted from the server to the reception apparatus, user side answer information in the form of a bit string representative of an answer of the user to the question is generated. Then, matching between the generated answer information and provider side answer information in the form of a bit string representative of an answer set by a provider which provides the content to the question and transmitted from the server is carried out to determine acquisition of the content distributed from the server.

According to a third embodiment of the present invention, there is provided a transmission and reception system, including a transmission apparatus adapted to distribute a content, and a reception apparatus adapted to acquire the content distributed from the transmission apparatus, the transmission apparatus including question generation means for generating question information representative of a question regarding liking of a user of the reception apparatus, and transmission means for transmitting the question information and provider side answer information in the form of a bit string representative of an answer set by a provider which provides the content to the question regarding the liking of the user to the reception apparatus, the reception apparatus including answer generation means for generating user side answer information in the form of a bit string representative of an answer of the user to the question in response to the question information transmitted from the transmission apparatus, and matching means for carrying out matching between the user side answer information and the provider side answer information transmitted from the transmission apparatus to determine acquisition of the content distributed from the transmission apparatus.

In the transmission and reception system, question information representative of a question regarding liking of a user of the reception apparatus is generated. Then, the question information and provider side answer information in the form of a bit string representative of an answer set by a provider which provides the content to the question regarding the liking of the user is transmitted to the reception apparatus. User side answer information in the form of a bit string representative of an answer of the user to the question is generated in response to the question information transmitted to the reception apparatus from the transmission apparatus. Then, matching between the generated user side answer information and the provider side answer information transmitted from the transmission apparatus is carried out to determine acquisition of the content distributed from the transmission apparatus.

With the transmission apparatus and method, reception apparatus and method, and transmission and reception system, it becomes possible to acquire a content which satisfies needs at the time.

BRIEF DESCRIPTION OF THE DRAWINGS

FIG. 2 is a block diagram showing an example of a hardware configuration of a server;

FIG. 5 is a flow chart illustrating content transmission and reception processes;

FIGS. 6A-6B is a view illustrating an example of syntax of the XML schema;

FIG. 7 is a view illustrating an example of a PDI-Q;

FIGS. 8 to 12 are schematic views showing different examples of screen image display in interaction with a user;

FIG. 13 is a view illustrating an example of a PDI-A;

FIGS. 14 and 15 are views illustrating different examples of a provider side PDI-A;

FIG. 23 is a view illustrating a configuration of a Service fragment;

FIG. 24 is a view illustrating a configuration of a Schedule fragment;

FIG. 25 is a view illustrating a configuration of a Content fragment;

FIG. 30 is a view illustrating an example of syntax of a PDI descriptor;

FIGS. 34A-34B is a view illustrating another example of syntax of the XML schema;

FIGS. 36 to 40 are schematic views showing different examples of screen image display in interaction with a user different from those of FIGS. 8 to 12;

FIG. 41 is a view illustrating an example of a user side PDI-A;

FIGS. 42 and 43 are views illustrating different examples of a provider side PDI-A different from those of FIGS. 14 and 15;

FIG. 50 is a view illustrating another example of the PDI descriptor;

FIGS. 54A-54B and 55 are views illustrating a further example of syntax of the XML schema;

FIG. 56 is a view illustrating another example of PDI-Q;

FIG. 62 is a view illustrating another configuration of the Service fragment;

FIG. 63 is a view illustrating another configuration of the Schedule fragment;

FIG. 64 is a view illustrating another configuration of the Content fragment; and FIG. 65 is a view illustrating a further example of syntax of the PDI descriptor.

DETAILED DESCRIPTION OF THE PREFERRED EMBODIMENTS

In the following, preferred embodiments of the present invention are described with reference to the accompanying drawings. It is to be noted that the description is carried out in the following order.
1. First Embodiment
2. Second Embodiment
3. Third Embodiment

1. First Embodiment

Example of the Configuration of the Broadcasting System

Figure 1:
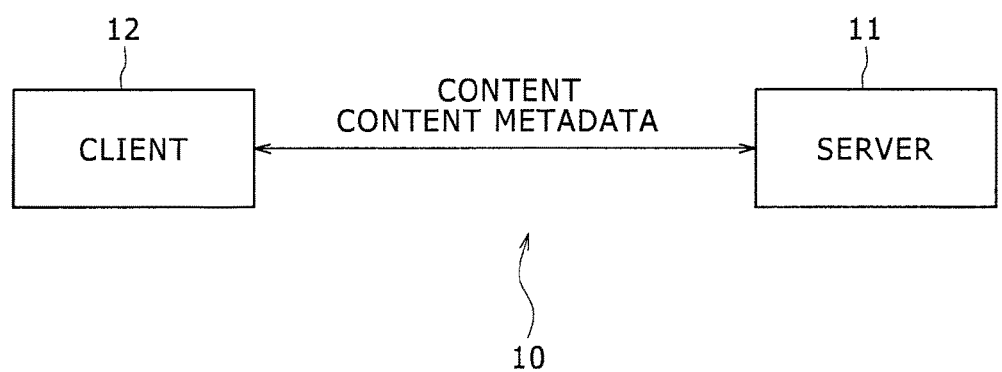
FIG. 1 is a block diagram showing an example of a configuration of a broadcasting system according to a first embodiment of the present invention.

FIG. 1 shows an example of a configuration of a broadcasting system according to an embodiment of the present invention.

The broadcasting system 10 of FIG. 1 is configured from a server 11 provided on the provider side such as a broadcasting company which broadcasts or provides a digital television program (hereinafter referred to suitably as content) and a client terminal (hereinafter referred to simply as client) 12 installed in a home of a user who enjoys broadcast contents. It is to be noted that, while the client 12 is installed in a plurality of user homes, the client 12 can be configured also as a portable terminal apparatus such as a portable telephone set or a PDA (Personal Digital Assistant).

In the broadcasting system 10, the server 11 transmits a content together with content metadata regarding the content as a signal of a digital broadcasting wave to the client 12. The client 12 carries out filtering of the content based on the content metadata transmitted thereto together with the content so that only the content desired by the user is reproduced or accumulated. It is to be noted that the content metadata may not be transmitted together with the content but may be transmitted before the content is transmitted.

Example of the Hardware Configuration of the Server

FIG. 2 shows an example of a hardware configuration of the server 11. Referring to FIG. 2, the server 11 is configured, for example, using a computer as a base.

A CPU (Central Processing Unit) 21 executes various processes in accordance with a program stored in a ROM (Read Only Memory) 22 or a program loaded from a storage section 28 into a RAM (Random Access Memory) 23. Data necessary for executing various processes by the CPU 21 and so forth are suitably stored into the RAM 23.

The CPU 21, ROM 22 and RAM 23 are connected to each other through a bus 24. Also an input/output interface 25 is connected to the bus 24.

To the input/output interface 25, an inputting section 26 configured from a keyboard, a mouse and so forth, an outputting section 27 configured from a display unit such as a CRT (Cathode Ray Tube), an LCD (Liquid Crystal Display) unit or the like, a speaker and so forth, the storage section 28 configured from a hard disk and so forth and a communication section 29 configured from a modem, a terminal adapter and so forth are connected. The communication section 29 communicates with an external apparatus through a network not shown. Further, a program may be acquired through the communication section 29 and stored into the storage section 28.

Further, a drive unit 30 is connected to the input/output interface 25 as occasion demands and a removable medium 31 such as a magnetic disk, an optical disk, a magneto-optical disk or a semiconductor memory is suitably loaded into to the input/output interface 25. A computer program read out from such a removable medium as just described is installed into the storage section 28 as occasion demands.

It is to be noted that, though not shown, the hardware of the client 12 is configured similarly to the server 11 as shown in FIG. 2.

Example of the Functional Configuration of the Server

Next, an example of a functional configuration of the server 11 is described with reference to FIG. 3.

The server 11 is configured from a PDI-Q generator 41, a transmission section 42, a PDI-A generator 43, a metadata distributor 44, a content accumulation section 45 and a content distributor 46.

The PDI-Q generator 41 generates a PDI-Q (Preference Demographic and Interest-Question) which is information representative of questions regarding the liking of the user or viewer of the client 12. Then, the PDI-Q generator 41 transmits the generated PDI-Q to the client 12 through the transmission section 42 and supplies the PDI-Q to the PDI-A generator 43.

The transmission section 42 transmits various data supplied thereto from the PDI-Q generator 41, metadata distributor 44 and content distributor 46 to the client 12.

The PDI-A generator 43 generates, based on the PDI-Q from the PDI-Q generator 41, a PDI-A (Preference Demographic and Interest-Answer) which is information representative of an answer set on the provider side to the questions regarding the liking of the user of the client 12 described above and corresponds to the PDI-Q. The PDI-A generator 43 supplies the generated PDI-A to the metadata distributor 44.

The metadata distributor 44 specifies or refers to a content corresponding to the answer set on the provider side from among contents accumulated in the content accumulation section 45 based on the PDI-A from the PDI-A generator 43. The metadata distributor 44 generates content metadata including the PDI-A as content metadata of the specified content and transmits the generated data to the client 12 through the transmission section 42.

The content accumulation section 45 accumulates various contents to be distributed to the client 12.

The content distributor 46 acquires the content specified by the metadata distributor 44 from among the contents accumulated in the content accumulation section 45 and transmits the acquired content to the client 12 through the transmission section 42.

Example of the Functional Configuration of the Client

Next, an example of a functional configuration of the client 12 is described with reference to FIG. 4.

The client 12 is configured from a reception section 51, a PDI-A generator 52, a PDI-A storage section 53, a content filter 54, a content reproduction section 55 and a content accumulation section 56.

The reception section 51 receives various data transmitted from the server 11 and supplies the received data to the PDI-A generator 52 or the content filter 54.

The PDI-A generator 52 generates, based on the PDI-Q transmitted from the server 11, a PDI-A which indicates answers of the user to questions regarding the liking of the user of the client 12 and corresponds to the PDI-Q to supply to the PDI-A storage section 53.

The PDI-A storage section 53 stores the PDI-A from the PDI-A generator 52. The PDI-A stored in the PDI-A storage section 53 is suitably read out to the content filter 54.

The content filter 54 reads out the PDI-A from the PDI-A storage section 53 and carries out filtering of the content based on the read out PDI-A and a PDI-A included in content metadata of the content received from the server 11. The content filter 54 supplies the filtered content to the content reproduction section 55 or the content accumulation section 56 in response to a result of the filtering.

The content reproduction section 55 reproduces the content from the content filter 54. Further, the content reproduction section 55 acquires the content from the content accumulation section 56 and reproduces the acquired content.

The content accumulation section 56 accumulates or records the content from the content filter 54.

Example of the Transmission and Reception Processes of a Content

Next, transmission and reception processes of a content in the broadcasting system 10 are described with reference to a flow chart of FIG. 5. In the content transmission and reception processes of the broadcasting system 10, a content is distributed by executing a content distribution process by the server 11 and is acquired by executing a content acquisition process by the client 12.

On the case where, on the provider side such as a broadcasting company, for example, a sponsor of a content to be broadcast or distributed or the broadcasting company itself requests distribution of a content for a viewer having a specific liking or a specific attribute, the PDI-Q generator 41 of the server 11 generates, at step S11, a PDI-Q for inquiring about what liking or attribute the user has to the viewer, that is, to the user of the client 12, in response to operation of the staff on the provider side.

Example of the Syntax of the XML Schema

Here, an example of the syntax of the XML (Extensible Markup Language) schema for configuring a PDI-Q and a PDI-A is described with reference to FIGS. 6A-6B.

In FIGS. 6A-6B, the first row indicates a declaration or a definition for identifying the PDI-Q, and the second row indicates a name of the entire questions defined as the PDI-Q and a declaration of the type.

The third to twelfth rows indicate a name and a declaration of the type regarding the individual questions declared in the second row. In particular, the type "IntegerAnswerType" of a question defined by the name "QIA" in the fifth row indicates that the question requests an integer value type answer, and the type "BooleanAnswerType" of the question defined by the name "QBA" in the sixth row indicates that the question requests a logical value type answer. Further, the type "SelectionAnswerType" of the question defined by the name "QSA" in the seventh row indicates that the question requests an answer selection type answer, and the type "TextAnswerType" of the question defined by the name "QTA" in the eighth row indicates that the question requests a character column type answer. Further, the type "AnyAnswerType" of the question defined by the name "QAA" in the ninth row indicates that the question does not the type of an answer thereto.

The thirteenth to 44th rows indicate declarations of elements of the questions defined by the names "QIA," "QBA," "QSA" and "QTA" from among the questions declared as described above. Particularly, id elements indicated in the 15th, 24th, 31st and 40th rows indicate IDs (Identifiers) for identifying items of the questions, and are defined as given below as a first format:

"common:[category:]question-ID"

In the first format, the term "common" indicates that the question identified by the id element is a question commonly defined independently of the provider, and term "category" indicates a category of the question and the term "question-ID" indicates an identifier of the question. It is to be noted that the term "category" may be represented, as occasion demands, in a hierarchical nest structure like:

"common:[category1:category2:category3: . . . ]question-ID"

Further, the id element is defined as given below as a second format:

"providerName:[category:]question-ID"

In the second format, the term "providerName" indicates a name of the provider by which the question identified by the id element is set. It is to be noted that the term "category" and the term "question-ID" are similar to those in the first format.

In this manner, the questions defined as the PDI-Q are distinguished, depending upon the id element, into those questions independent of the provider which provides contents and common to providers and those questions defined uniquely by the provider which provides the content.

A question independent of the provider which provide a content and an answer to the question are hereinafter referred to suitably as provider common filtering parameter, and a question defined uniquely by the provider which provides a content and an answer to the question are hereinafter referred to suitably as provider unique filtering parameter.

As described above, since the provider common filtering parameter is defined commonly by providers without depending upon individual providers, generally the provider common filtering parameter is provided by a vender, that is, by a maker or the like, of the client 12. Accordingly, although the PDI-Q generator 41 in the server 11 can be made so as to be provided by the provider side, it may otherwise be made so as to be provided by the vender of the client 12.

It is to be noted that the syntax which configures the PDI-Q and the PDI-A is not limited to that of the example illustrated in FIGS. 6A-6B.

Example of the PDI-Q

Next, an example of the PDI-Q configured based on the syntax of FIGS. 6A-6B is described with reference to FIG. 7.

In FIG. 7, the term "transactional" in the first row is a value which indicates whether or not a recording/updating process is to be rolled back. In particular, when the questions, that is, the question group, defined by the PDI-Q are updated in the client 12 to which the questions are transmitted, all of the substance of the items of the PDI-Q may not be recorded/updated because of some accident such as disk writing error or interruption of a processing by increase of the processing load midway of processing for recording/updating the substance of the items of the PDI-Q into a storage region not shown of the client 12. If all of the substance of the items of the PDI-Q is not recorded/updated, then the recording/updating process may be invalidated, that is, a rollback process may be carried out, going back to a state just before the recording/updating of the substance of the items of the PDI-Q. Thus, whether such rollback process should be carried out is represented by "transactional." In the case where "transactional" is "true," the PDI-Q is rolled back.

The second to fifth rows define a question for requesting a logic value type answer, and <id>Common:111</id> in the third row indicates an id element of the question and <q>Are you currently employed?</q> in the fourth row indicates the question itself.

The sixth to ninth rows define a question for requesting an integer value type answer, and <id>Common:222</id> in the seventh row indicates an id element of the question and <q>What is the age of oldest member of the household who watches television?</q> in the eighth row indicates the question itself. It is to be noted that minInclusive="10"maxInclusive="100" in the sixth row indicates that an answer to the request is restricted to an integer value from 10 or more to 100 or less.

The tenth to 17th rows define a question for requesting an answer selection type answer, and <id>ProviderA:123</id> in the eleventh row indicates an id element of the question and <q> In which of the following sports are you most interested? (Multiple selection allowed)</q> indicates the question itself. Further, <a>Baseball</a> in the 13th row, <a>Basketball</a> in the 14th row, <a>Soccer</a> in the 15th row and <a>Hockey</a> in the 16th row individually indicate choices for an answer to the question. It is to be noted that minChoice="1" maxChoice="3" in the tenth row indicates that the number of answers to the question is restricted from one to three from among the choices.

The eighteenth to 24th rows define a question for requesting an answer selection type answer, and <id>ProviderA:ProgramX:123</id> in the 19th row indicates an id element of the question and <q>Do you enjoy camping and outdoor recreation? (Only one selection)</q> in the 20th row indicates the question itself. Further, <a>Never</a> in the 21st row, <a>Occasionally</a> in the 22nd row and <a>Frequently</a> in the 23rd row individually indicate the choices of an answer to the question. It is to be noted that maxChoice="1" in the 18th row indicates that the number of answers to the question is restricted to one.

In this manner, in the PDI-Q, also candidates for the answer to the question and restriction conditions for the answer are defined depending upon the type of the question.

The 25th to 28th rows define a question for requesting a character column type answer, and <id>ProviderA:321</id> indicates an id element of the question in the 26th row and <q>Who's products are you most interested in recently?</q> in the 27th row indicates the question itself.

In the following description, the questions defined by the PDI-Q in FIG. 7 are referred to as questions of id elements. In particular, the question defined in the second to fifth rows is distinguished as a question of "Common:111" and the question defined in the sixth to ninth rows is distinguished as a question of "Common:222." Further, the question defined in the tenth to 17th rows is distinguished as a question of "ProviderA:123," and the question defined in the 18th to 24th rows is distinguished as a question of "ProviderA:ProgramX:123." Furthermore, the question defined in the 25th to 28th rows is distinguished as a question of "ProviderA:321."

At this time, the question of "Common:111" and the question of "Common:222" are distinguished as the provider common filtering parameter, and the question of "ProviderA:123," question of "ProviderA:ProgramX:123" and question of "ProviderA:321" are distinguished as the provider unique filtering parameter. For example, the question of "Common:111" indicates a question set commonly to providers and having the identifier "111," and the question of "ProviderA:ProgramX:123" indicates a question set by the provider of "ProviderA" and whose category or program ID is "ProgramX" and identifier is "123."

Referring back to the flow chart in FIG. 5, at step S12, the PDI-Q generator 41 of the server 11 transmits the generated PDI-Q to the client 12 through the transmission section 42 and supplies the PDI-Q to the PDI-A generator 43.

At step S21, the reception section 51 of the client 12 receives the PDI-Q transmitted from the server 11 and supplies the received PDI-Q to the PDI-A generator 52.

It is to be noted that the PDI-Q is received by the client 12, for example, every time broadcasting or transmission is carried out after a predetermined interval of time from the broadcasting station as the provider in which the server 11 is installed. Or, PDI-Q may be received by the client 12 when the channel is set to that of the broadcasting station in which the server 11 is installed.

At step S22, the PDI-A generator 52 of the client 12 generates a PDI-A to the questions defined by the PDI-Q received by the reception section 51. In particular, if the PDI-Q from the server 11 is received, then the PDI-A generator 52 causes a display section not shown to display a screen image corresponding to each question defined by the PDI-Q and causes the user or viewer of the client 12 to input or select an answer to the question so that a PDI-A which indicates the answer to the question is generated. In particular, the PDI-A generator 52 interacts with the user to generate the PDI-A which indicates the answer to the question defined by the PDI-Q. Example of the Screen Image Display in Communication with the User by the PDI-A Generator Here, an example of screen image display in communication with the user by the PDI-A generator 52 is described with reference to FIGS. 8 to 12. It is to be noted that it is assumed here that the client 12 receives the PDI-Q described with reference to FIG. 7, and screen images corresponding to the question group defined by the received PDI-Q are successively displayed on the display section not shown of the client 12.

FIG. 8 shows an example of screen image display corresponding to the question of "Common:111" from among the questions defined by the PDI-Q described hereinabove with reference to FIG. 7. In FIG. 8, the question of "Are you currently employed?" indicated in the fourth row in FIG. 7 is displayed in a question presentation region 61. Further, the message of "choose one" for urging the user to input an answer to the question, a selection button 62-1 for urging the user to select "Yes" as the answer to the question and another selection button 62-2 for urging the user to select "No" as the answer to the question are displayed.

FIG. 9 shows an example of screen image display corresponding to the question of "Common:222" from among the questions defined by the PDI-Q described hereinabove with reference to FIG. 7. In FIG. 9, the question of "What is the age of the oldest member of the household who watches television?" indicated in the eighth row in FIG. 7 is displayed in a question presentation region 71. Further, a message "enter age" for urging the user to input an answer to the question and an answer inputting region 72 for urging the user to input an integer value as the answer to the question are displayed.

FIG. 10 shows an example of screen image display corresponding to the question of "ProviderA:123" from among the questions defined by the PDI-Q described hereinabove with reference to FIG. 7. In FIG. 10, the question of "In which of the following sports are you most interested? (Multiple selection allowed)" indicated in the twelfth row in FIG. 7 is displayed in a question presentation region 81. Further, the message of "choose one to three answers" for urging the user to input an answer to the question and selection buttons 82-1 to 82-4 for urging the user to select the choices of "Baseball," "Basketball," "Soccer" and "Hockey" as the answer to the question are displayed.

FIG. 11 shows an example of screen image display corresponding to the question of "ProviderA:ProgramX: 123" from among the questions defined by the PDI-Q described hereinabove with reference to FIG. 7. In FIG. 11, the question of "Do you enjoy camping and outdoor recreation? (Only one selection)" indicated in the 20th row in FIG. 7 is displayed in a question presentation region 91. Further, the message of "choose one" for urging the user to input an answer to the question and selection buttons 92-1 to 92-3 for urging the user to select the choices of "Never," "Occasionally" and "Frequently" as the answer to the question are displayed.

FIG. 12 shows an example of screen image display corresponding to the question of "ProviderA:321" from among the questions defined by the PDI-Q described with reference to FIG. 7. In FIG. 12, the question of "Who's products are you most interested in recently?" indicated in the 27th row in FIG. 7 is displayed in a question presentation region 101. Further, the message of "write anything" for urging the user to input an answer to the question and an answer inputting region 102 for urging the user to input a character string as the answer to the question are displayed.

In this manner, the PDI-A generator 52 urges the user to input or select an answer to the questions defined by the PDI-Q in accordance with the screen image display described with reference to FIGS. 8 to 12 so that the PDI-A corresponding to the PDI-Q is generated.

It is to be noted that the screen image display described with reference to FIGS. 8 to 12 may be carried out lust after the PDI-Q is received or may be carried out when, after the PDI-Q is received and retained into the storage section not shown, an instruction to display a setting screen image is issued by the user.

Example of the PDI-A

Here, an example of the PDI-A generated by the PDI-A generator 52 is described with reference to FIG. 13. The PDI-A shown in FIG. 13 is generated based on selection or inputting of answers by the user to the screen image display described with reference to FIGS. 8 to 12.

In particular, the second to fifth rows indicate an answer of the user to the question presented by the screen image display described hereinabove with reference to FIG. 8. In particular, <id:Common:111</id> in the third row indicates an id element of the question presented by the screen image display described with reference to FIG. 8, and <a>true</a> in the fourth row indicates that the selection button 62-1 for the answer of "Yes" in the displaying screen image in FIG. 8 is selected as the answer to the question by the user.

The sixth to ninth rows indicate an answer of the user to the question presented by the screen image display described with reference to FIG. 9. In particular, <id>Common:222</id> in the seventh row indicates an id element of the question presented by the screen image display in FIG. 9, and <a>34</a> in the eighth row indicates that an integer value "34" is inputted as the answer to the question by the user to the answer inputting region 72 in the screen image display in FIG. 9.

The tenth to 15th rows indicate an answer of the user to the question presented by the screen image display described hereinabove with reference to FIG. 10. In particular, <id>ProviderA:123</id> in the eleventh row indicates an id element of the question presented by the screen image display in FIG. 10, and <a>Baseball</a> in the 12th row, <a>Soccer</a> in the 13th row and <a>Hockey</a> in the 14th row indicate that the selection buttons 82-1, 82-3 and 82-4 are selected as the answer to the question by the user in the screen display in FIG. 10, respectively.

The 16th to 19th rows indicate an answer of user to the question presented by the screen image display described hereinabove with reference to FIG. 11. In particular, <id>ProviderA:ProgramX:123</id> in 17th row indicates an id element of the question presented by the screen image display in FIG. 11, and <a>Occasionally</a> in the 18th row indicates that the selection button 92-2 is selected as the answer to the question by the user in the screen image display in FIG. 11.

The 20th to 23rd rows indicate an answer of the user to the question presented by the screen image display described hereinabove with reference to FIG. 12. In particular, <id>ProviderA:321</id> on the 21st row indicates the id element of the question presented by the screen image display of FIG. 12. Meanwhile, <a>Somy</a> on the 22nd row indicates that "Somy" is inputted as a character string to the answer inputting region 102 on the screen image display of FIG. 12 by the user as an answer to the question.

The PDI-A generator 52 supplies the PDI-A generated in this manner to the PDI-A storage section 53 so as to be stored. The PDI-A stored in the PDI-A storage section 53 is used when the content distributed from the server 11 conforms to the liking of the user of the client 12 as hereinafter described.

Referring back to the flow chart of FIG. 5, at step S13, the PDI-A generator 43 of the server 11 generates a PDI-A to the questions defined in the PDI-Q from the PDI-Q generator 41 and supplies the generated PDI-A to the metadata distributor 44. More particularly, if a PDI-Q is generated by an operation of the staff of the broadcasting station or provider side, then the PDI-A generator 43 causes the display section not shown to display such screen images which correspond to the questions defined in the PDI-Q as described hereinabove with reference to FIGS. 8 to 12. Then, the PDI-A generator 43 causes the staff of the broadcasting station to input or select answers to the questions to generate a PDI-A representative of the answers. At this time, the staff of the broadcasting station would input or select answers corresponding to the content to be distributed as answers to the questions defined in the PDI-Q. In other words, the PDI-A generated by the PDI-A generator 43 represents information, that is, answers, generated by the provider side taking the liking of the user or viewer of the client 12 into consideration, for allowing the viewer to enjoy a content to be distributed later.

At step S14, the metadata distributor 44 specifies or refers to a content corresponding to the PDI-A from among the contents accumulated in the content accumulation section 45 based on the PDI-A from the PDI-A generator 43. The content specified here may be a content with regard to which the similarity between the PDI-A from the PDI-A generator 43 and the content metadata applied in advance to the accumulated content is higher than a predetermined value or may be a content selected in advance as a content desirable to be viewed by the user by the staff of the broadcasting station. It is to be noted that the content specified by the metadata distributor 44 is acquired from the content accumulation section 45 by the content distributor 46.

At step S15, the metadata distributor 44 newly generates, based on the content metadata applied in advance to the content specified at step S15 and the PDI-A from the PDI-A generator 43, content metadata including the PDI-A.

At step S16, the transmission section 42 distributes the content acquired by the content distributor 46 together with the content metadata generated by the metadata distributor 44. At this time, as the content metadata, content metadata prescribed by a standardization organization may be transmitted in addition to the content metadata generated by the metadata distributor 44.

In this manner, a content whose content metadata includes a PDI-A representative of answers intended by the provider side as the answers to the questions defined in the PDI-Q, or in other words, a content which conforms to the liking of the user and whose viewing is expected by the provider side, is distributed.

It is to be noted that the processes at steps S13 to S16 need not be executed immediately after the process at step S12, but may be executed before a PDI-A generated and stored in the client 12 owned by each user.

Further, while, at step S16, the content is distributed together with the content metadata, content may not be distributed together with the content metadata, but after the content metadata including the PDI-A is transmitted in advance to the client 12, the content corresponding to the content metadata may be distributed.

After the content and the content metadata are distributed from the server 11 in this manner, at step S23, the reception section 51 of the client 12 receives the content and the content metadata distributed from the server 11 and supplies them to the content filter 54.

At step S24, the content filter 54 carries out matching between the PDI-A stored in the PDI-A storage section 53 and the PDI-A included in the content metadata from the server 11. It is to be noted that, in order to distinguish the PDI-A stored in the PDI-A storage section 53 and the PDI-A included in the content metadata from the server 11 from each other, the former is hereinafter referred to as user side PDI-A and the latter is hereinafter referred to as provider side PDI-A. Example of the Matching Process by the Content Filter Here, it is assumed that the PDI-A described hereinabove with reference to FIG. 13 is generated and stored as the user side PDI-A and the PDI-A illustrated in FIG. 14 is transmitted as the provider side PDI-A from the server 11.

The provider side PDI-A illustrated in FIG. 14 has a basically similar configuration to that of the user side PDI-A illustrated in FIG. 13, and therefore, overlapping description of the provider side PDI-A is omitted herein to avoid redundancy. However, the provider side PDI-A illustrated in FIG. 14 indicates that "false" is selected as an answer to the question of "Common:111" and "Baseball" is selected as an answer to the question of "ProviderA:123" and besides "Never" is selected as an answer to the question of "ProviderA:ProgramX:123."

At this time, the content filter 54 compares the user side PDI-A and the provider side PDI-A with each other. Then, if the user side PDI-A and the provider side PDI-A exhibit coincidence with regard the answers to at least one question, then the content filter 54 decides that the user side PDI-A and the provider side PDI-A match with each other. However, if the user side PDI-A and the provider side PDI-A exhibit no coincidence with regard to the answers to any question, then the content filter 54 decides that the user side PDI-A and the provider side PDI-A do not match with each other. In the present case, the answer to the question of "ProviderA:123" in the user side PDI-A illustrated in FIG. 13 and the answer to the question of "ProviderA:123" in the provider side PDI-A illustrated in FIG. 14 coincide with each other in that both of them include "Baseball." Therefore, it is decided that the user side PDI-A and the provider side PDI-A match with each other.

Then, it is assumed that a PDI-A illustrated in FIG. 15 is transmitted as the provider side PDI-A from the server 11.

The provider side PDI-A illustrated in FIG. 15 indicates that "Basketball" is selected as an answer to the question of "ProviderA:123" and "Never" is selected as an answer to the question of "ProviderA:123."

In this instance, since the answers to the questions in the user side PDI-A illustrated in FIG. 13 and the answers to the questions in the provider side PDI-A illustrated in FIG. 15 do not coincide with each other at all, it is decided that the user side PDI-A and the provider side PDI-A do not match with each other.

The content filter 54 carries out the matching process between the user side PDI-A and the provider side PDI-A in this manner.

At step S25, the content filter 54 decides whether or not the user side PDI-A and the provider side PDI-A match with each other. If it is decided at step S25 that the user side PDI-A and the provider side PDI-A match with each other, then the content filter 54 decides that the content distributed from the server 11 conforms to the liking of the user or viewer of the client 12. Thus, the content filter 54 supplies the content to the content reproduction section 55 or the content accumulation section 56, and then the processing advances to step S26.

If the content distributed from the server 11 is supplied from the content filter 54 to the content reproduction section 55, then the content reproduction section 55 reproduces the content at step S26. On the other hand, if the content distributed from the server 11 is supplied from the content filter 54 to the content accumulation section 56, then the content accumulation section 56 accumulates or records the content at step S26. The accumulated content is suitably supplied to and reproduced by the content reproduction section 55 in response to an operation instruction of the user.

On the other hand, if it is decided at step S25 that the user side PDI-A and the provider side PDI-A do not match with each other, then the content filter 54 decides that the content distributed from the server 11 does not conform to the liking of the user or viewer of client 12. Then, the content filter 54 abandons or deletes the content, and the processing is ended.

According to the process described above, in the broadcasting system, on the provider side, the server generates a PDI-Q representative of questions regarding the liking of the user, and the PDI-Q is transmitted to the client terminal. Further, a provider side PDI-A representative of answers set by the provider side to the PDI-Q is distributed as metadata of the corresponding content. Consequently, as content metadata, content metadata in accordance with needs at the time other than content metadata prescribed by a standardization organization can be applied to a content. On the other hand, on the user side, the client terminal generates a user side PDI-A representative of answers of the user to the PDI-Q from the server. Then, matching between the generated user side PDI-A and the provider side PDI-A from the server is carried out to determine whether or not the content distributed from the server should be acquired. Consequently, a content can be filtered with content metadata which satisfies needs at the time other than content metadata prescribed by a standardization organization. Accordingly, a content which satisfies current needs can be acquired.

It is to be noted that, while, in the foregoing description, the client 12 carries out matching between the PDI-As on the real time basis upon distribution of a content from the server 11, all contents may be accumulated upon distribution of such contents from the server 11. In this instance, matching between the PDI-As may be carried out on the background of the processing such that a content corresponding to a matched PDI-A, that is, a matched provider side PDI-A, from among the accumulated contents is reproduced or a content which corresponds to any PDI-A which does not match is deleted.

Further, in the foregoing description, the content filter 54 compares a user side PDI-A and a provider side PDI-A represented as instances, and matching between the user side PDI-A and the provider side PDI-A is carried out depending upon whether or not answers to at least one question coincide with each other. However, the user side PDI-A and the provider side PDI-A may be compared with each other by representing one of the user side PDI-A and the provider side PDI-A as a query for evaluating the PDI-A.

In the following, a configuration for comparing a user side PDI-A and a provider side PDI-A with each other by representing one of the user side PDI-A and the provider side PDI-A as a query is described.

Example 1 of the Matching Process by an Query for Evaluating a PDI-A

First, a configuration for representing a provider side PDI-A as a query and comparing a user side PDI-A and the provider side PDI-A with each other is described.

Figure 16:
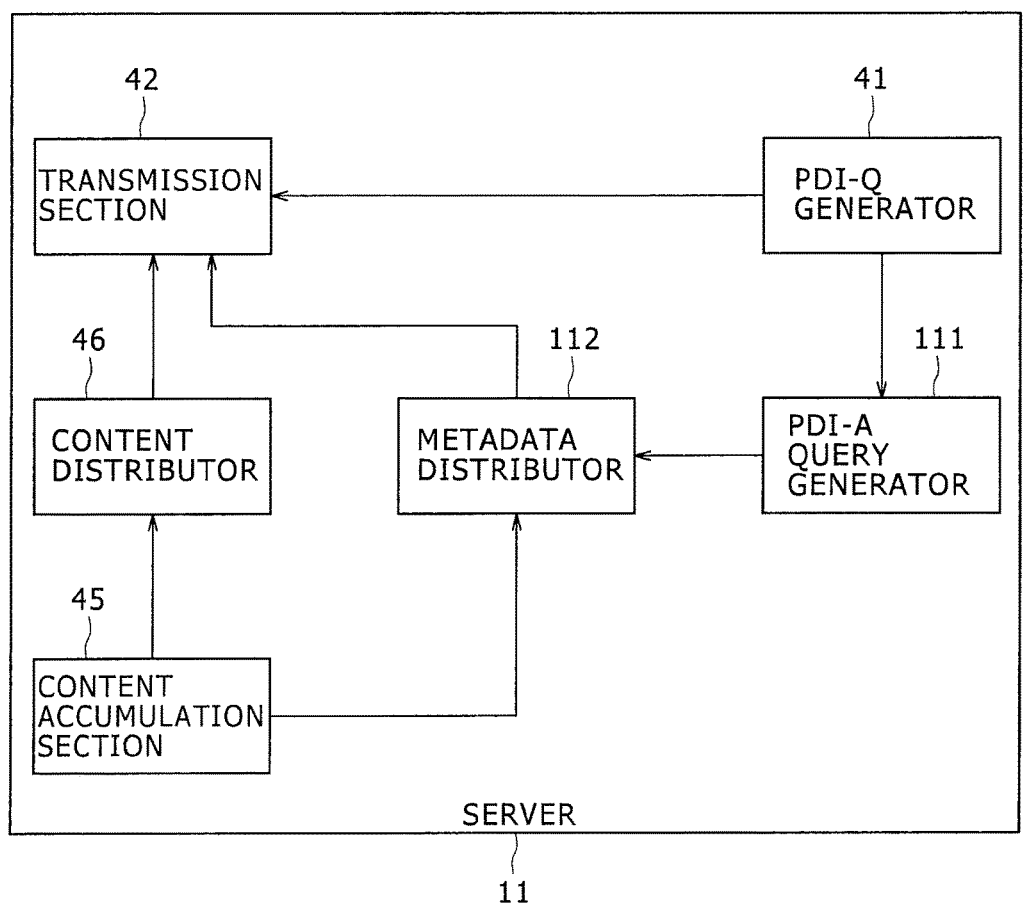
FIG. 16 is a block diagram showing another example of a functional configuration of the server.

FIG. 16 shows an example of a functional configuration of the server 11 which represents a provider side PDI-A as a query.

Referring to FIG. 16, the server 11 shown includes a PDI-Q generator 41, a transmission section 42, a content accumulation section 45, a content distributor 46, a PDI-A query generator 111 and a metadata distributor 112.

Figure 3:
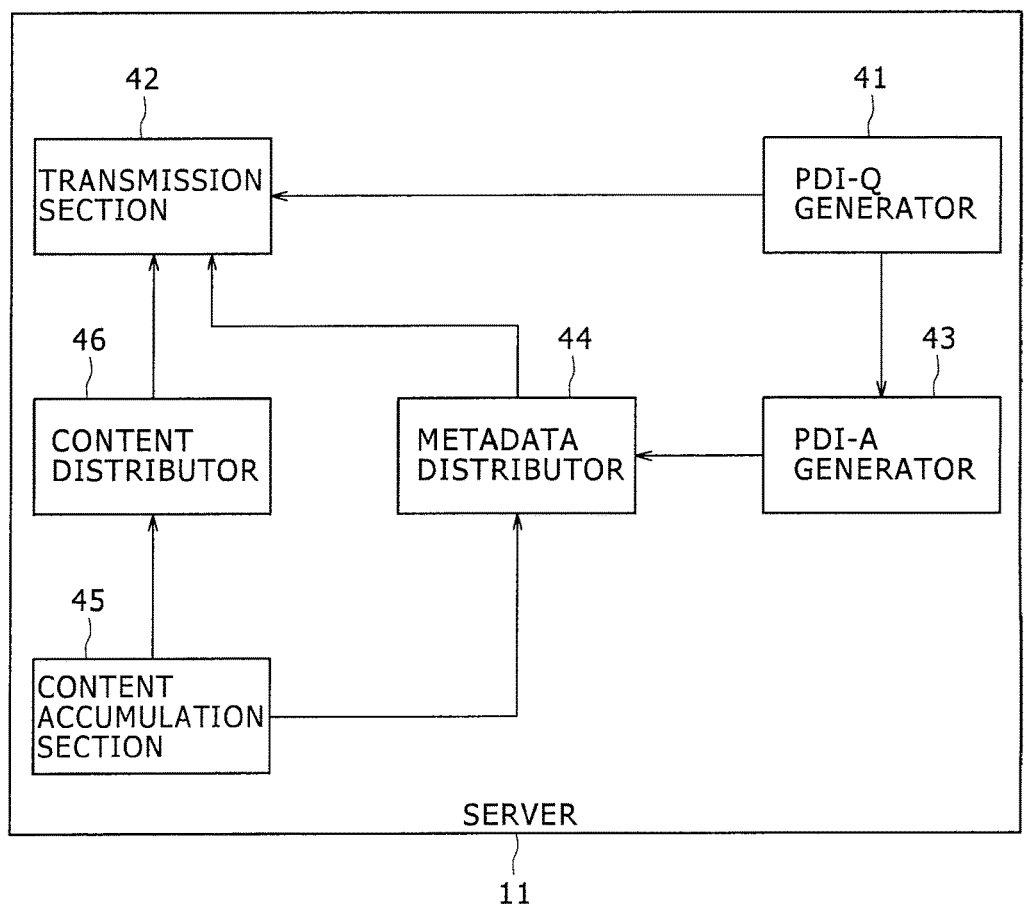
FIG. 3 is a block diagram showing a functional configuration of the server.

It is to be noted that, in the server 11 of FIG. 16, like elements having like functions to those of the elements provided in the server 11 of FIG. 3 are denoted by like terms and like reference characters and overlapping description of them is suitably omitted herein to avoid redundancy.

In particular, the server 11 of FIG. 16 is different from the server 11 of FIG. 3 in that it includes the PDI-A query generator 111 and the metadata distributor 112 in place of the PDI-A generator 43 and the metadata distributor 44.

The PDI-A query generator 111 generates, based on a PDI-Q from the PDI-Q generator 41, a PDI-A corresponding to the PDI-Q, that is, a provider side PDI-A, applies the generated provider side PDI-A to a predetermined conditional statement to generate a PDI-A query and supplies the PDI-A query to the metadata distributor 112.

The metadata distributor 112 specifies or refers to, based on the PDI-A query from the PDI-A query generator 111, a content corresponding to the PDI-A query from among contents accumulated in the content accumulation section 45. The metadata distributor 112 generates content metadata including the PDI-A query as content metadata of the specified content and transmits the generated content metadata to the client 12 through the transmission section 42.

Figure 4:
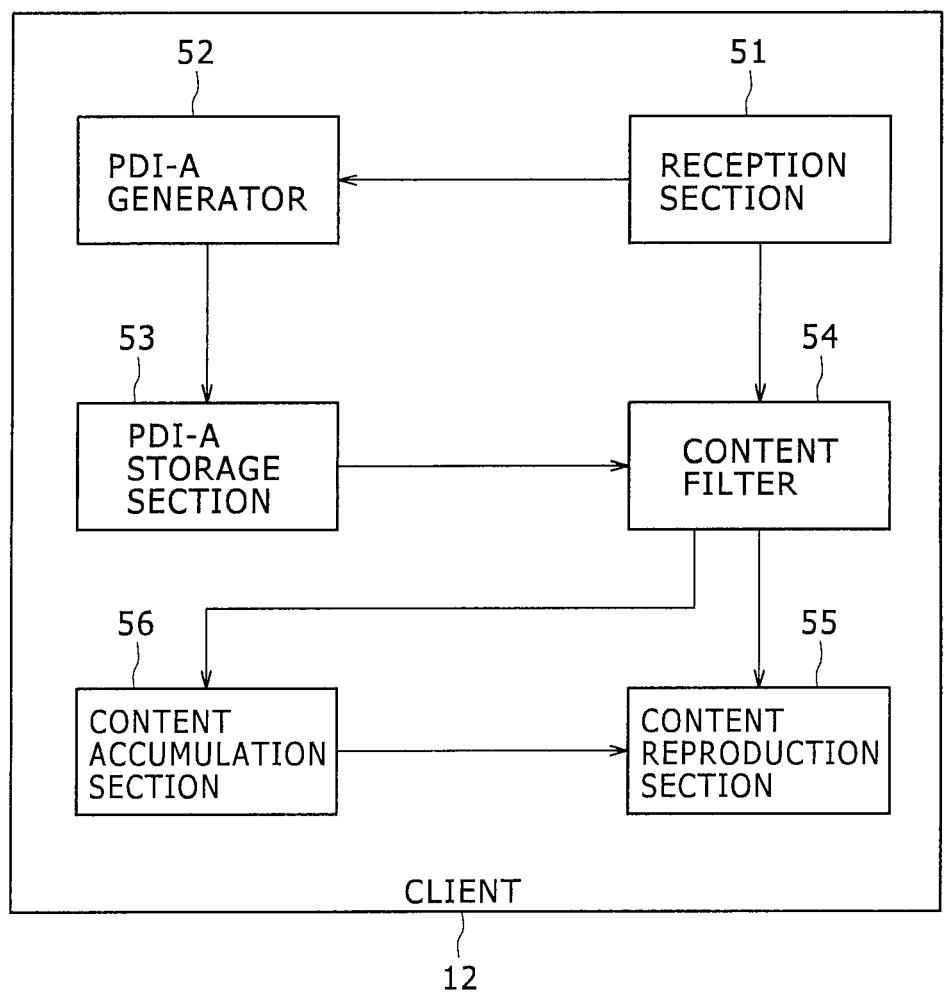
FIG. 4 is a block diagram showing an example of a functional configuration of a client.

In the client 12 in the present example, the content filter 54 shown in FIG. 4 reads out a PDI-A, that is, a user side PDI-A, from the PDI-A storage section 53, and filters the content based on the read out user side PDI-A and the PDI-A query included in the content metadata transmitted from the server 11 to the client 12. Except this, the client 12 is same as the client 12 of FIG. 4, and therefore, overlapping description of the same is omitted herein to avoid redundancy.

Now, content transmission and reception processes of the broadcasting system 10 which includes the server 11 of FIG. 16 are described with reference to a flow chart of FIG. 17.

Figure 17:
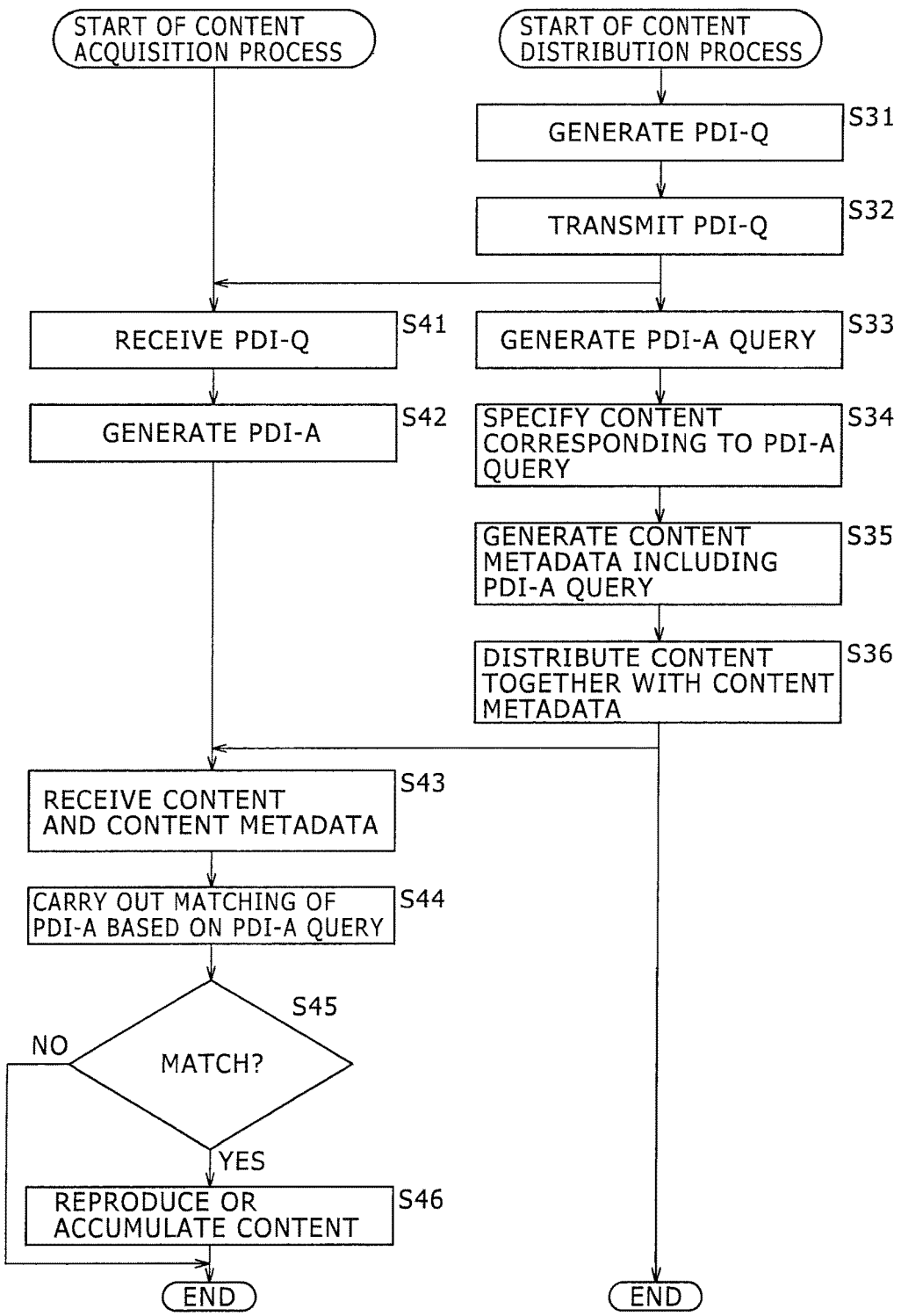
FIG. 17 is a flow chart illustrating different content transmission and reception processes in the broadcasting system which includes the server of FIG. 16.

It is to be noted that processes at steps S31, S32, S36, S41 to S43, S45 and S46 of the flow chart of FIG. 17 are basically similar to the processes at steps S11, S12, S16, S21 to S23, S25 and S26 of the flow chart of FIG. 5, respectively. Therefore, overlapping description of them is omitted herein to avoid redundancy.

In particular, at step S33, the PDI-A query generator 111 of the server 11 generates a provider side PDI-A to questions defined by the PDI-Q from the PDI-Q generator 41 and applies the generated provider side PDI-A to a predetermined conditional statement to generate a PDI-A query. Then, the PDI-A query generator 111 supplies the generated PDI-A query to the metadata distributor 112. In particular, for example, if a PDI-Q is generated by an operation of staff of a broadcasting station, that is, the provider side, then the PDI-A query generator 111 causes the display section not shown to successively display such screen images corresponding to the questions defined by the PDI-Q as described hereinabove with reference to FIGS. 8 to 12. Then, the PDI-A query generator 111 causes the staff of the broadcasting station to input or select answers to the questions and causes the staff to determine a combination of the answers, that is, a filtering condition, to generate a PDI-A query representative of the combination of the answers. At this time, the staff of the broadcasting station would input or select answers corresponding to a content to be distributed as answers to the questions defined in the PDI-Q and then determine a combination of the answers. In other words, the PDI-A query generated by the PDI-A query generator 111 represents information, that is, a combination of answers, generated by the provider side taking a liking of a user or viewer of the client 12 into consideration, for allowing the viewer to enjoy a content to be distributed later.

At step S34, the metadata distributor 112 specifies or refers to, based on the PDI-A query from the PDI-A query generator 111, a content corresponding to the PDI-A query from among the contents accumulated in the content accumulation section 45. The content specified here may be a content with regard to which the similarity between the PDI-A query from the PDI-A query generator 111 and the content metadata applied in advance to the accumulated content is higher than a predetermined value or may be a content selected in advance as a content desirable to be enjoyed by the user by the staff of the broadcasting station. It is to be noted that the content specified by the metadata distributor 112 is acquired from the content accumulation section 45 by the content distributor 46.

At step S35, the metadata distributor 112 newly generates, based on the content metadata applied in advance to the content specified at step S34 and the PDI-A query from the PDI-A query generator 111, content metadata including the PDI-A query.

Then, at step S44, the content filter 54 of the client 12 carries out matching of the PDI-A stored in PDI-A storage section 53 based on the PDI-A query included in the content metadata from the server 11.

Here, it is assumed that the PDI-A described hereinabove with reference to FIG. 13 is generated and stored as the user side PDI-A and a PDI-A query indicated below has been transmitted from the server 11.

"//QBA[id='Common:111' and a='true'] and //QSA[id='ProviderA:123' and a='Baseball']"

The PDI-A query given above indicates that the user side PDI-A evaluates whether "true" is selected as the answer to the question of "Common:111" and "Baseball" is selected as an answer to the question of "ProviderA:123."

At this time, the content filter 54 evaluates user side PDI-A based on the PDI-A query. Then, if the user side PDI-A satisfies the PDI-A query, that is, is true, then the content filter 54 decides that the user side PDI-A and the PDI-A query match with each other, but if the PDI-A query is not satisfied, that is, is false, then the content filter 54 decides that the user side PDI-A and the PDI-A query do not match with each other. In this instance, in the user side PDI-A illustrated in FIG. 13, since "true" is selected as an answer to the question of "Common:111" and besides "Baseball" is selected as an answer to the question of "ProviderA:123," it is decided that the user side PDI-A and the PDI-A query match with each other.

Since a more complicated filtering condition is represented by a PDI-A query set by the provider side in this manner, the provider side can allow a user or viewer who is expected to view a content by the provider to acquire a content.

Example 2 of the Matching Process by a Query for Evaluating a PDI-A

Now, a configuration which represents a user side PDI-A as a query to compare the user side PDI-A and a provider side PDI-A with each other is described.

Figure 18:
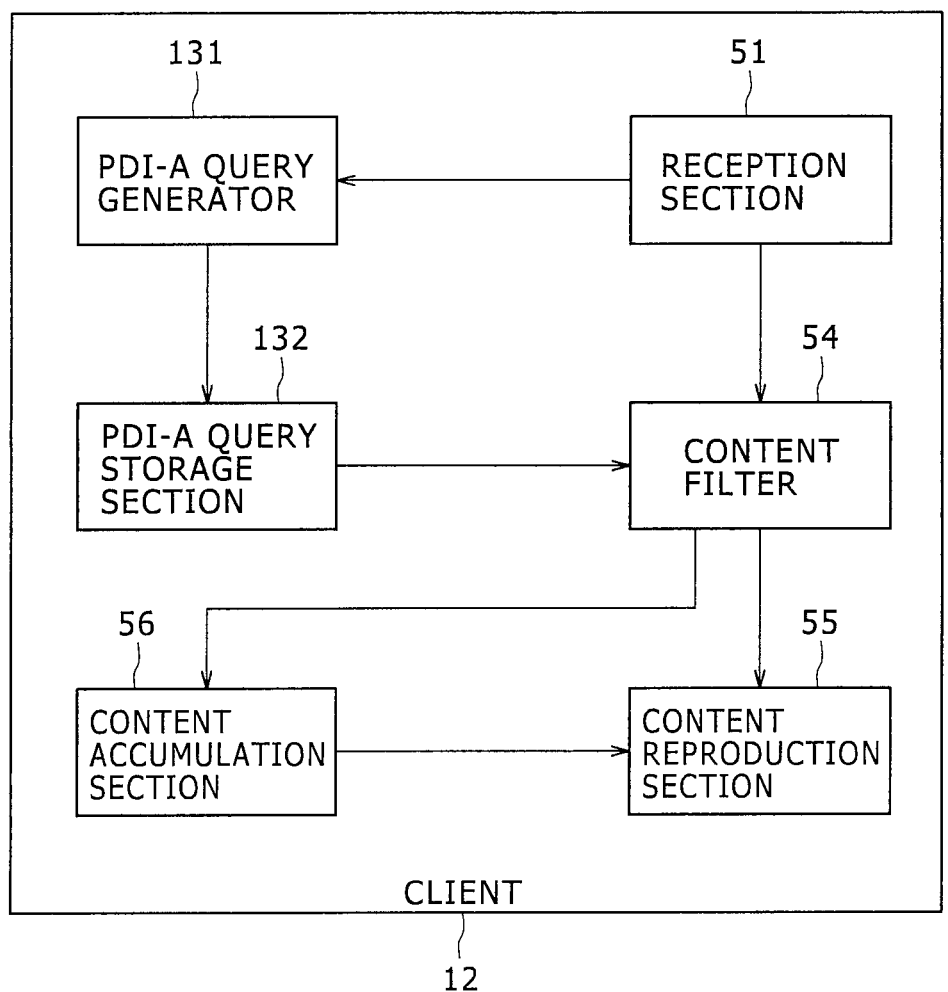
FIG. 18 is a block diagram showing another example of a functional configuration of the client.

FIG. 18 shows an example of a functional configuration of the client 12 which represents a user side PDI-A as a query.

The client 12 of FIG. 18 includes a reception section 51, a content filter 54, a content reproduction section 55, a content accumulation section 56, a PDI-A query generator 131, and a PDI-A query storage section 132.

It is to be noted that, in the client 12 of FIG. 18, like elements having like functions to those of the elements provided in the client 12 of FIG. 4 are denoted by like terms and like reference characters and overlapping description of them is suitably omitted herein to avoid redundancy.

In particular, the client 12 of FIG. 18 is different from the client 12 of FIG. 4 in that it includes the PDI-A query generator 131 and the PDI-A query storage section 132 in place of the PDI-A generator 52 and the PDI-A storage section 53.

The PDI-A query generator 131 generates, based on a PDI-Q transmitted thereto from the server 11, a PDI-A, that is, a user side PDI-A, corresponding to the PDI-Q and representative of answers of a user to questions about the liking of the user of the client 12. Then, the PDI-A query generator 131 applies the generated user side PDI-A to a predetermined conditional statement to generate a PDI-A query and supplies the generated PDI-A query to the PDI-A query storage section 132.

The PDI-A query storage section 132 stores the PDI-A query from the PDI-A query generator 131. The PDI-A query stored in the PDI-A query storage section 132 is read out suitably into the content filter 54.

It is to be noted that the content filter 54 of FIG. 18 reads out the PDI-A query from the PDI-A storage section 53 and filters the content based on the read out PDI-A query and the provider side PDI-A included in the content metadata transmitted thereto from the server 11.

The server 11 in the present example is same as the server 11 shown in FIG. 3, and therefore, overlapping description thereof is omitted herein to avoid redundancy.

Now, content transmission and reception processes of the broadcasting system 10 which includes the client 12 of FIG. 18 are described with reference to a flow chart of FIG. 19.

Figure 19:
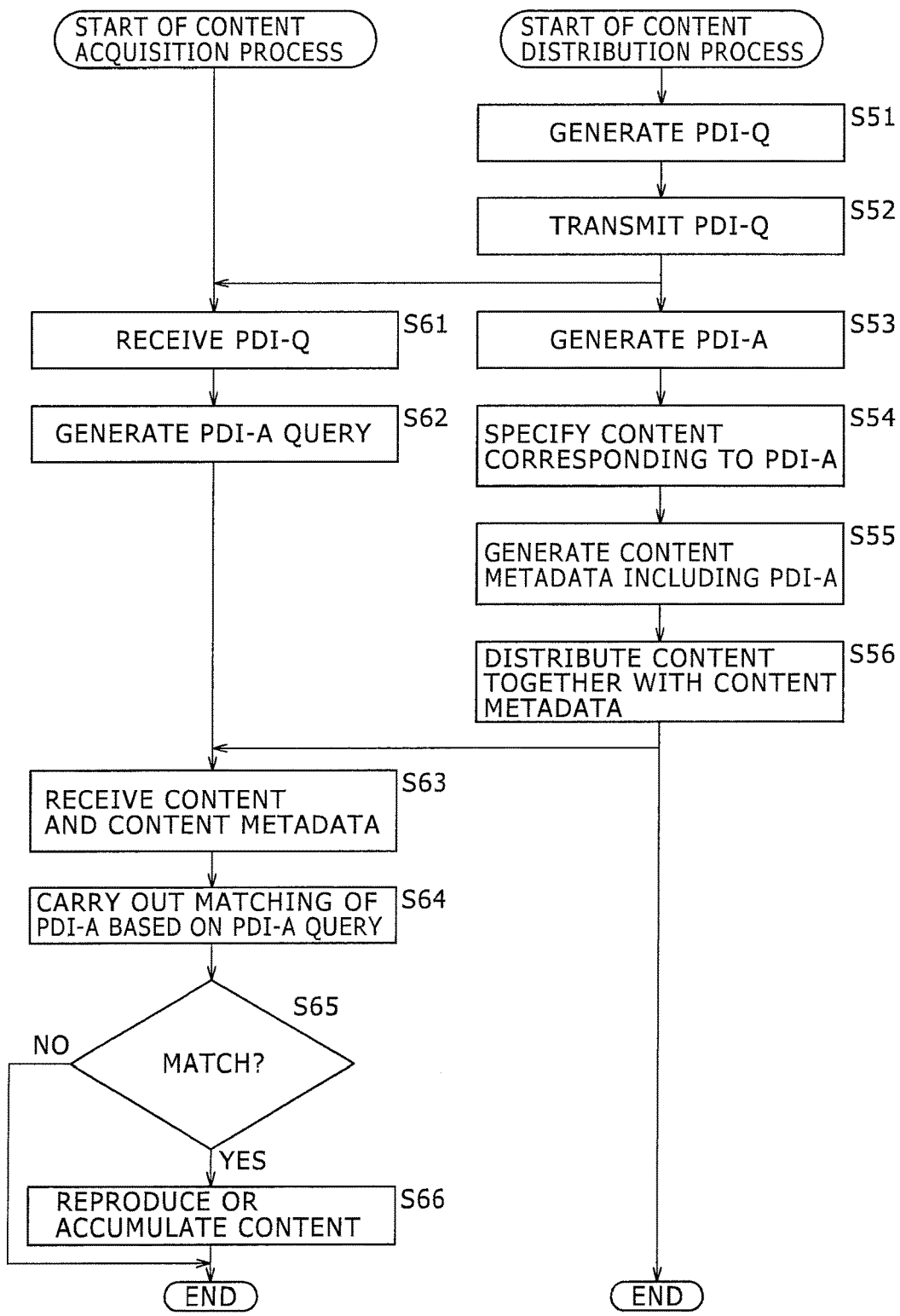
FIG. 19 is a flow chart illustrating content transmission and reception processes in the broadcasting system of FIG. 1 which includes the client of FIG. 18.

It is to be noted that processes at steps S51 to S61, S63, S65 and S66 of the flow chart of FIG. 19 are basically similar to the processes at steps S11 to S21, S23, S25 and S26, respectively, and therefore, overlapping description of them is omitted herein to avoid redundancy.

In particular, at step S62, the PDI-A query generator 131 of the client 12 generates a user side PDI-A to questions defined in a PDI-Q received by the reception section 51 and applies the generated user side PDI-A to a predetermined conditional statement to generate a PDI-A query. In particular, for example, when a PDI-Q is received from a broadcasting station, the PDI-A query generator 131 causes the display section not shown to display such screen images which correspond to the question defined in the PDI-Q as described hereinabove with reference to FIGS. 8 to 12. Then, the PDI-A query generator 131 causes the user or viewer of the client 12 to input or select answers to the questions and causes the user to determine a combination or filtering condition of the answers to generate a PDI-A query representative of the combination of the answers. In other words, the PDI-A query generator 131 interacts with the user to generate a PDI-A query representative of the combination of answers to the questions defined by the PDI-Q.

Then at step S64, the content filter 54 carries out matching of the provider side PDI-A included in the content metadata from the server 11 based on the PDI-A query stored in the PDI-A query storage section 132.

Here, it is assumed that the PDI-A described hereinabove with reference to FIG. 14 is transmitted as the provider side PDI-A from the server 11 and a PDI-A query given below is generated and stored.

"//QBA[id='Common:111' and a='false'] and //QSA [id='ProviderA:123' and a='Baseball']"

The PDI-A query given above indicates that the provider side PDI-A evaluates whether "false" is selected as the answer to the question of "Common:111" and "Baseball" is selected as an answer to the question of "ProviderA:123."

At this time, the content filter 54 evaluates the provider side PDI-A based on the PDI-A query. Then, if the provider side PDI-A satisfies the PDI-A query, that is, is true, then the content filter 54 decides that the provider side PDI-A and the PDI-A query match with each other, but if the PDI-A query is not satisfied, that is, is false, then the content filter 54 decides that the provider side PDI-A and the PDI-A query do not match with each other. In this instance, in the provider side PDI-A illustrated in FIG. 14, since "false" is selected as an answer to the question of "Common:111" and besides "Baseball" is selected as an answer to the question of "ProviderA:123," it is decided that the provider side PDI-A and the PDI-A query match with each other.

Since a more complicated filtering condition is represented by a PDI-A query set by the user side in this manner, it is possible to allow the user side to acquire a content expected thereby with a higher degree of certainty.

Incidentally, although the present invention can be applied to a broadcasting system which broadcasts a digital television program, as an example, the present invention can be applied to a broadcasting system which broadcasts in accordance with the ATSC-M/H (Mobile/Handheld) method which is an expanded method of the ATSC (Advanced Television Standard Committee) method to mobile communication.

Figure 20:
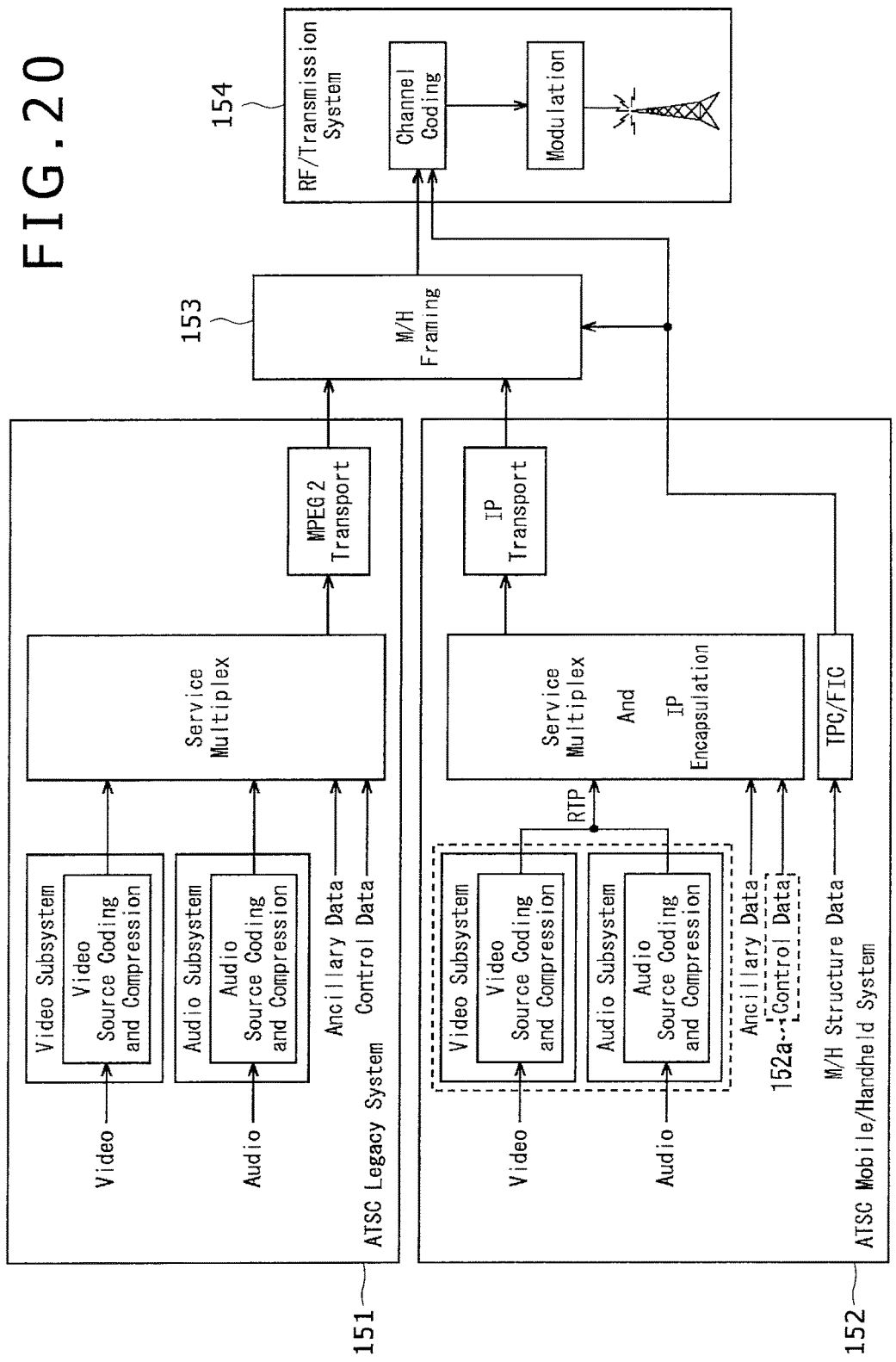
FIG. 20 is a block diagram showing an example of a broadcasting system for broadcasting by an ATSC-M/H method to which the present invention is applied.

Application Example to a Broadcasting System Which Broadcasts by the ATSC-M/H Method FIG. 20 shows an example of a configuration of a broadcasting system which broadcasts digital television programs of the ATSC method and the ATSC-M/H method in related arts.

The broadcasting system of FIG. 20 corresponds to the server 11 of the broadcasting system 10 of FIG. 1 and includes an ATSC Legacy System 151, an ATSC M/H System 152, an M/H Framing 153 and an RF/Transmission System 154.

The ATSC Legacy System 151 signals a broadcasting stream in the form of an MPEG2-TS (Moving Picture Experts Group 2 Transport Stream) in accordance with the ATSC method in related arts. The ATSC M/H System 152 signals a broadcasting stream of IP packets in accordance with the ATSC-M/H method. Control Data 152a of the ATSC M/H System 152 is control information regarding a broadcasting stream (A/V (Audio/Video) content) to be signaled from the ATSC M/H System 152.

Broadcasting streams described above are multiplexed by the M/H Framing 153 and transmitted as a carrier by the RF/Transmission System 154. It is to be noted that description of details of functions of blocks mentioned is omitted herein because they are described in the ATSC standards.

Figure 21:
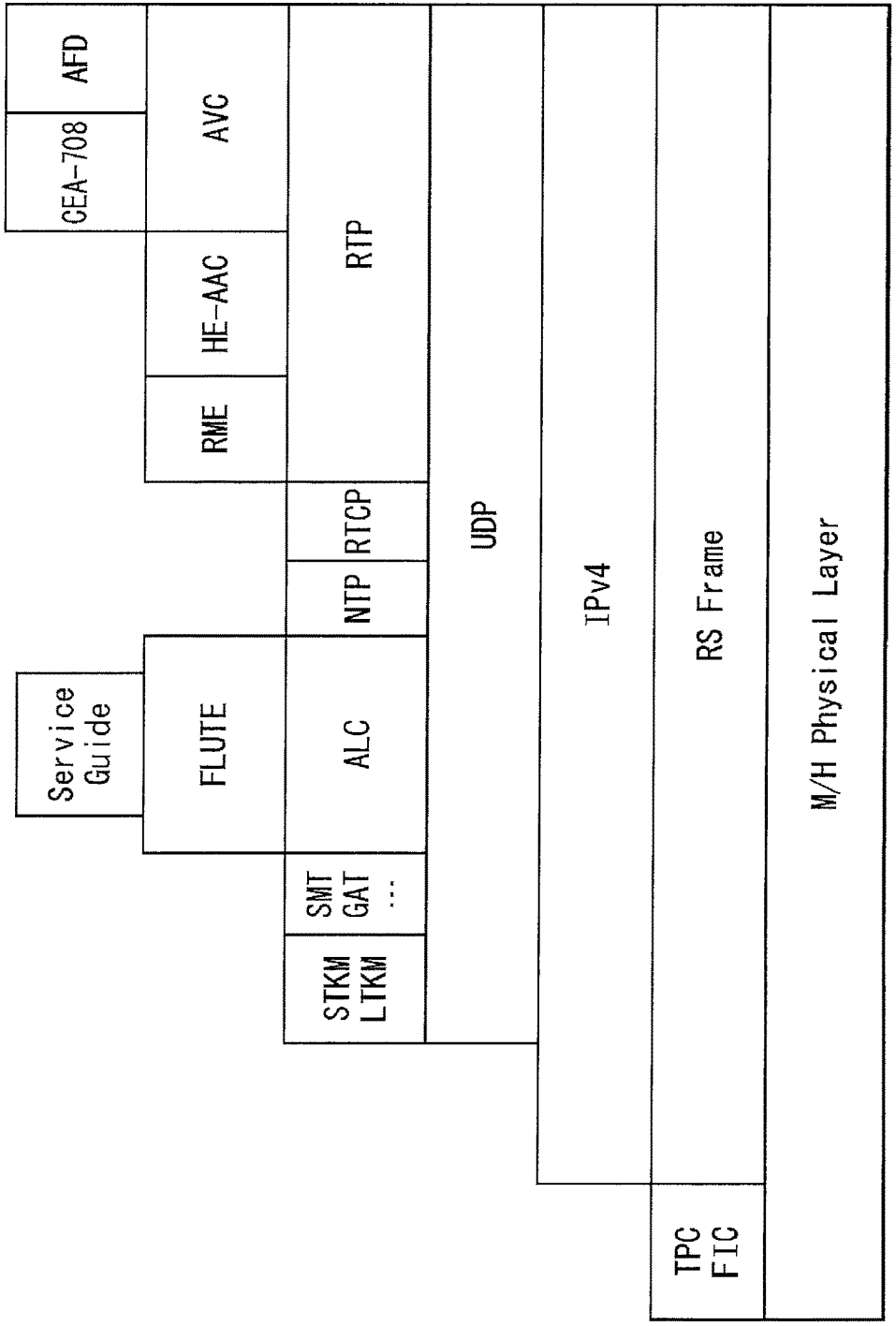
FIG. 21 is a diagrammatic view illustrating a protocol stack of a signal of a carrier transmitted by ATSC-M/H method.

FIG. 21 illustrates a protocol stack of a signal of a broadcasting wave transmitted in accordance with the ATSC-M/H method.

Although detailed description is omitted, one of the highest hierarchies is "Service Guide" and prescribes metadata of a content to be provided in accordance with the ATSC-M/H method. The Control Data 152a illustrated in FIG. 20 is transmitted as content metadata (hereinafter referred to merely as Service Guide) prescribed by "Service Guide." In particular, in the broadcasting system of FIG. 20, a PDI-A, that is, a provider side PDI-A, a PDI-A query or a PDI-Q transmitted from the server 11 to the client 12 in the broadcasting system 10 described hereinabove is placed in and transmitted together with the Service Guide.

It is to be noted that a lower hierarchy "FLUTE" adjacent to the "Service Guide" and a lower hierarchy "ALC" adjacent to the "FLUTE" are hierarchies for transferring the Service Guide packetized in accordance with the UDP/IP (User Datagram Protocol/Internet Protocol).

Figure 22:
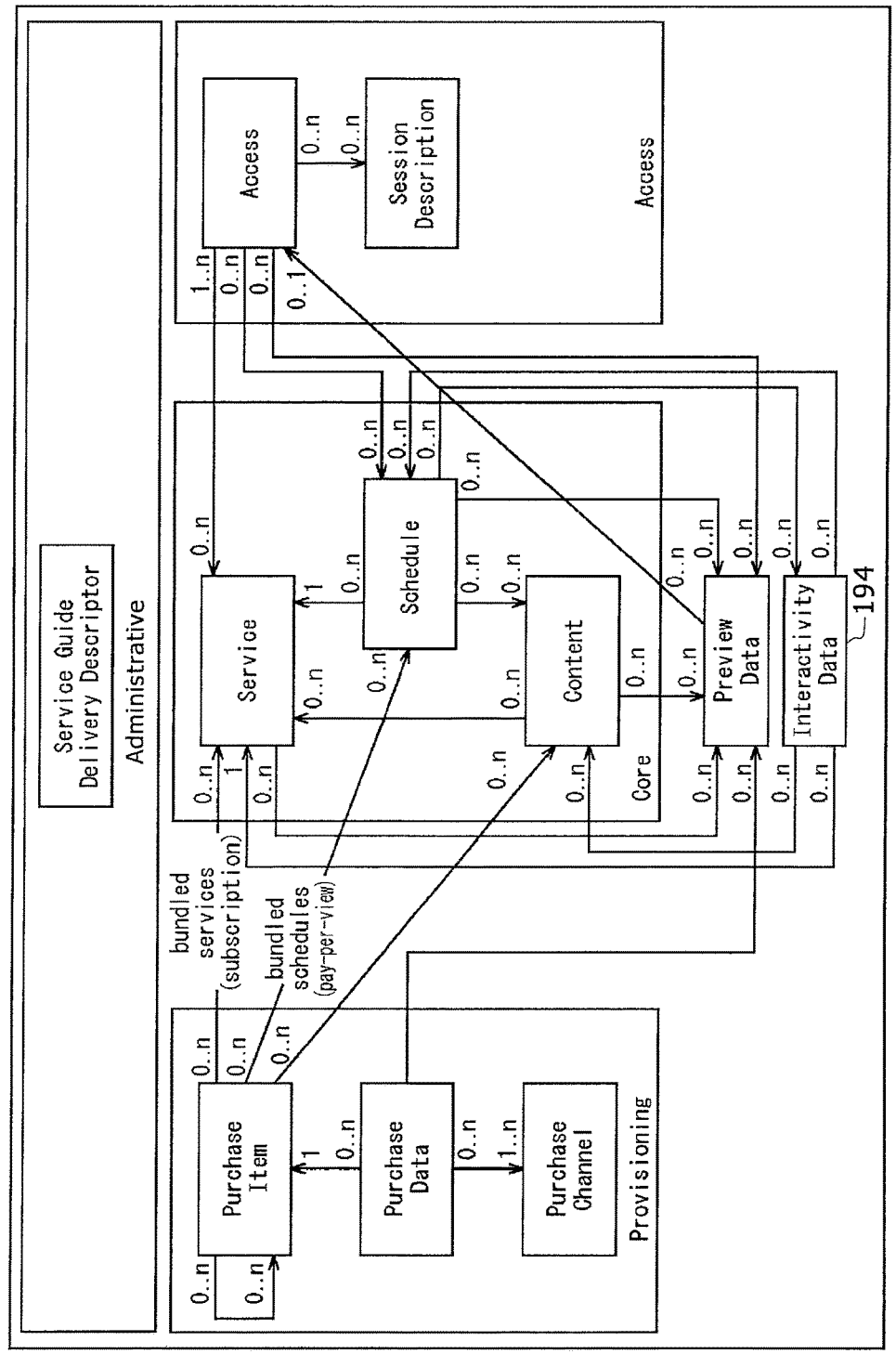
FIG. 22 is a block diagram illustrating a data configuration of Service Guide.

As specifications of the Service Guide, a data configuration illustrated in FIG. 22 is prescribed by the OMA (Open Mobile Alliance). It is to be noted that description of details of the configuration of the Service Guide illustrated in FIG. 22 is omitted herein because it is prescribed in "'Service Guide for Mobile Broadcast Services,' Open Mobile Alliance, OMA-TSBCAST_ServiceGuide-V1_0, Candidate Version 1.0."

The PDI-A, that is, the provider side PDI-A, or PDI-A query, is placed into at least one of a "Service" fragment, a "Schedule" fragment and a "Content" fragment among components of the Service Guide illustrated in FIG. 22.

The "Service" fragment is metadata including control information regarding the substance of a channel service, and FIG. 23 illustrates details of a configuration of the "Service" fragment. A PDI-A or a PDI-A query is placed into a "PrivateExt" element prescribed on the lowest stage of the "Service" fragment illustrated in FIG. 23 by newly adding a "PDI-A" element to the "PrivateExt" element. More particularly, for example, the "PDI-A" element is represented by a character string as <xs:element name="PDI-A"

type="xs:string" xmlns:xs="http://www.w3.org/2001/XMLschema"/> in accordance with the XML schema and is then encoded.

The "Schedule" fragment is metadata including control information regarding a distribution schedule of a content, that is, a digital television program, and FIG. 24 illustrates details of a configuration of the "Schedule" fragment. A PDI-A or a PDI-A query is placed into a "PrivateExt" element prescribed on the lowest stage of the "Schedule" fragment illustrated in FIG. 24 by newly adding a "PDI-A" element to the "PrivateExt" element. More particularly, for example, the "PDI-A" element is represented by a character string as <xs:element name="PDI-A" type="xs:string" xmlns:xs="http://www.w3.org/2001/XMLschema"/> in accordance with the XML schema and is then encoded.

The "Content" fragment is metadata including control information regarding the substance of a content, that is, a digital television program, and FIG. 25 illustrates details of a configuration of the "Content" fragment. A PDI-A or a PDI-A query is placed into a "PrivateExt" element prescribed on the lowest stage of the "Content" fragment illustrated in FIG. 25 by newly adding a "PDI-A" element to the "PrivateExt" element. More particularly, for example, the "PDI-A" element is represented by a character string as <xs:element name="PDI-A" type="xs:string" xmlns:xs="http://www.w3.org/2001/XMLschema"/> in accordance with the XML schema and is then encoded.

Meanwhile, the PDI-Q is placed into "Interactivity Data" from among the components of the Service Guide illustrated in FIG. 22.

Figure 26:
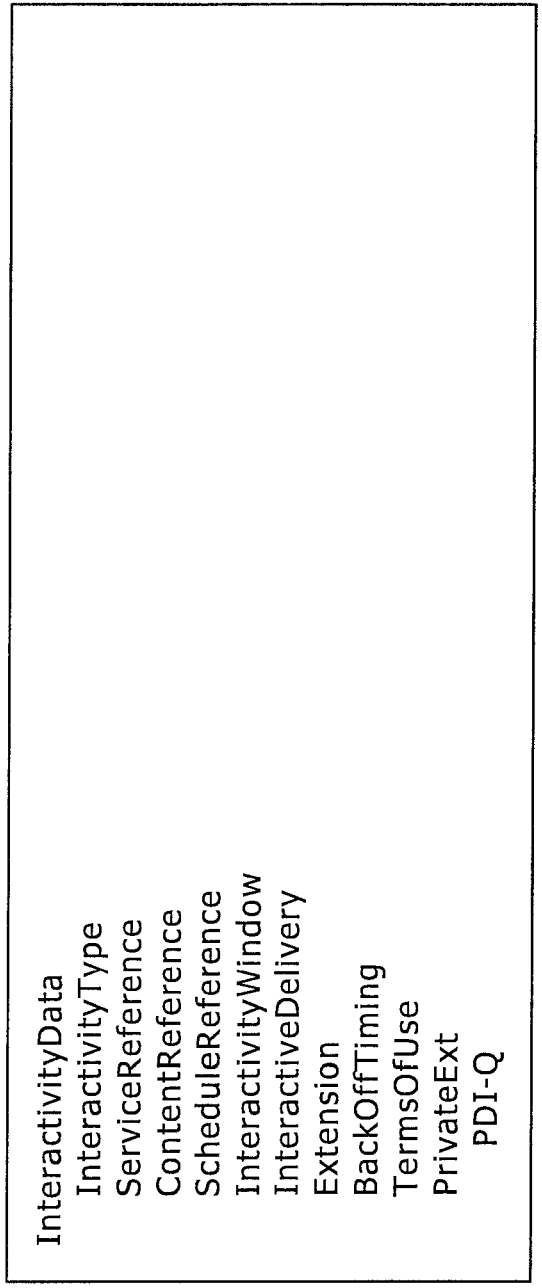
FIG. 26 is a view illustrating a configuration of an Interactivity Data fragment.

The "Interactivity Data" fragment is metadata regarding an application regarding a channel service or a content, that is, a digital television program, and FIG. 26 illustrates details of a configuration of "Interactivity Data" fragment. A PDI-Q is placed into a "PrivateExt" element prescribed on the lowest stage of the "Interactivity Data" fragment illustrated in FIG. 26 by newly adding a "PDI-Q" element to the "PrivateExt" element. More particularly, the "PDI-Q" element is represented by a character string as <xs:element name="PDI-Q" type="xs:string" xmlns:xs="http://www.w3.org/2001/XMLschema"/> in accordance with the XML schema and is then encoded.

While the foregoing description relates to an example wherein the present invention is applied to a broadcasting system which broadcasts in accordance with the ATSC-M/H method, the present invention can be applied also to a broadcasting system which carries out NRT (Non-Real Time) broadcasting in accordance with the ATSC system in related arts. Since the NRT broadcasting does not assume viewing of a content on the real time basis, there is no necessity to reproduce a content in synchronism with the broadcasting time of the content broadcast as data in the form of a broadcasting signal.

Application Example to a Broadcasting System which Carries Out NRT Broadcasting

Figure 27:
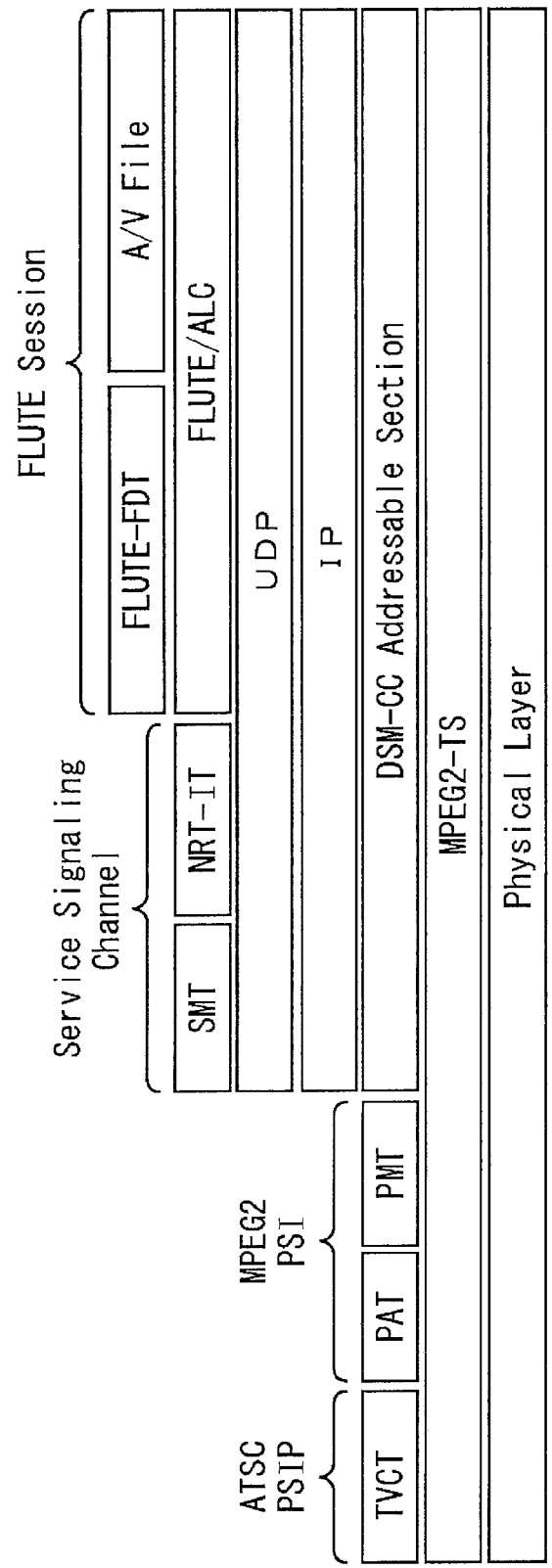
FIG. 27 is a diagrammatic view illustrating a protocol stack of a signal of a carrier transmitted by NRT broadcasting.

FIG. 27 illustrates a protocol stack of a signal of a broadcasting wave transmitted by NRT broadcasting.

Although detailed description is omitted, the lowermost layer is "Physical Layer" and corresponds to a frequency band of a broadcasting wave. An upper layer adjacent to the "Physical Layer" is "MPEG2-TS" and corresponds to a broadcasting stream broadcast as a broadcasting wave.

"ATSC-PSIP (Program and System Information Protocol)" and "MPEG2-PSI (Program Specific Information)" are illustrated as higher layers adjacent to "MPEG2-TS." "ATSC-PSIP" is a layer having TVCT, and "MPEG2-PSI" is a layer having PAT (Program Association Table) and PMT (Program Map Table).

Meanwhile, "DSM-CC (Digital Storage Media Command and Control) Addressable Section" indicated as an upper layer adjacent to "MPEG2-TS." "DSM-CC Addressable Section" is used as an adaptation layer for transferring an IP packet on MPEG2-TS of a broadcasting stream.

Figure 28:
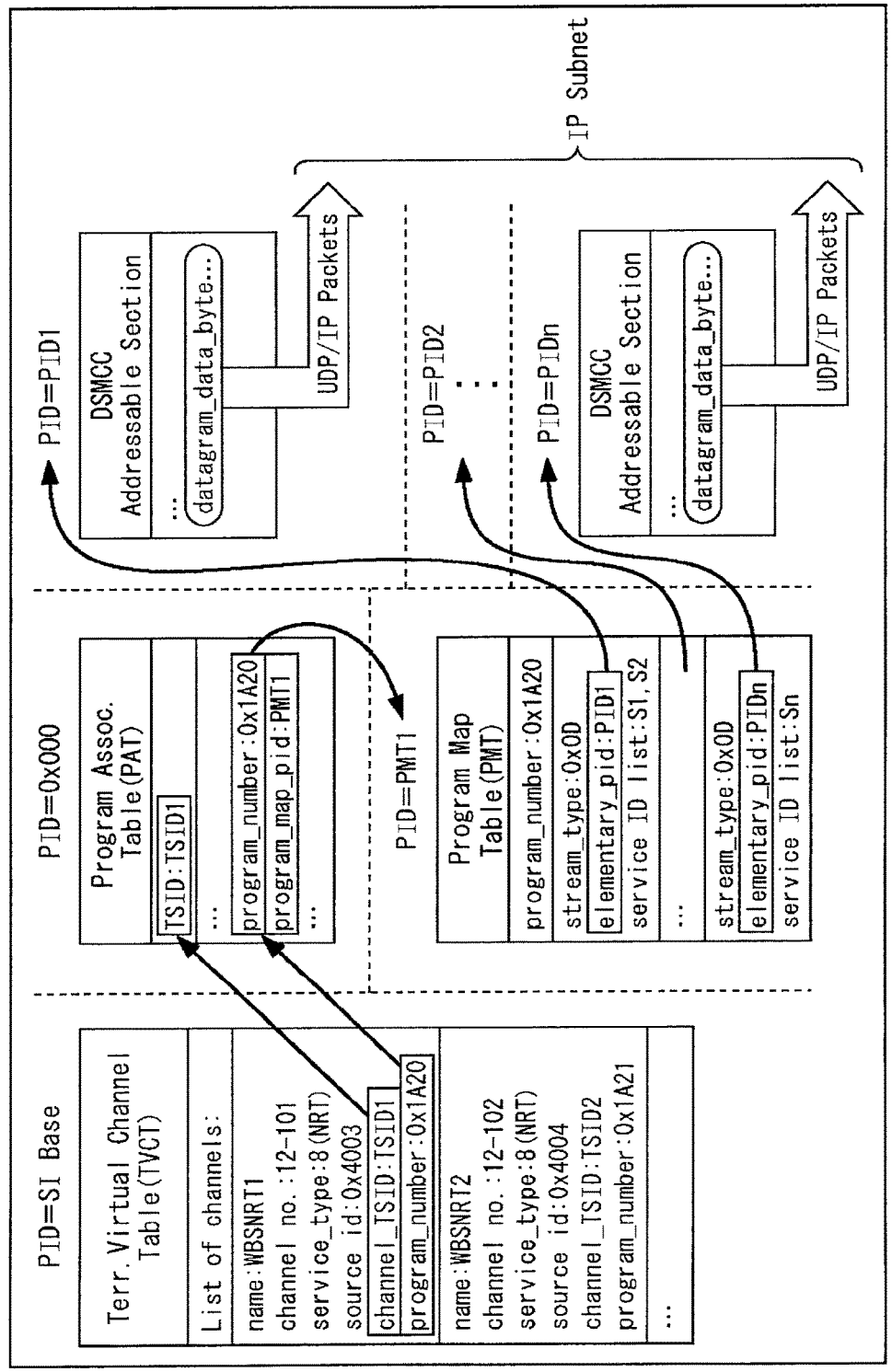
FIG. 28 is a diagrammatic view illustrating a data structure of TVCT, PAT, PMT and DSM-CC Addressable Section.

FIG. 28 illustrates a data structure of TVCT, PAT, PMT and DSM-CC Addressable Section. In TVCT, control information regarding a broadcasting stream to be broadcast by MPEG2-TS is described, and an MPEG2-TS by which DSM-CC Addressable Section for transferring an IP packet stream (UDP/IP Packet) is specified based on TVCT.

Referring back to FIG. 27, "IP" is indicated as an upper layer adjacent to "DSM-CC Addressable Section," and "UDP" is indicated as a further higher layer adjacent to "IP."

"Service Signaling Channel" and "FLUTE/ALC (File Delivery over Unidirectional Transport/Asynchronous Layered Coding Protocol)" are indicated as higher layers adjacent to "UDP." "Service Signaling Channel" is a layer having SMT (Service Map Table) and NRT-IT (NRT Information Table). "FLUTE Session" is indicated as a higher layer adjacent to "FLUTE/ALC." "FLUTE Session" is a layer having FLUTE-FDT (File Delivery Table) and A/V File.

Figure 29:
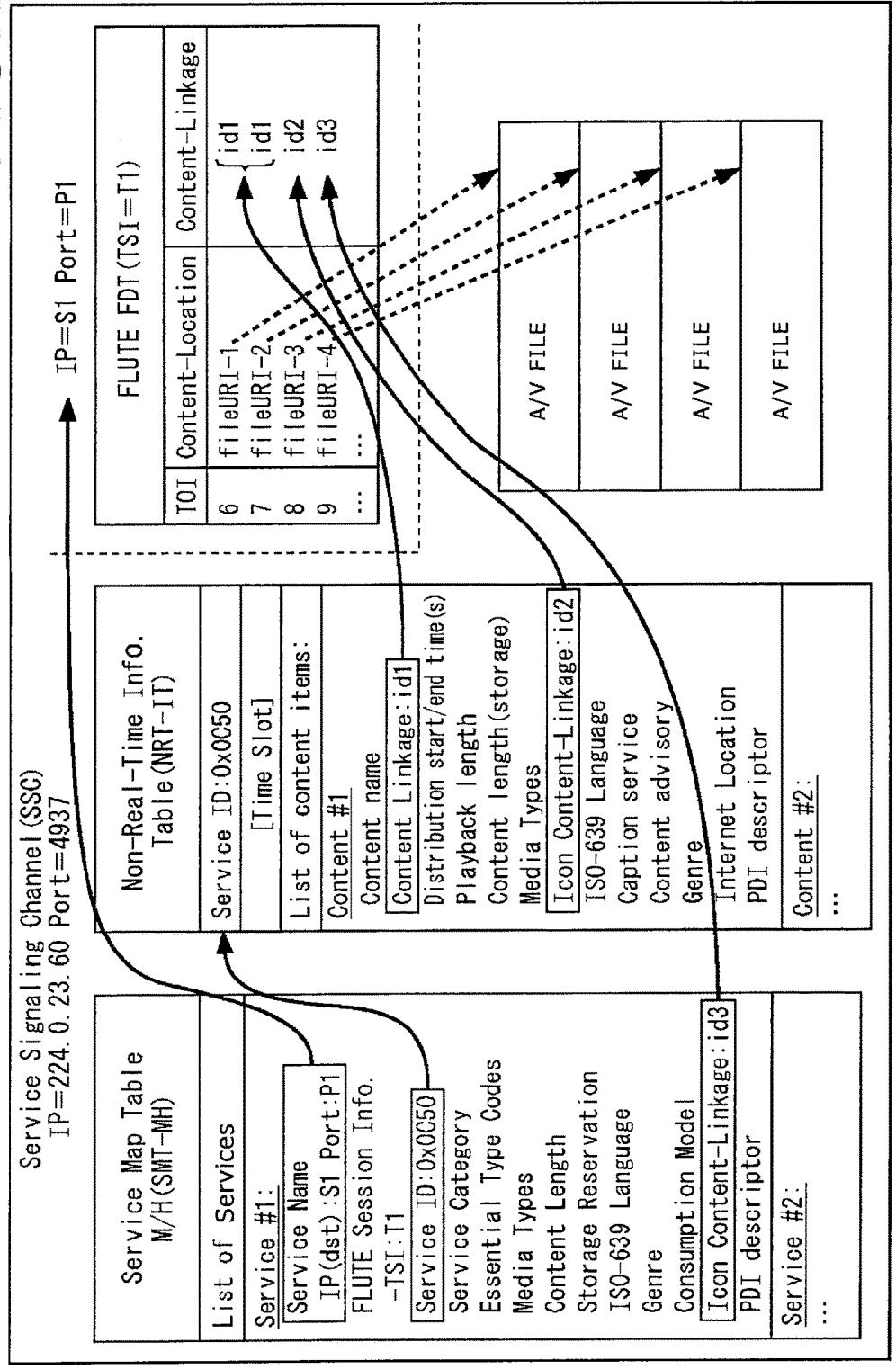
FIG. 29 is a diagrammatic view illustrating a data structure of SMT, NRT-IT and FLUTE FDT.

FIG. 29 illustrates a data structure of SMT, NRT-IT and FLUTE FDT. SMT describes metadata regarding a channel, and NRT-IT described metadata regarding a content. SMT and NRT-IT are transferred by "Service Signaling Channel" described hereinabove. FLUTE EDT describes information for identifying A/V files. It is to be noted that an A/V file is transferred by "FLUTE/ALC."

Here, in a broadcasting system which carries out NRT broadcasting, a PDI-A, that is, a provider side PDI-A, a PDI-A query or a PDI-Q to be transmitted from the server 11 to the client 12 in the broadcasting system 10 described hereinabove is placed into and transmitted together with SMT or NRT-IT.

In particular, in the case where filtering of a content to be distributed carried out in a unit of a channel or broadcasting station, "PDI descriptor" into which the PDI-A, PDI-A query or PDI-Q is to be placed is prescribed newly in the descriptor loop ("Service #1" in FIG. 29) of the service level of SMT.

On the other hand, in the case where filtering of a content to be distributed is carried out in a unit of a content, "PDI descriptor" into which the PDI-A, PDI-A query or PDI-Q is to be placed is prescribed newly in descriptor loop ("Content #1" in FIG. 29) of the service level of NRT-IT.

FIG. 30 illustrates an example of the syntax of "PDI descriptor." In FIG. 30, each of descriptors to be described is defined together with a bit number (No. of Bits) and a format (Format).

According to the syntax illustrated in FIG. 30, a PDI-A, a PDI-A query or a PDI-Q is described in a descriptor of variable bits, that is, in "PDI_Q or PDI_A or PDI_A Query."

It is to be noted that the syntax of "PDI descriptor" is not limited to the example illustrated in FIG. 30.

In this manner, the present invention can be applied also to a broadcasting system which carries out NRT broadcasting.

It is to be noted that naturally the present invention may be applied also to a broadcasting system which broadcasts in accordance with the ATSC-M/H method described hereinabove and a broadcasting system which carries out NRT broadcasting in accordance with a method other than an existing broadcasting system.

Incidentally, in the broadcasting system 10 described above, the client 12 interacts with a user through screen image display corresponding to questions defined in a PDI-Q from the server 11 to generate user side PDI-A. If questions set or generated on the provider side have simple substance, then the client 12 can interact with the user through the screen image display described hereinabove with reference to FIGS. 8 to 12. However, a question set by the provider side has the substance which requires high interactivity such as, for example, the substance which involves complicated conditional branching by selection of the user, there is possibility that sufficient interaction with the user may not be carried out with such screen image display as described hereinabove with reference to FIGS. 8 to 12. In such a case, since a PDI-A which reflects the liking of the user with a high degree of accuracy cannot be generated, an accurate filtering condition cannot be obtained. As a result, a content which satisfies needs in this instance cannot be acquired.

Therefore, in the following, embodiments regarding a broadcasting system which can sufficiently carry out interaction with a user even if a question set by the provider side has the substance which requires a high degree of interactivity are described.

2. Second Embodiment

Example of the Functional Configuration of the Server

First, an example of a functional configuration of the server 11 in the broadcasting system 10 which executes a script to carry out an interaction with a user is described with reference to FIG. 31.

Figure 31:
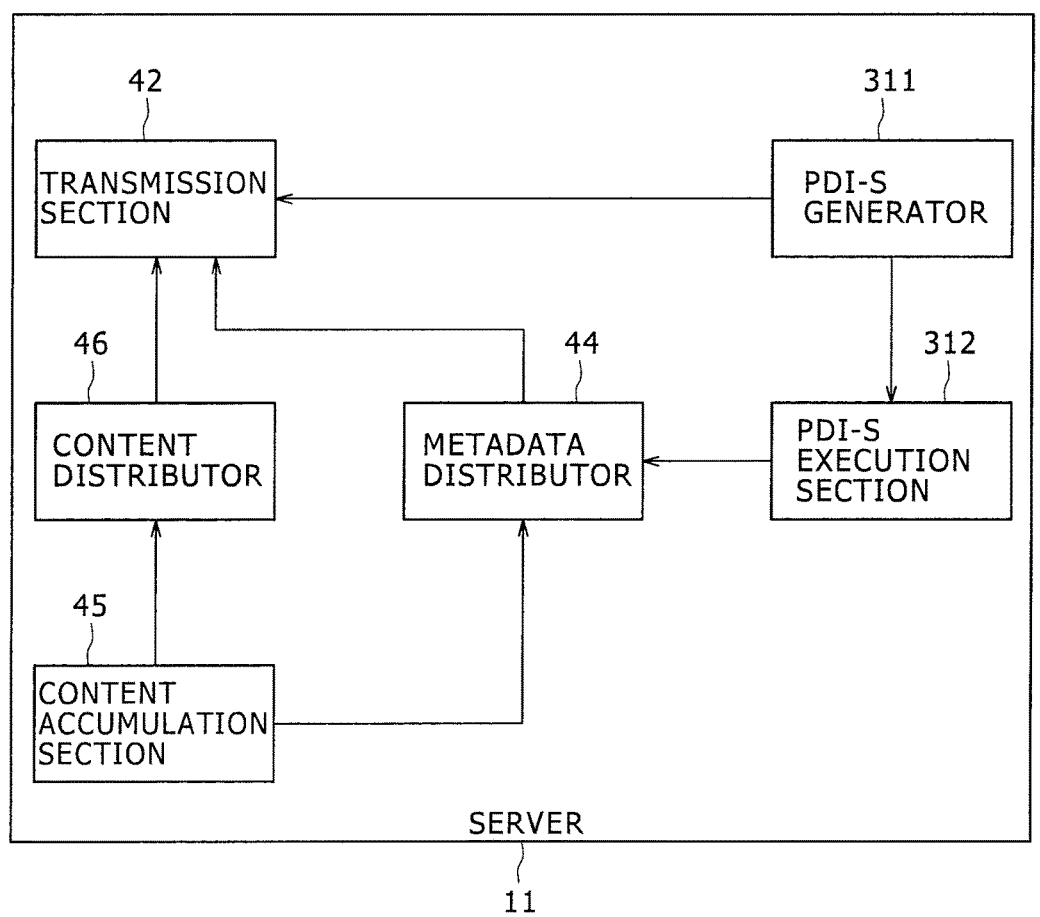
FIG. 31 is a block diagram showing an example of a functional configuration of a server according to a second embodiment of the present invention.

The server 11 of FIG. 31 includes a transmission section 42, a metadata distributor 44, a content accumulation section 45, a content distributor 46, a PDI-S generator 311 and a PDI-S execution section 312.

It is to be noted that, in the server 11 of FIG. 31, like elements having like functions to those of elements provided in the server 11 of FIG. 3 are denoted by like terms and like reference characters and overlapping description of them is suitably omitted herein to avoid redundancy.

In particular, the server 11 of FIG. 31 is different from the server 11 of FIG. 3 in that it includes the PDI-S generator 311 and the PDI-S execution section 312 in place of the PDI-Q generator 41 and the PDI-A generator 43.

The PDI-S generator 311 generates a PDI-S (Preference Demographic and Interest-Script) which is a script for obtaining a user side PDI-A representative of answers of a user or viewer of the client 12 to questions regarding the liking of the user. Then, the PDI-S generator 311 transmits the generated PDI-S to the client 12 through the transmission section 42 and supplies the PDI-S to the PDI-S execution section 312. The PDI-S includes a Web browser, other applications and so forth.

The PDI-S execution section 312 executes the PDI-S from the PDI-S generator 311 to generate a provider side PDI-A representative of an answer set by the provider side to the questions regarding the liking of the user of the client 12, and supplies the generated provider side PDI-A to the metadata distributor 44.

Example of the Functional Configuration of the Client

Now, an example of a functional configuration of the client 12 in the broadcasting system 10 wherein a script is executed to carry out an interaction with the user is described with reference to FIG. 32.

Figure 32:
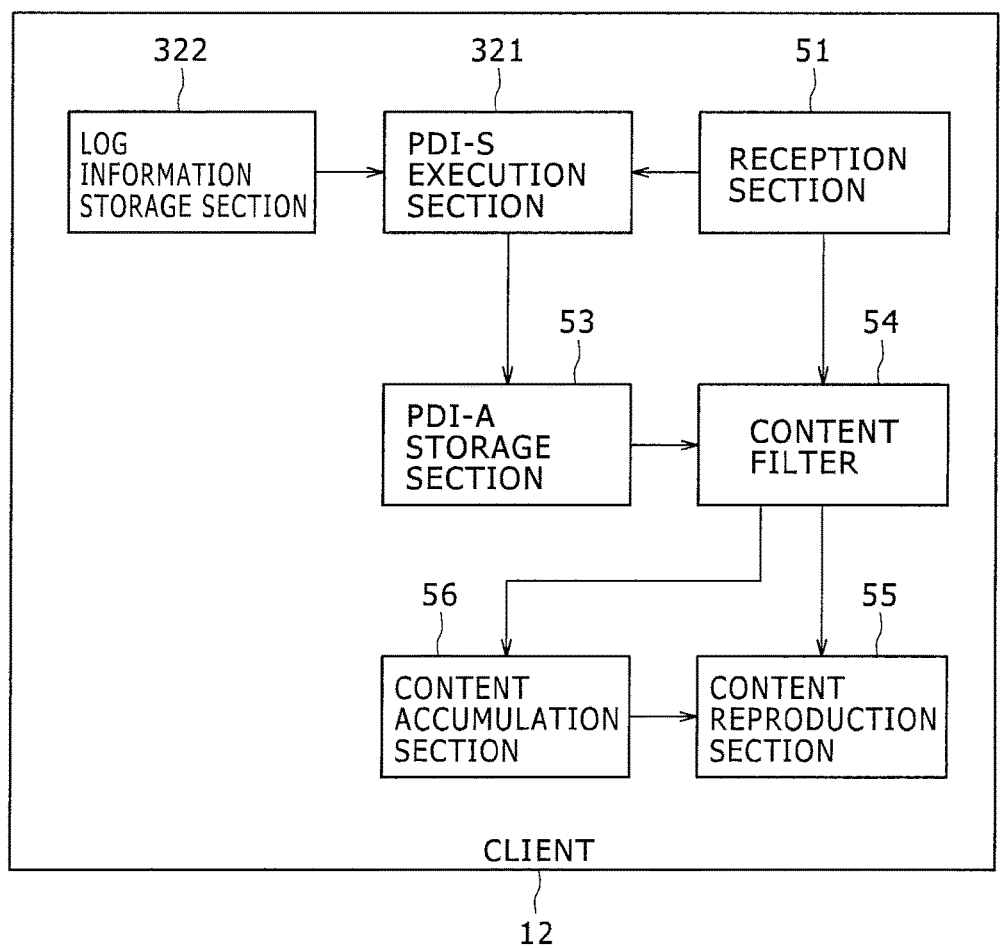
FIG. 32 is a block diagram showing an example of a functional configuration of a client according to the second embodiment of the present invention.

The client 12 of FIG. 32 includes a reception section 51, a PDI-A storage section 53, a content filter 54, a content reproduction section 55, a content accumulation section 56, a PDI-S execution section 321 and a log information storage section 322.

It is to be noted that, in the client 12 of FIG. 32, like elements having like functions to those of the elements provided in the client 12 of FIG. 4 are denoted by like terms and like reference characters and overlapping description of them is suitably omitted herein to avoid redundancy.

In particular, the client 12 of FIG. 32 is different from the client 12 of FIG. 4 in that the PDI-S execution section 321 is provided in place of the PDI-A generator 52 and the log information storage section 322 is provided newly.

The PDI-S execution section 321 executes the PDI-S transmitted from the server 11 to generate a user side PDI-A representative of answers of the user to questions regarding the liking of the user of the client 12, and supplies the generated user side PDI-A to the PDI-A storage section 53. The PDI-S execution section 321 executes the PDI-S based on log information hereinafter described as occasion demands.

The log information storage section 322 has stored therein log information representative of a behavior log of the user who owns the client 12. The log information stored in the log information storage section 322 is read out to the PDI-S execution section 321 as occasion demands.

Example of the Content Transmission and Reception Processes

Content transmission and reception processes of the broadcasting system 10 configured from the server 11 of FIG. 31 and the client 12 of FIG. 32 are described below with reference to a flow chart of FIG. 33.

Figure 33:
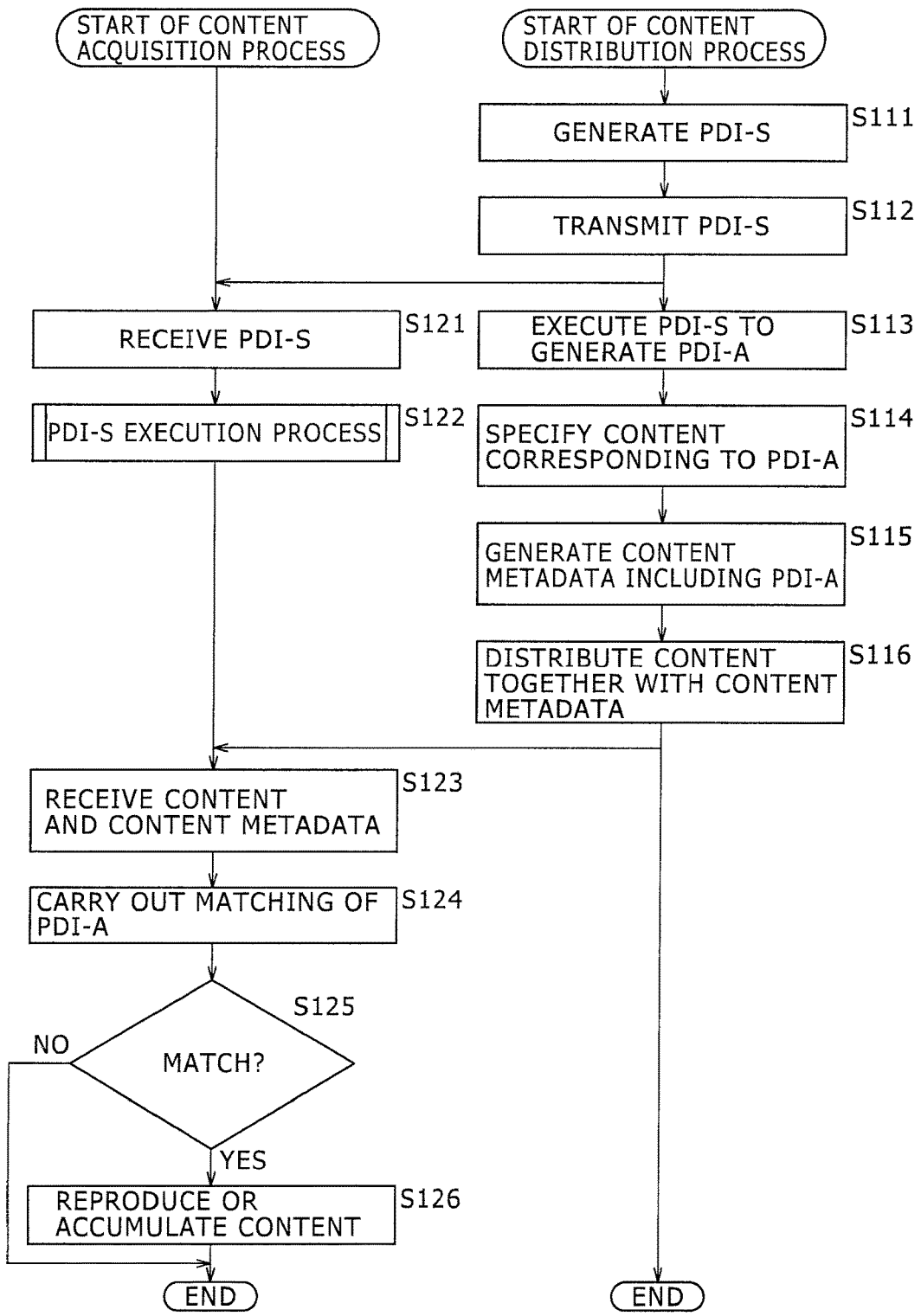
FIG. 33 is a flow chart illustrating content transmission and reception processes of the server of FIG. 31 and the client of FIG. 32.

It is to be noted that processes at steps S114 to S116 and S123 to S126 of the flow chart of FIG. 33 are basically similar to the processes at steps S14 to S16 and S23 to S26 of the flow chart of FIG. 5, respectively, and therefore, overlapping description of them is omitted herein to avoid redundancy.

In particular, if, on the provider side such as a broadcasting company, for example, a sponsor of a content to be broadcast or distributed or the broadcasting company itself issues a request for distribution of a content to viewers having a particular liking or attribute, then the PDI-S generator 311 generates a PDI-S at step S111. In particular, the PDI-S generator 311 generates, in response to an operation of staff on the provider side, a PDI-S to the user of the client 12 for obtaining a user side PDI-A representative of answers of the user to the questions regarding what liking or attribute the user has.

Another Example of the Syntax of the XML Schema

Here, another example of the syntax of the XML schema for configuring a PDI-S and a PDI-A in the present embodiment is described with reference to FIGS. 34A-34B.

It is to be noted that the first to 44th rows of the syntax illustrated in FIGS. 34A-34B are same as the first to 44th rows of the syntax illustrated in FIGS. 6A-6B, and therefore, overlapping description of them is omitted herein to avoid redundancy.

The 45th to 50th rows represent a declaration of elements of a question defined by the name of "QAA" from among the questions declared in the fifth to ninth rows, that is, by a question whose type is "AnyAnswerType." The id element indicated in the 47th row represents an ID for identifying the item of the question, and the format thereof is defined by a format "providerName:[category:]question-ID" similar to that of the provider unique filtering parameter.

In particular, a question defined by the name of "QAA," that is, a question whose type is "AnyAnswerType," and an answer to the question, are classified into the provider unique filtering parameter. It is to be noted that, since the question defined by the name of "QAA" does not limit the type of the answer, the question, that is, the q element, is not defined in the 45th to 50th rows.

Further, the answer to the question defined by the name of "QAA," that is, the a element, can have a format whose substance can be grasped only by the provider who sets the question as hereinafter described and therefore is hereinafter referred to as provider unique filtering parameter of the provider hiding format.

Referring back to the flow chart of FIG. 33, at step S112, the PDI-S generator 311 of the server 11 transmits the generated PDI-S to the client 12 through the transmission section 42 and supplies the PDI-S to the PDI-S execution section 312.

At step S121, the reception section 51 of the client 12 receives the PDI-S transmitted from the server 11 and supplies the received PDI-S to the PDI-S execution section 321.

It is to be noted that the PDI-S may be received by the client 12, for example, every time it is broadcast or transmitted after a predetermined interval of time from a broadcasting station as the provider in which the server 11 is installed. Or, the PDI-S may be received by the client 12 when the client 12 adjusts the channel to broadcasting station in which the server 11 is installed.

At step S122, the PDI-S execution section 321 of the client 12 carries out a PDI-S execution process to generate a user side PDI-A.

Example of the PDI-S Execution Process

Figure 35:
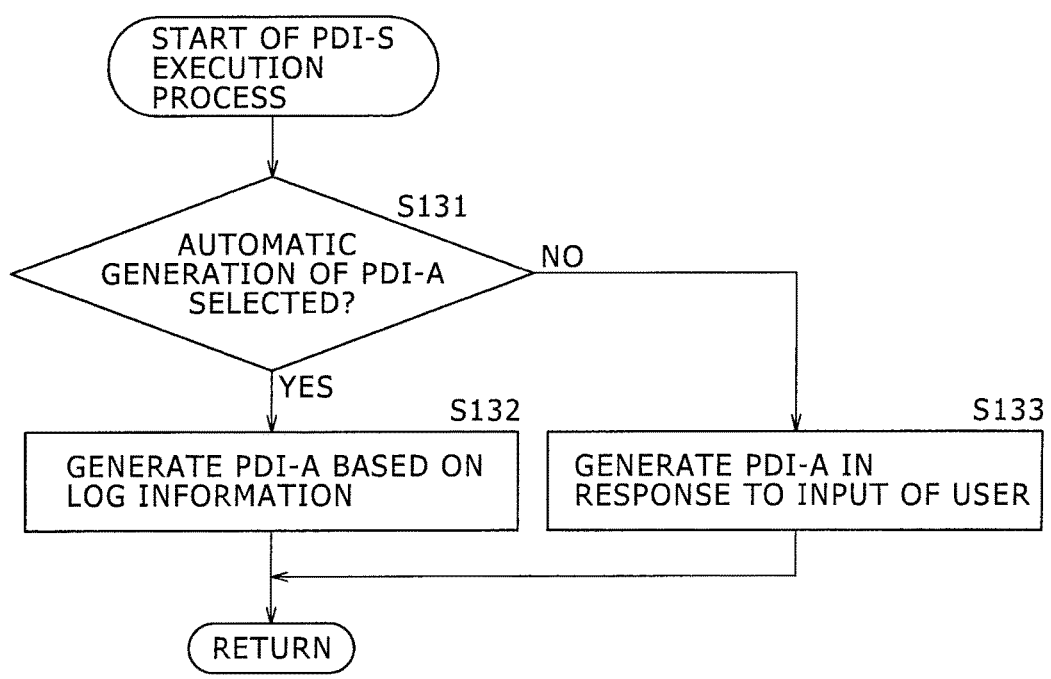
FIG. 35 is a flow chart illustrating details of a PDI-S execution process illustrated in FIG. 33.

Here, details of the PDI-S execution process by the PDI-S execution section 321 are described with reference to FIG. 35. After the PDI-S execution process is started, the PDI-S execution section 321 causes the display section not shown to display a screen image corresponding to a question defined in the PDI-S. Then, the PDI-S execution section 321 causes the user to select whether a user side PDI-A representative of an answer to the question is to be automatically generated or to be generated in response to an input of the user or viewer of the client 12.

At step S131, the PDI-S execution section 321 decides whether or not the automatic generation of a user side PDI-A is selected. If it is decided at step S131 that the automatic generation of a user side PDI-A is selected on the screen image displayed on the display section not shown, then the processing advances to step S132.

At step S132, the PDI-S execution section 321 executes the PDI-S to read out log information from the log information storage section 322 and generates a user side PDI-A based on the log information. In particular, the PDI-S execution section 321 analyzes the liking of the user from the behavior log of the user represented by the log information read out from the log information storage section 322 and generates a user side PDI-A representative of an answer to the question defined by the PDI-S based on a result of the analysis of the liking.

Further, the PDI-S execution section 321 analyses liking of the user from the behavior log of the user represented by the log information stored in an external database on a network and received through the reception section 51. Then, the PDI-S execution section 321 generates a user side PDI-A representative of answers to the questions defined by the PDI-S based on a result of the analysis of the liking.

In this manner, the PDI-S execution section 321 executes the PDI-S to interact with the user to generate a PDI-A representative of answers which reflect the liking of the user with a high degree of accuracy to the question defined by the PDI-S.

On the other hand, if it is decided at step S131 that automatic generation of a PDI-A is not selected on the screen image displayed on the display section not shown, then the processing advances to step S133.

At step S133, the PDI-S execution section 321 generates a user side PDI-A in response to an input of the user on the screen image displayed on the display section not shown. In particular, the PDI-S execution section 321 allows the user or viewer of the client 12 to input or select answers to the questions defined in the PDI-S, which is displayed on the display section not shown, to generate a user side PDI-A representative of the answer.

Example of Screen Image Display in an Interaction with the User by the PDI-S

Here, an example of screen image display in an interaction with a user by the PDI-S is described with reference to FIGS. 36 to 39. It is to be noted here that it is assumed that the client 12 receives a PDI-S which defines a question same as the question defined by the PDI-Q described hereinabove with reference to FIG. 7, and screen images corresponding to the question group defined by the received PDI-S are successively displayed on the display section not shown of the client 12.

FIG. 36 shows an example of screen image display corresponding to the question of "ProviderA:123" in FIG. 7. In FIG. 36, a log reference button 341 on which "Reference the recent viewing log and, if you want to automatically generate an answer to the query below: in which of the following sports are you most interested? (Multiple selection allowed), click this button. If you want to specify the answer by yourself, choose one to three answers below:" is displayed and selection buttons 342-1 to 342-4 for allowing the user to select the choices "Baseball," "Basketball," "Soccer" and "Hockey" as candidates for the answer to the question are displayed.

If the log reference button 341 is depressed by the user on the screen image shown in FIG. 36, then the PDI-S execution section 321 reads out log information representative of the viewing log of television programs, for example, for a month in the past from the log information storage section 322 to analyze the liking of the user. Then, the PDI-S execution section 321 selects one of the candidates for the answer to the question of "ProviderA:123" which has the highest relationship to a result of the analysis of the liking and generates a user side PDI-A representative of the answer.

FIG. 37 shows an example of screen image display corresponding to the question of "ProviderA:123" in FIG. 7. In FIG. 37, a log reference button 351 on which the message including the question indicated in the 20th row in FIG. 7, that is, the message "Reference the recent behavior log and, if you want to automatically generate an answer to the query below: Do you enjoy camping and outdoor recreation? (Only one selection). If you want to specify the answer by yourself, choose one answer below:" is displayed and selection buttons 352-1 to 352-3 for allowing the user to select the choices "Never," "Occasionally," and "Frequently" as candidates for the answer to the question are displayed.

If the log reference button 351 is depressed by the user on the screen image shown in FIG. 37, then the PDI-S execution section 321 reads out log information representative of records of going out for a month in the past such as, for example, a timetable from the log information storage section 322 to analyze the liking of the user. Then, the PDI-S execution section 321 selects one of the candidates for the answer to the question of "ProviderA:ProgramX:123" which has the highest relationship to a result of the analysis of the liking and generates a user side PDI-A representative of the answer.

Figure 38:
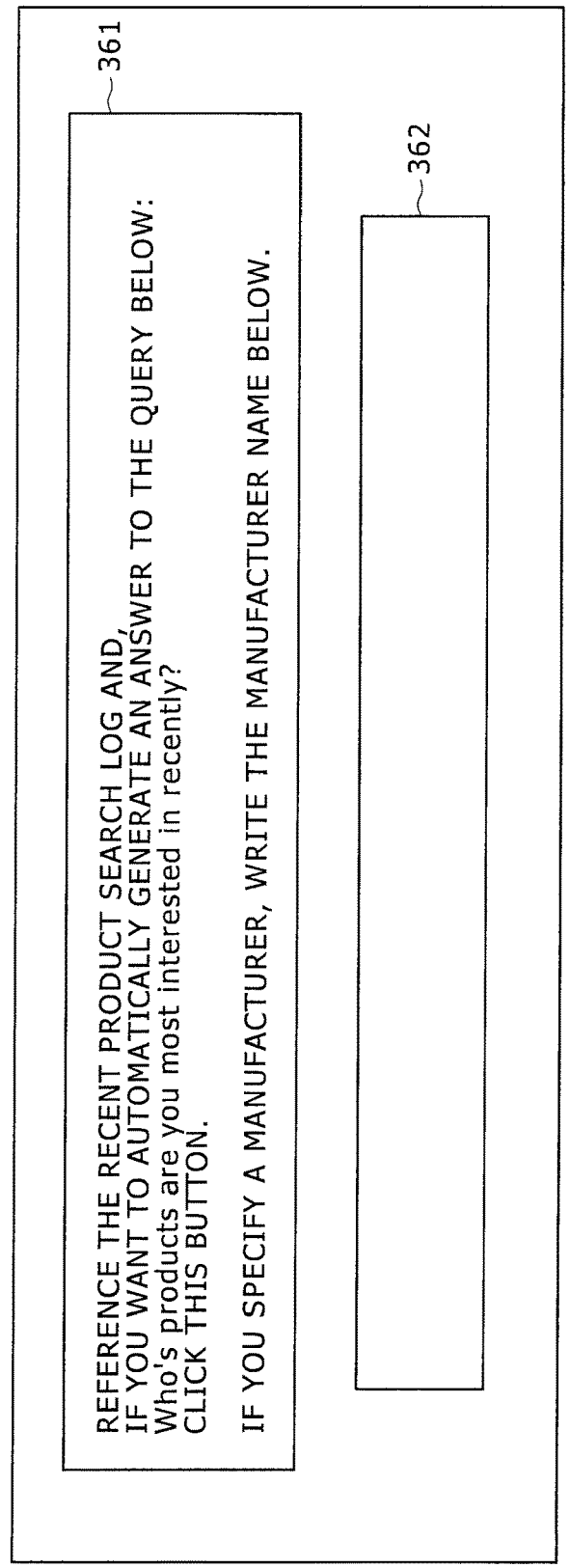

FIG. 38 shows an example of screen image display corresponding to the question of "ProviderA:321" in FIG. 7. In FIG. 38, a log reference button 361 on which the message including the question indicated in the 27th row in FIG. 7, that is, the message "Reference the recent product search log and, if you want to automatically generate an answer to the query below: Who's products are you most interested in recently?" is displayed and an answer inputting section region 362 for allowing the user to input a character string as the answer to the question is displayed.

If the log reference button 361 is depressed by user on the screen image shown in FIG. 38, then the PDI-S execution section 321 reads out log information representative of commodities searched, for example, for a month in the past from a database of a company which manages a shopping site on the Internet to analyze the liking of the user. Then, the PDI-S execution section 321 generates a user side PDI-A representative of the answer to the question of "ProviderA: 321" based on a result of the analysis.

Figure 39:
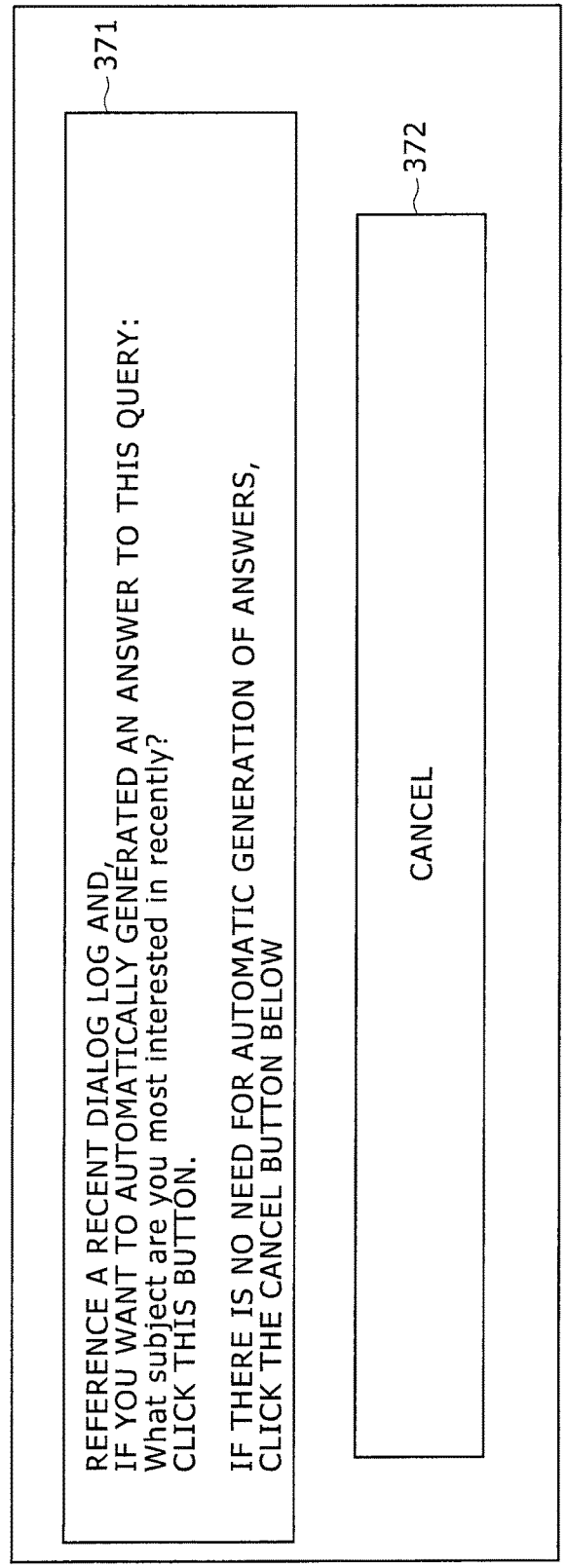

FIG. 39 shows an example of screen image display corresponding to a question of "ProviderA:Special:999" which is not included in the question defined in the PDI-Q described hereinabove with reference to FIG. 7. It is assumed that the question of "ProviderA:Special:999" is a question whose type is "AnyAnswerType" described hereinabove. In FIG. 39, a log reference button 371 on which a message including the question provided by the PDI-S, that is, the message "Reference a recent dialog log and, if you want to automatically generate an answer to the query: "What subject are you most interested in recently? If there is no need for automatic generation of answers, click the Cancel button below." is displayed and a cancel button 372 for canceling the answer to the question is displayed.

If the log reference button 371 is depressed by the user on the screen image shown in FIG. 39, then the PDI-S execution section 321 reads out log information representative of dialogs or sentences communicated, for example, for one week in the past from a database of a company which provides a SNS (Special Network Service) on the Internet to analyze the liking of the user. Then, the PDI-S execution section 321 generates a PDI-A representative of the answer to the question of "ProviderA:Special:999" based on a result of the analysis.

It is to be noted that, while, in the examples of screen image display shown in FIGS. 36 and 37, the answer of the user is selected from among candidates for the answer to the question defined in the PDI-S, candidates for the answer to the question may be analogized from the behavior log of the user represented by the log information stored in the log information storage section 322 or an external database such that the answer of the user is selected from among the analogized candidates for the answer.

FIG. 40 shows another example of screen image display corresponding to the question of "ProviderA:123" in FIG. 7. In FIG. 40, a question presentation region 381 in which a message including the question indicated in the 12th row in FIG. 7, that is, the message "The following three candidates are possible as a result of choosing by analogy of various log information of yours as an answer to the query: In which of the following sports are you most interested? (Multiple selection allowed). Choose one or more," is displayed and selection buttons 382-1 to 382-3 for allowing the user to select the choices "Basketball," "Soccer" and "Hockey" as analogized candidates for the answer to the question are displayed.

In this instance, the PDI-S execution section 321 executes the PDI-S to read out log information of television programs, for example, for a month in the past to analyze the liking of the user to analogize candidates for the answer to the question of "ProviderA:123." Then, the PDI-S execution section 321 causes corresponding selection buttons to be displayed like a screen image shown in FIG. 40. If one of the selection buttons is selected by the user, then the PDI-S execution section 321 generates a user side PDI-A representative of the answer corresponding to the selected selection button.

The PDI-S execution section 321 executes the PDI-S to automatically generate a user side PDI-A representative of the answer to the question defined by the PDI-S based on log information of the user or generate a user side PDI-A representative of an answer to question inputted or selected by the user.

Example of the PDI-A

Here, an example of a PDI-A generated by the PDI-S execution section 321, that is, a user side PDI-A, is described with reference to FIG. 41. It is to be noted that the PDI-A illustrated in FIG. 41 is generated based on log information of the user.

In particular, the second to seventh rows indicate an answer of the user automatically generated to the question presented by the screen image display described hereinabove with reference to FIG. 36. More particularly, <id>ProviderA:123</id> indicates an id element of the question presented by the screen image display of FIG. 36, and <a>Baseball</a> in the fourth row, <a>Soccer</a> in the fifth row and <a>Hockey</a> in the sixth row indicate answers selected based on the log information of the user by the PDI-S execution section 321 as an answer to the question.

The eighth to eleventh rows indicate an automatically generated answer of the user to the question present by the screen image display described hereinabove with reference to FIG. 37. More particularly, <id>ProviderA:ProgramX: 123</id> in the ninth row indicates an id element of the question presented by the screen image display of FIG. 37, and <a>Occasionally</a> in the tenth row indicates an answer selected based on the log information of the user by the PDI-S execution section 321 as an answer to the question.

The 12th to 15th rows indicate an answer of the user automatically generated to the question presented by the screen image display described hereinabove with reference to FIG. 38. In particular, <id>ProviderA:231</id> in the 13th row indicates an id element of the question presented by the screen image display of FIG. 38, and <a>Somy</a> in the 14th row indicates an answer generated based on the log information of the user by the PDI-S execution section 321 as an answer to the question The 16th to 19th rows indicate an answer of the user automatically generated to the question presented by the screen image display described hereinabove with reference to FIG. 39. In particular, <id>ProviderA:Special:999</id> in the 17th row indicates an id element of the question presented by the screen image display of FIG. 39, and <a>jlKK3Q==</a> in the 18th row indicates an answer generated based on the log information of the user by the PDI-S execution section 321 as an answer to the question.

Here, <a>j1KK3Q==</a> is a provider unique filtering parameter of a provider hiding format whose substance can be grasped only by the provider which sets the question and is in a state encoded by such a method as, for example, Base64. In other words, the provider unique filtering parameter cannot be used as a filtering parameter by any other provider.

The PDI-S execution section 321 supplies the user side PDI-A generated in this manner to the PDI-A storage section 53 so as to be stored. The user side PDI-A stored in the PDI-A storage section 53 is used to decide whether or not a content distributed from the server 11 conforms to the liking of the user of the client 12 as hereinafter described.

It is to be noted that the user side PDI-A stored in the PDI-A storage section 53 is updated when the PDI-S is executed in an execution period designated in advance by the provider side by the PDI-S execution section 321.

Referring back to the flow chart of FIG. 33, at step S113, the PDI-S execution section 312 of the server 11 generates a provider side PDI-A to the questions defined by the PDI-S from the PDI-S generator 311 and supplies the generated provider side PDI-A to the metadata distributor 44. In particular, the PDI-S execution section 312 analyzes or executes in response to an operation by staff of the broadcasting station, that is, of the provider side, and causes the display section not shown to display such screen images corresponding to the questions defined by the PDI-S as described hereinabove, for example, with reference to FIGS. 36 to 39. Then, the PDI-S execution section 312 generates a provider side PDI-A representative of the answers to the questions. At this time, the staff of the broadcasting station would cause the PDI-S to be analyzed or executed to select answers corresponding to a content to be distributed as answers to the questions defined by the PDI-S. In particular, the provider side PDI-A generated by the PDI-S execution section 312 represents information, that is, answers, for allowing the user or viewer of the client 12 to view a content to be distributed later with the liking of the viewer taken into consideration by the provider side.

Thereafter, in the server 11, a content corresponding to the generated provider side PDI-A is specified or referred to, and content metadata including the provider side PDI-A is generated as content metadata of the specified content. Then, the specified content is distributed together with the generated content metadata.

Also here, it is to be noted that the content may not be distributed together with the content metadata, but after the content metadata including the provider side PDI-A is transmitted to the client 12 in advance, the content corresponding to the content metadata may be distributed.

Meanwhile, in the client 12, the content and the content metadata distributed from the server 11 are received, and matching between the user side PDI-A and the provider side PDI-A is carried out.

Here, it is assumed that the PDI-A described hereinabove with reference to FIG. 41 is generated and stored as the user side PDI-A and a PDI-A illustrated in FIG. 42 is transmitted as the provider side PDI-A from the server 11 to the client 12.

The PDI-A illustrated in FIG. 42 has a basic configuration same as that of the user side PDI-A illustrated in FIG. 41, and overlapping detailed description thereof is omitted herein to avoid redundancy. However, this provider side PDI-A indicates that "Baseball" is set as an answer to the question of "ProviderA:123" and "Never" is set as an answer to the question of "ProviderA:ProgramX:123."

At this time, the client 12 compares the user side PDI-A and the provider side PDI-A with each other. Then, if answers to at least one question exhibit coincidence, then the client 12 decides that the user side PDI-A and the provider side PDI-A match with each other. However, if answers to any question do not indicate coincidence, then the client 12 decides that the user side PDI-A and the provider side PDI-A do not match with each other. In the case described above, since the answer to "ProviderA:123" in the user side PDI-A illustrated in FIG. 41 and the answer to the question of "providerA:123" in the provider side PDI-A illustrated in FIG. 42 coincide with each other in that they include "Baseball," the client 12 decides that the user side PDI-A and the provider side PDI-A match with each other.

Now, it is assumed that a PDI-A illustrated in FIG. 43 is transmitted as the provider side PDI-A from the server 11.

The provider side PDI-A illustrated in FIG. 43 indicates that "Basketball" is selected as an answer to the question of "ProviderA:123" and "Never" is selected as an answer to the question of "ProviderA:ProgramX:123."

In this instance, since the answers to the questions in the user side PDI-A illustrated in FIG. 41 and the answers to the questions in the provider side PDI-A illustrated in FIG. 43 exhibit no coincidence, it is decided that the user side PDI-A and the provider side PDI-A do not match with each other.

From a result of such a matching process as described above, it is determined whether or not the distributed content should be acquired.

According to the process described above, in the broadcasting system, on the provider side, a PDI-S for obtaining a user side PDI-A to questions regarding the liking of a user is generated by the server, and the PDI-S is transmitted to the client terminal. Further, a provider side PDI-A representative of an answer set by the provider side to the PDI-S is distributed as content metadata of a corresponding content. Consequently, as content metadata, content metadata which satisfies needs at the time other than content metadata prescribed by a standardization organization can be applied to a content. On the other hand, on the user side, the PDI-S from the server is executed by the client terminal to generate a user side PDI-A, and matching between the generated user side PDI-A and the provider side PDI-A from the server is carried out to determine whether or not the content distributed from the server should be acquired. Consequently, the content can be filtered with the content metadata which satisfies needs at the time other than content metadata prescribed by a standardization organization. Accordingly, a content which satisfies needs at the time can be acquired.

Further, on the client terminal, since interaction with the user can be carried out with the PDI-S, even if a question set by the provider side has the substance which requires a high interactivity, sufficient interaction with the user can be carried out. Accordingly, since a user side PDI-A which reflects the liking of the user with a high degree of accuracy can be generated, an accurate filtering condition can be obtained, and consequently, a content which satisfies needs at the time can be acquired with a higher degree of certainty.

It is to be noted that, also in a broadcasting system wherein a script is executed to carry out interaction with a user, one of a user side PDI-A and a provider side PDI-A may be represented as a query for evaluating a PDI-A to compare the user side PDI-A and the provider side PDI-A with each other to carry out matching.

In the following, a configuration wherein one of a user side PDI-A and a provider side PDI-A is represented as a query to compare the user side PDI-A and the provider side PDI-A with each other is described.

Example 3 of the Matching Process by a Query for Evaluating a PDI-A

First, a configuration which represents a provider side PDI-A as a query to compare a user side PDI-A and the provider side PDI-A with each other is described.

Figure 44:
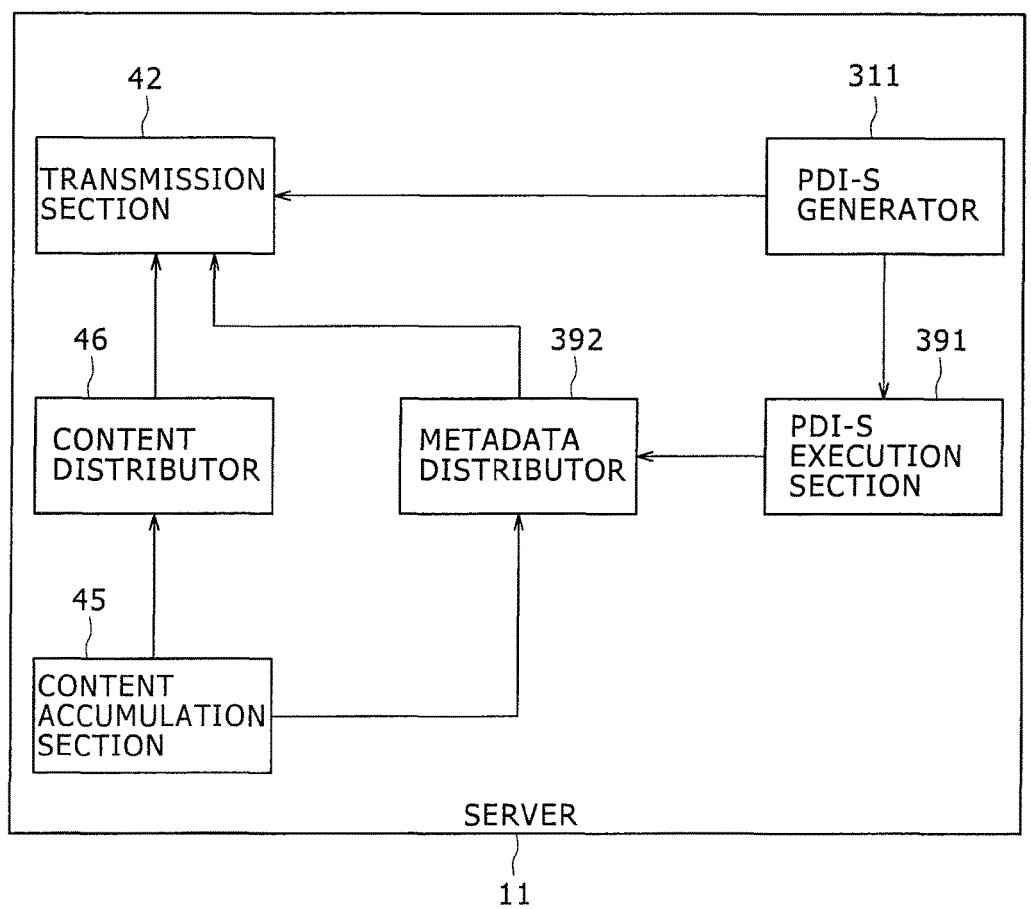
FIG. 44 is a block diagram showing another example of a functional configuration of the server different from that of FIG. 31.

FIG. 44 shows an example of a functional configuration of the server 11 which represents a provider side PDI-A as a query.

The server 11 of FIG. 44 includes a transmission section 42, a content accumulation section 45, a content distributor 46, a PDI-S generator 311, a PDI-S execution section 391, and a metadata distributor 392.

It is to be noted that, in the server 11 of FIG. 44, like elements having like functions to those of the elements provided in the server 11 of FIG. 31 are denoted by like terms and like reference characters and overlapping description of them is suitably omitted herein to avoid redundancy.

The server 11 of FIG. 44 is different from the server 11 of FIG. 31 in that the PDI-S execution section 391 and the metadata distributor 392 are provided in place of the PDI-S execution section 312 and the metadata distributor 44.

The PDI-S execution section 391 executes a PDI-S from the PDI-S generator 311 to generate a provider side PDI-A representative of an answer set by the provider to the questions regarding the liking of the user of client 12. Then, the PDI-S execution section 391 applies the generated provider side PDI-A to a predetermined conditional statement to generate a PDI-A query and supplies the generated PDI-A query to the metadata distributor 392.

The metadata distributor 392 specifies or refers to, based on the PDI-A query from the PDI-S execution section 391, a content corresponding to the PDI-A query from among the contents accumulated in the content accumulation section 45. The metadata distributor 392 generates content metadata including the PDI-A query as content metadata of the specified content and transmits the generated content metadata to the client 12 through the transmission section 42.

Further, the client 12 in the present example is same as the client 12 described hereinabove with reference to FIG. 32 except that the content filter 54 shown in FIG. 32 reads out the user side PDI-A from the PDI-A storage section 53 and a content is filtered based on the user side PDI-A and the PDI-A query included in the content metadata transmitted from the server 11 to client 12.

Now, content transmission and reception processes in the broadcasting system 10 including the server 11 of FIG. 44 are described with reference to a flow chart of FIG. 45.

Figure 45:
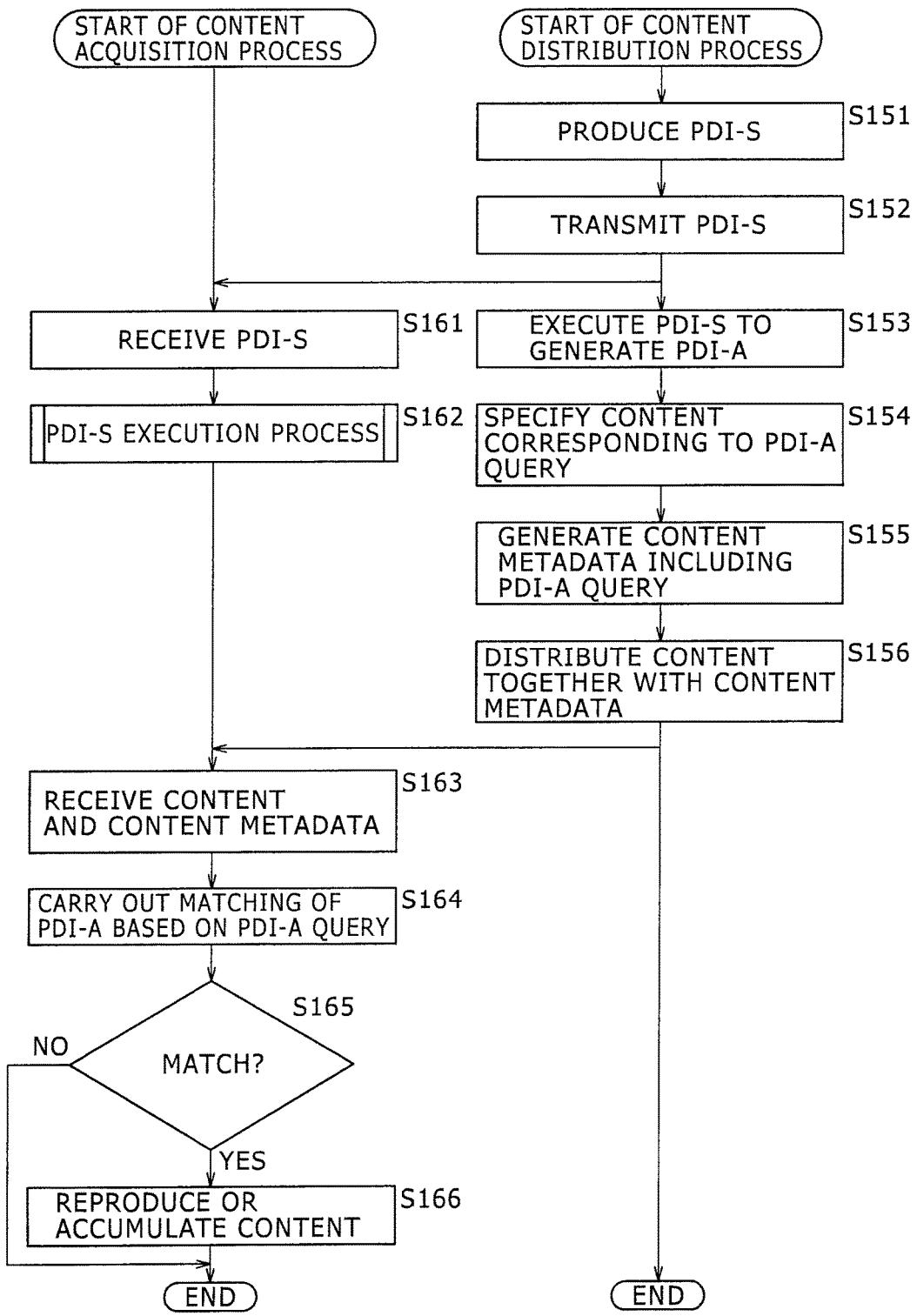
FIG. 45 is a flow chart illustrating content transmission and reception processes of the server of FIG. 44 and the client of FIG. 32.

It is to be noted that processes at steps S151, S152, S156, S161 to S163, S165 and S166 of the flow chart of FIG. 45 are basically similar to the processes at steps S111, S112, S116, S121 to S123, S125 and S126 of the flow chart of FIG. 33, respectively. Therefore, overlapping description of the processes is omitted herein to avoid redundancy.

In particular, at step S153, the PDI-S execution section 391 of the server 11 generates a provider side PDI-A to the questions defined in the PDI-S from the PDI-S generator 311 and applies the generated provider side PDI-A to a predetermined conditional statement to generate a PDI-A query. Then, the PDI-S execution section 391 supplies the generated provider side PDI-A to the metadata distributor 392. More particularly, for example, the PDI-S execution section 391 analyzes or executes the PDI-S in response to an operation of staff of a broadcasting station, that is, of the provider side so that such screen images corresponding to the questions defined in the PDI-S as described hereinabove, for example, with reference to FIGS. 36 to 39 are displayed on the display section not shown, thereby setting answers corresponding to the questions. Further, the PDI-S execution section 391 causes the staff to determine a combination of the individual answers, that is, a filtering condition, to generate a PDI-A query representative of the combination of the answers. At this time, the staff of the broadcasting station would cause the PDI-S execution section 391 to analyze or execute the PDI-S to select answers corresponding to the content to be distributed as answers to the questions defined in the PDI-S and determine a combination of the answers. In other words, the PDI-A query generated by the PDI-S execution section 391 represents information for allowing the user or viewer of the client 12 to view a content to be distributed later, that is, the combination of answers, with the liking of the viewer taken into consideration by the provider side.

At step S154, the metadata distributor 392 specifies or refers to, based on the PDI-A query from the PDI-S execution section 391, a content corresponding to the PDI-A query from among the contents accumulated in the content accumulation section 45. The content specified here may be a content having a similarity to content metadata applied in advance to the accumulated content higher than a predetermined value or may be a content selected in advance as a content to be viewed by the user by the staff of the broadcasting station. It is to be noted that the content specified by the metadata distributor 392 is acquired from the content accumulation section 45 by the content distributor 46.

At step S155, the metadata distributor 392 newly generates, based on the content metadata applied in advance to the content specified at step S154 and the PDI-A query from the PDI-S execution section 391, content metadata including the PDI-A query.

Then at step S164, the content filter 54 of the client 12 carries out matching of the user side PDI-A stored in the PDI-A storage section 53 based on the PDI-A query included in the content metadata from the server 11.

Here, it is assumed that the PDI-A described hereinabove with reference to FIG. 41 is generated and stored as the user side PDI-A and a PDI-A given below has been transmitted from the server 11 to the client 12:

"//QSA[id='ProviderA:123' and a='Baseball']"

The PDI-A query indicates that the user PDI-A evaluates whether or not "Baseball" is selected as an answer to the question of "ProviderA:123."

At this time, when the content filter 54 evaluates the user side PDI-A based on the PDI-A query that PDI-A query is satisfied, that is, the PDI-A query is true, it decides that the user side PDI-A and the PDI-A query match with each other. However, if the PDI-A query is not satisfied or is false, then the content filter 54 decides that the user side PDI-A and the PDI-A query do not match with each other. In the present instance, since, in the user side PDI-A illustrated in FIG. 41, "Baseball" is selected as the answer to the question of "ProviderA:123," it is decided that the user side PDI-A and the PDI-A query match with each other.

Since a condition of complicated filtering is represented by the PDI-A query set by the provider side can be represented in this manner, it becomes possible to allow the user or viewer expected by the provider side to acquire a content with a higher degree of certainty.

Example 4 of the Matching Process by a Query for Evaluating a PDI-A

Now, a configuration which represents a user side PDI-A as a query to compare the user side PDI-A and a provider side PDI-A is described.

Figure 46:
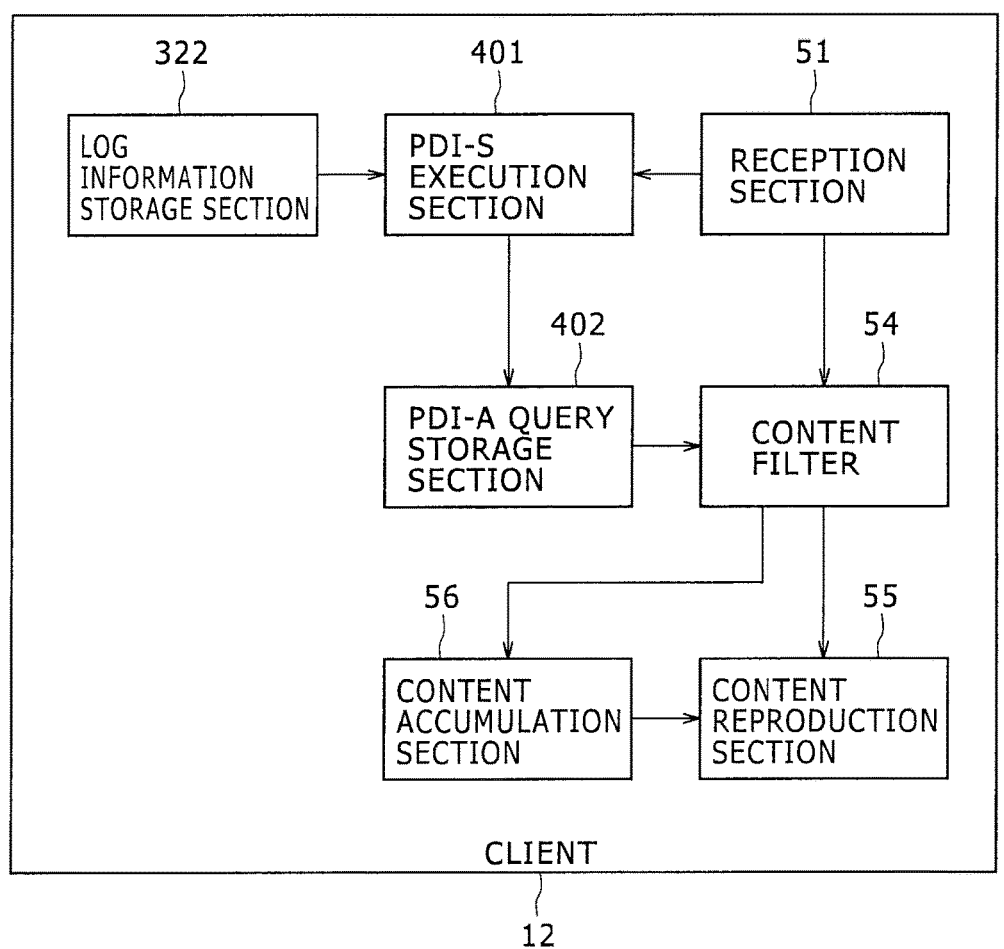
FIG. 46 is a block diagram showing another example of a functional configuration of a client which is a modification to that of FIG. 32.

FIG. 46 shows an example of a functional configuration of the client 12 which represents a user side PDI-A as a query.

Referring to FIG. 46, the client 12 shown includes a reception section 51, a content filter 54, a content reproduction section 55, a content accumulation section 56, a log information storage section 322, a PDI-S execution section 401 and a PDI-A query storage section 402.

It is to be noted that, in the client 12 of FIG. 46, like elements having like functions to those of the elements provided in the client 12 of FIG. 32 are denoted by like terms and like reference characters and overlapping description of them is suitably omitted herein to avoid redundancy.

In particular, the client 12 of FIG. 46 is different from the client 12 of FIG. 32 in that it includes the PDI-S execution section 401 and the PDI-A query storage section 402 in place of the PDI-S execution section 321 and the PDI-A storage section 53.

The PDI-S execution section 401 executes a PDI-S transmitted thereto from the server 11 to generate a user side PDI-A representative of answers of the user of client 12 to questions regarding the liking of the user. Then, the PDI-S execution section 401 applies the generated user side PDI-A to a predetermined conditional statement to generate a PDI-A query and supplies the generated PDI-A query to the PDI-A query storage section 402.

The PDI-A query storage section 402 stores the PDI-A query from the PDI-S execution section 401. The PDI-A query stored in the PDI-A query storage section 402 is suitably read out into the content filter 54.

It is to be noted that the content filter 54 reads out the PDI-A query from the PDI-A query storage section 402 and filters a content based on the read out PDI-A query and a provider side PDI-A included in content metadata transmitted to the client 12 from the server 11.

Further, the server 11 in the present example is same as the server 11 of FIG. 31, and therefore, overlapping description thereof is omitted herein to avoid redundancy.

Now, content transmission and reception processes in the broadcasting system 10 which includes the client 12 of FIG. 46 are described with reference to a flow chart of FIG. 47.

It is to be noted that processes at steps S171 to S181, S183, S185 and S186 are basically similar to the processes at steps S111 to S121, S123, S125 and S126 of flow chart of FIG. 33, respectively, and therefore, overlapping description of them is omitted herein to avoid redundancy.

In particular, at step S182, the PDI-S execution section 401 of the client 12 carries out a PDI-S execution process to generate a PDI-A query.

Example of the PDI-S Execution Process

Figure 48:
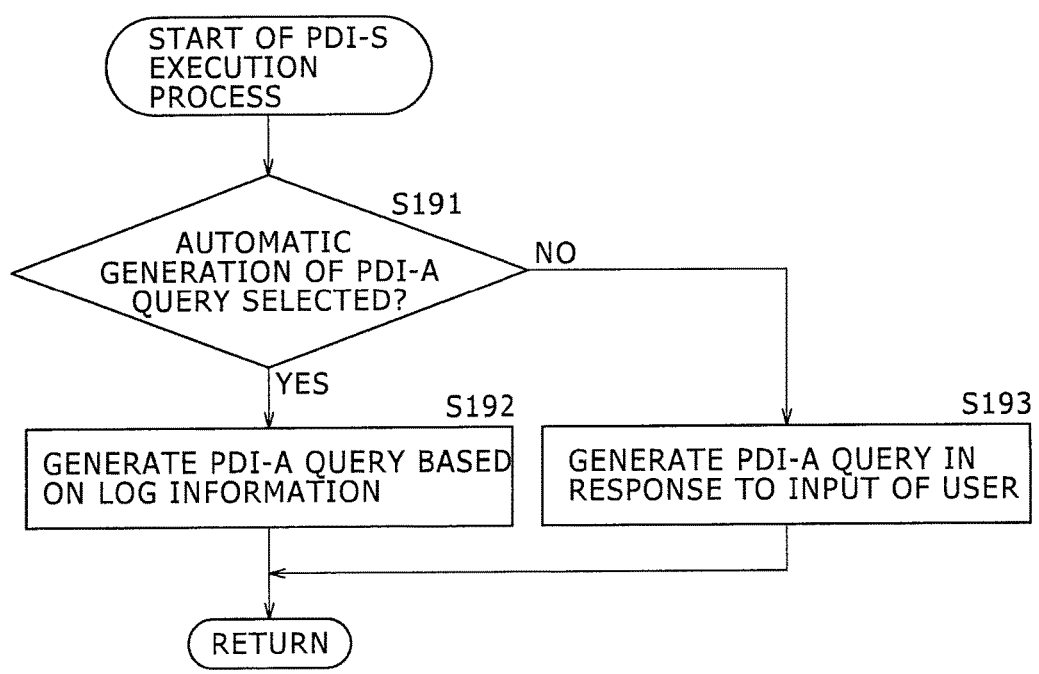
FIG. 48 is a flow chart illustrating details of a PDI-S execution process of FIG. 47.

Here, details of the PDI-S execution process by the PDI-S execution section 401 are described with reference to FIG. 48. After the PDI-S execution process is started, the PDI-S execution section 401 causes the display section not shown to display a screen image corresponding to the questions defined by the PDI-S. Then, the PDI-S execution section 401 causes the user to select whether the user side PDI-A representative of the answers to the questions should be applied to a predetermined conditional statement to automatically generate a PDI-A query or a PDI-A query should be generated in response to an input of the user or viewer of the client 12.

At step S191, the PDI-S execution section 401 decides whether or not automatic generation of a PDI-A query is selected. If it is decided at step S191 that automatic generation of a PDI-A is selected on the screen image displayed on the display section not shown, then processing advances to step S192.

At step S192, the PDI-S execution section 401 executes the PDI-S to read out log information from the log information storage section 322 and generates a PDI-A query based on the read out log information. More particularly, the PDI-S execution section 401 analyzes the liking of the user from the behavior log of the user represented by the log information read out from the log information storage section 322 and generates answers to the questions defined by the PDI-S based on a result of the analysis of the liking. Further, the PDI-S execution section 401 decides a combination of the questions, that is, a filtering condition, based on the log information to generate a PDI-A query representative of the combination of the answers.

Further, the PDI-S execution section 401 analyzes the liking of the user from the behavior log of the user presented by log information stored in a database on an external network and received through the reception section 51. Then, the PDI-S execution section 401 generates answers to the questions defined by the PDI-S based on a result of the analysis of the liking. Further, the PDI-S execution section 401 determines a combination of the answers, that is, a filtering condition, based on the log information to generate a PDI-A query representative of the combination of the answers.

In this manner, the PDI-S execution section 401 executes the PDI-S and interacts with the user to generate a PDI-A query representative of answers which reflect the liking of the user with a high degree of accuracy to the questions defined in the PDI-S.

On the other hand, if it is decided at step S191 that automatic generation of a PDI-A query is not selected on the screen image displayed on the display section not shown, then the processing advances to step S193.

At step S193, the PDI-S execution section 401 generates a PDI-A query in response to an input of the user on the screen image displayed on the display section not shown. More particularly, the PDI-S execution section 401 causes the user or viewer of the client 12 to input or select answers to the questions defined in the PDI-S and displayed on the display section not shown and causes the user to determine a combination of the answers, that is, a filtering condition, to generate a PDI-A query representative of the combination of answers.

The PDI-S execution section 401 supplies the PDI-A query generated in this manner to the PDI-A query storage section 402 so as to be stored.

Figure 47:
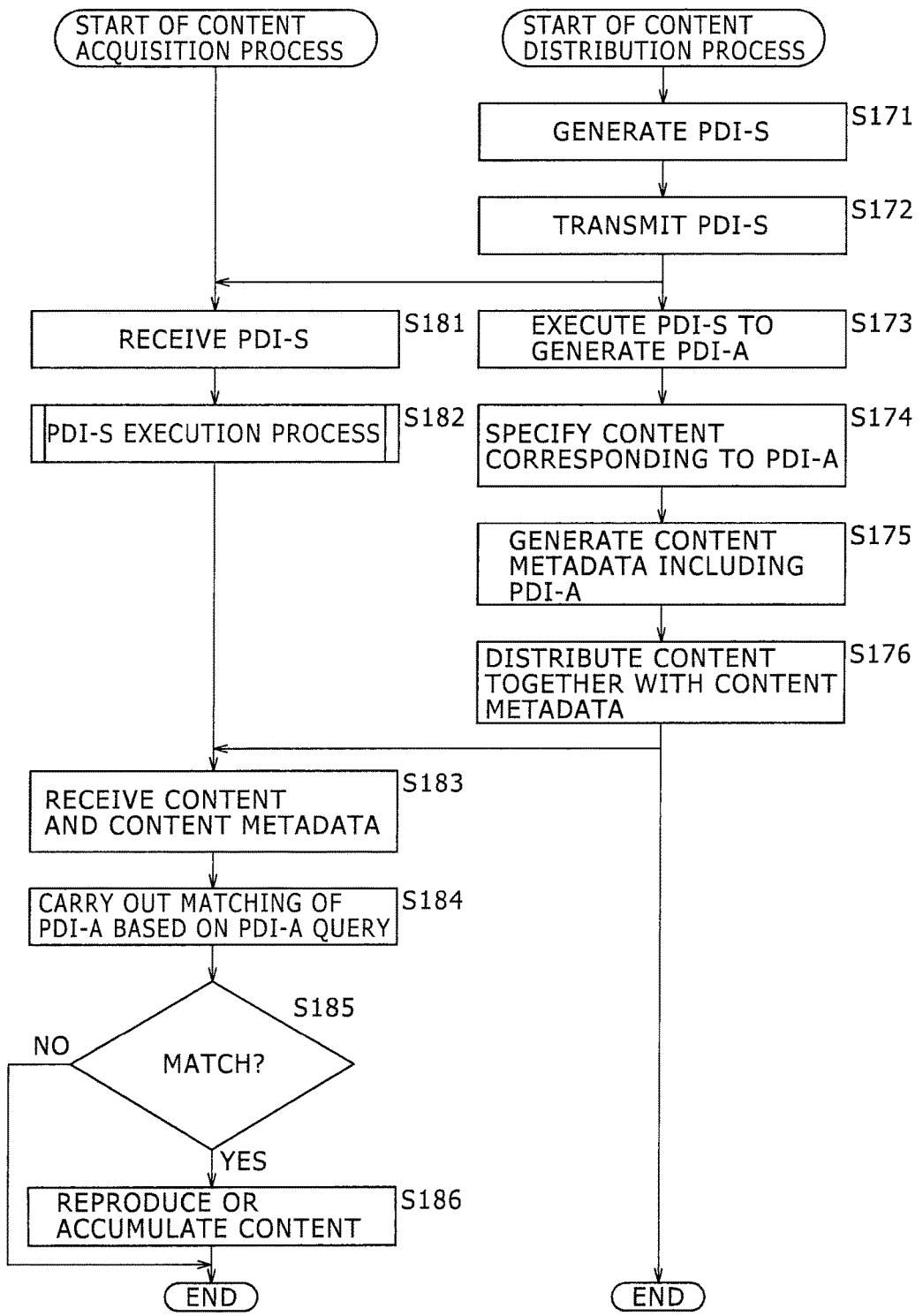
FIG. 47 is a flow chart illustrating content transmission and reception processes of the server of FIG. 44 and the client of FIG. 46.

Referring back to the flow chart of FIG. 47, at step S184, the content filter 54 carries out matching of the provider side PDI-A included in the content metadata from the server 11 based on the PDI-A query stored in the PDI-A query storage section 402.

Here, it is assumed that the PDI-A described hereinabove with reference to FIG. 42 is transmitted as the provider side PDI-A from the server 11 and a PDI-A query given below is generated and stored:

"//QSA[id='ProviderA:123' and a='Baseball']" and //QSA[id='ProviderA:ProgramX:123' and a='Never']

The PDI-A query given above represents that the provider side PDI-A evaluates whether or not "Baseball" is selected as an answer to the question of "ProviderA:123" and besides "Never" is selected as an answer to the question of "ProviderA:ProgramX:123."

At this time, the content filter 54 evaluates the provider side PDI-A based on the PDI-A query and, if the PDI-A query is satisfied or true, then the content filter 54 decides that the provider side PDI-A and the PDI-A query match with each other. However, if the PDI-A query is not satisfied or is false, then the content filter 54 decides that the provider side PDI-A and the PDI-A query do not match with each other. In the present instance, in the provider side PDI-A illustrated in FIG. 42, "Baseball" is selected as an answer to the question of "ProviderA: 123" and besides "Never" is selected as an answer to the question of "ProviderA:ProgramX:123." Therefore, the content filter 54 decides that provider side PDI-A and the PDI-A query match with each other.

Since a more detailed filtering condition can be represented by the PDI-A query set by the user side in his manner, a content expected by the user side can be acquired with a higher degree of certainty.

Application Example to a Broadcasting System which Broadcasts by the ATSC-M/H system Incidentally, also the broadcasting system of the present embodiment described above can be applied to a broadcasting system which broadcasts by the ATSC-M/H method.

In such an instance, a PDI-A, that is, a provider side PDI-A, or a PDI-A query is placed into at least one of the "Service" fragment (FIG. 23), the "Schedule" fragment (FIG. 24) and the "Content" fragment (FIG. 25) from among the components of the Service Guide illustrated in FIG. 22 as described hereinabove.

Meanwhile, a PDI-S is placed into the "Interactivity Data" fragment from among the components of the Service Guide illustrated in FIG. 22.

Figure 49:
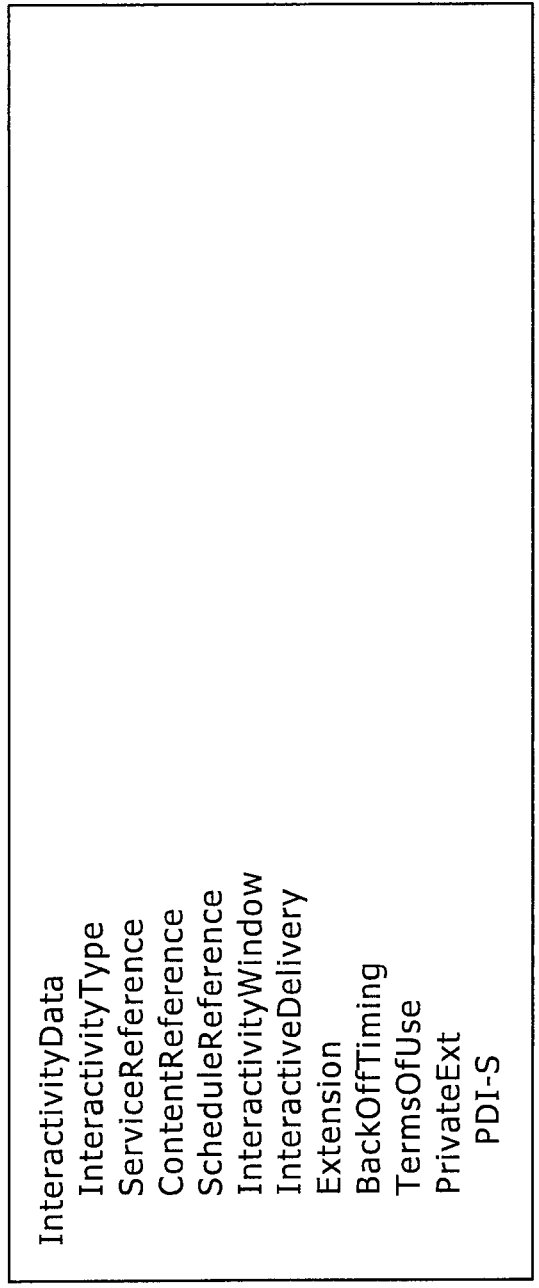
FIG. 49 is a view illustrating different syntax of the Interactivity Data fragment.

FIG. 49 illustrates details of a configuration of the "Interactivity Data" fragment. The PDI-S is placed into a "PDI-S" element newly added to the "PrivateExt" element set at the lowermost stage in the Interactivity Data" fragment illustrated in FIG. 49. In particular, for example, the "PDI-S" element is represented by a character string as <xs:element name='PDI-S' type='xs:string' xmins:xs="http://www.w3.org/2001/SML.Schema'/> by the XML schema and is encoded.

Application Example to a Broadcasting System which Carries Out NRT Broadcasting

The broadcasting system of the present embodiment can be applied also to a broadcasting system which carries out NRT broadcasting.

In such an instance, a PDI-A, that is, a provider side PDI-A, a PDI-A query or a PDI-S to be transmitted from the server 11 to the client 12 in the broadcasting system 10 described hereinabove is placed into and transmitted together with the "PDI descriptor" newly prescribed in SMT or NRT-IT (FIG. 29).

FIG. 50 illustrates an example of the syntax of "PDI Descriptor." In FIG. 50, each of the descriptors described is defined together with the bit number (No. of Bits) and the format (Format).

According to the syntax illustrated in FIG. 50, a PDI-A, a PDI-A query or a PDI-S is described in the descriptor "PDI_S or PDI_A or PDI_A_Query" of variable bits.

It is to be noted that the broadcasting system of the present embodiment can naturally be applied to a broadcasting system which broadcasts by the ATSC-M/H method described above and a broadcasting system which carries out NRT broadcasting by a method other than the existing broadcasting system.

Incidentally, in the embodiment described above, PDI-As, that is, a user side PDI-A and a provider side PDI-A, are generated as metadata of a text representation of the XML or the like and is used for filtering, that is, for a matching process. In particular, in filtering, texts, that is, XML instances, are compared with each other to determine whether or not they are same as each other.

However, since the process of comparing texts with each other requires a high cost in regard to the CPU load and the memory use amount, in the case where the amount of a content or contents to be distributed at a time is great, there is the possibility that the process may disturb efficient filtering of the distributed content or contents.

Therefore, in the following description, an embodiment of the present invention regarding a broadcasting system wherein a distributed content is filtered more efficiently is described.

3. Third Embodiment

Example of a Functional Configuration of the Server

First, an example of a functional configuration of the server 11 in the broadcasting system 10 wherein metadata is represented by a bitmap index is described with reference to FIG. 51.

Figure 51:
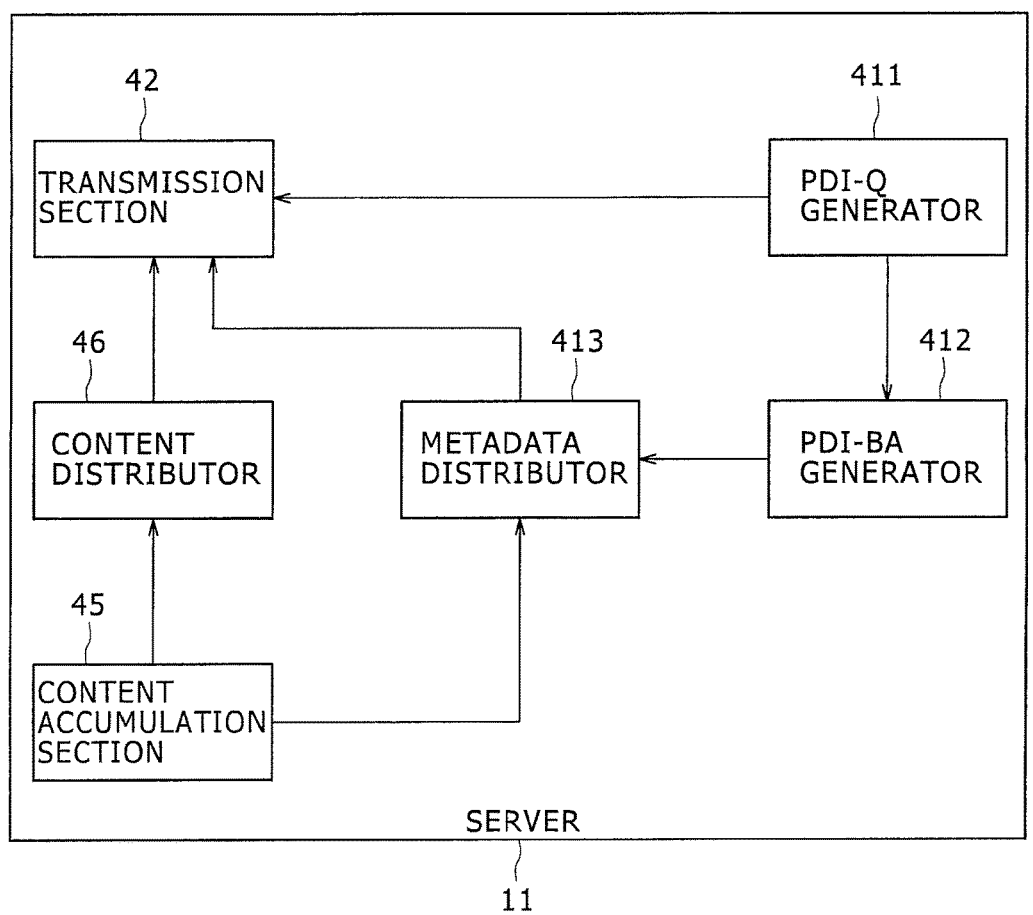
FIG. 51 is a block diagram showing an example of a functional configuration of a server according to a third embodiment of the present invention.

The server 11 of FIG. 51 includes a transmission section 42, a content accumulation section 45, a content distributor 46, a PDI-Q generator 411, a PDI-BA generator 412, and a metadata distributor 413.

It is to be noted that, in the server 11 of FIG. 51, like elements having like functions to those of the elements provided in the server 11 of FIG. 3 are denoted by like terms and like reference characters and overlapping description of them is suitably omitted herein to avoid redundancy.

In particular, the server 11 of FIG. 51 different from the server 11 of FIG. 3 in that the PDI-Q generator 411, PDI-BA generator 412 and metadata distributor 413 are provided in place of the PDI-Q generator 41, PDI-A generator 43 and metadata distributor 44.

The PDI-Q generator 411 generates a PDI-Q representative of a question about the liking of the user or viewer of the client 12, and transmits the generated PDI-Q to the client 12 through the transmission section 42 and supplies the PDI-Q to the PDI-BA generator 412. The id element of each question defined by the PDI-Q generated by the PDI-Q generator 411 is represented by a bitmap index, that is, a bit string, as hereinafter described.

The PDI-BA generator 412 generates, based on the PDI-Q from the PDI-Q generator 411, a PDI-BA (Preference Demographic and Interest-Bitmap Answer) (hereinafter referred to suitably as provider side PDI-BA) which is information represented by a bitmap index, that is, a bit string, representing an answer set by the provider side to the questions regarding the liking of the user of the client 12 described hereinabove corresponding to the PDI-Q. Then, the PDI-BA generator 412 supplies the generated PDI-BA to the metadata distributor 413.

The metadata distributor 413 specifies or refers to, based on the PDI-BA from the PDI-BA generator 412, a content corresponding to the answer set by the provider side from among the contents accumulated in the content accumulation section 45. The metadata distributor 413 generates content metadata including the PDI-BA as content metadata of the specified content and transmits the generated content metadata to the client 12. Example of the Functional Configuration of the Client Now, an example of a functional configuration of the client 12 in the broadcasting system 10 wherein metadata is represented by a bitmap index is described with reference to FIG. 52.

Figure 52:
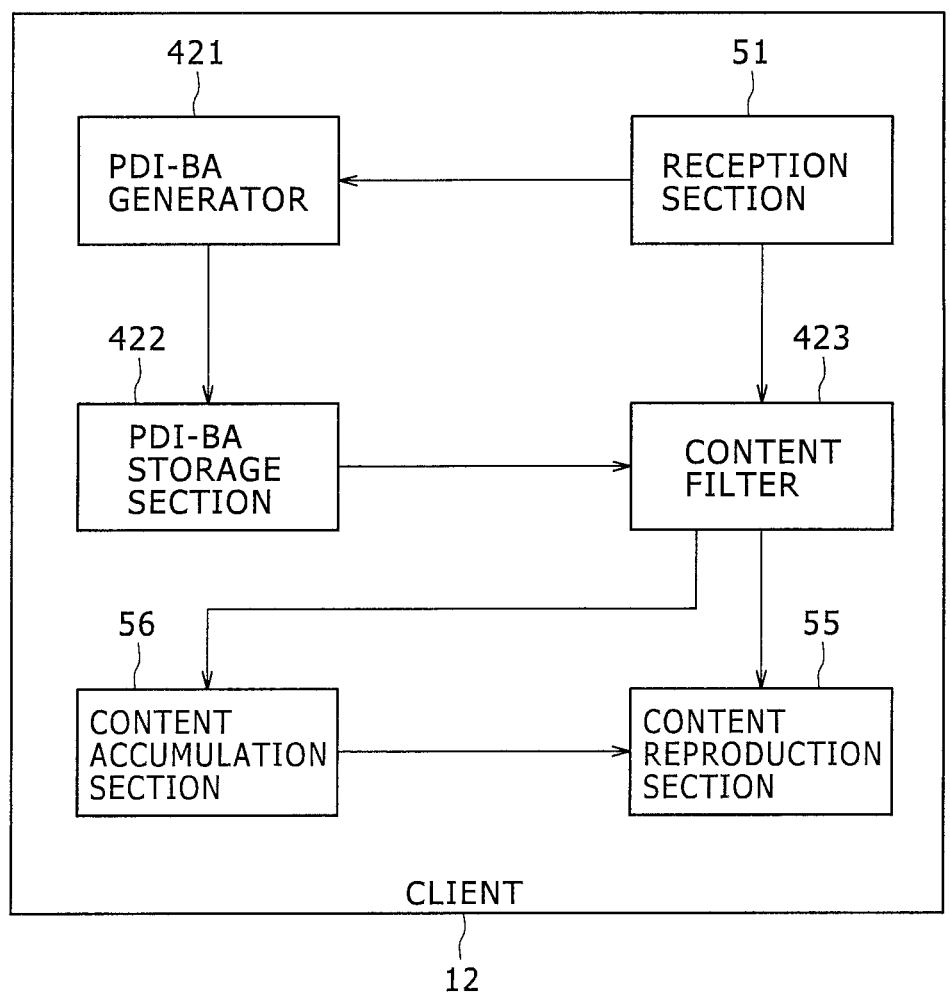
FIG. 52 is a block diagram showing an example of a functional configuration of a client according to third embodiment of the present invention.

The client 12 of FIG. 52 includes a reception section 51, a content reproduction section 55, a content accumulation section 56, a PDI-BA generator 421, a PDI-BA storage section 422 and a content filter 423.

It is to be noted that, in the client 12 of FIG. 52, like elements having like functions to those of the elements provided in the client 12 of FIG. 4 are denoted by like terms and like reference characters and overlapping description of them is suitably omitted herein to avoid redundancy.

In particular, the client 12 of FIG. 52 different from the client 12 of FIG. 4 in that the PDI-BA generator 421, PDI-BA storage section 422 and content filter 423 are provided in place of the PDI-A generator 52, PDI-A storage section 53 and content filter 54, respectively.

The PDI-BA generator 421 generates, based on the PDI-Q transmitted to the client 12 from the server 11, a PDI-BA (hereinafter referred to suitably as user side PDI-BA) which is information represented by a bitmap index representing answers of the user to the questions regarding the liking of the user of the client 12 corresponding to the PDI-Q. Then, the PDI-BA generator 421 supplies the generated PDI-BA to the PDI-BA storage section 422.

The PDI-BA storage section 422 stores the PDI-BA from the PDI-BA generator 421. The PDI-BA stored in PDI-BA storage section 422 is read out suitably from the content filter 423.

The content filter 423 reads out the PDI-BA from the PDI-BA storage section 422 and filters a content based on the read out PDI-BA, that is, based on the user side PDI-BA, and the PDI-BA included in the content metadata of the content transmitted from the server 11, that is, the provider side PDI-BA. The content filter 423 supplies the filtered content to the content reproduction section 55 or the content accumulation section 56 in response to a result of the filtering.

Example of Content Transmission and Reception Processes

Now, content transmission and reception processes of the broadcasting system 10 configured from the server 11 of FIG. 51 and the client 12 of FIG. 52 are described with reference to a flow chart of FIG. 53.

In particular, if, on the provider side such as a broadcasting company, for example, a sponsor of a content to be broadcast or distributed or the broadcasting company itself issues a request for distribution of a content to viewers having a particular liking or attribute, then the PDI-Q generator 411 of the server 11 generates a PDI-Q at step S211. In particular, the PDI-Q generator 411 generates, in response to an operation of staff on the provider side, a PDI-Q to the user of the client 12 for inquiring about what liking or attribute the user has.

Further Example of the Syntax of the XML Schema

Here, an example of the syntax of the XML schema for configuring a PDI-Q and a PDI-BA in the present embodiment is described with reference to FIGS. 54A-54B and 55.

It is to be noted that the first to 50th rows of the syntax illustrated in FIGS. 54A-54B are basically similar to the first to 50th rows of the syntax illustrated in FIGS. 34A-34B, respectively, and therefore, overlapping description of them is omitted herein to avoid redundancy.

It is to be noted that, in FIGS. 54A-54B, the type of id elements for identification of the items of the questions defined by the names of "QIA," "QBA," "QSA," "QTA" and "QAA" indicated in the 15th, 24th, 31st, 40th and 47th rows is defined as "BitmapAnyURIType," different from that in FIGS. 34A-34B.

Further, in FIGS. 54A-54B, the type of answers, that is, of a elements, to the questions defined by the names of "QBA," "QSA" and "QAA" indicated in the 26th, 33rd and 48th rows is defined as "BitmapBooleanURIType," "BitmapStringURIType" and "BitmapBase64BinaryURIType," respectively, different from those in FIGS. 34A-34B.

The 51st to 57th rows in FIG. 55 indicate a declaration of the attribute of the id element of the type defined by "BitmapAnyURIType."

The 58th to 64th rows indicate a declaration of the attribute of the a elements of the type defined by "BitmapBooleanURIType."

Further, the 65th to 71st rows indicate a declaration of the attribute of the a elements of type defined by "BitmapStringURIType," and the 72nd to 78th rows indicate a declaration of the attribute of the a elements of the type defined by "BitmapBase64BinaryURIType."

In particular, the 51st to 78th rows of FIG. 55 declare that the id elements of all of the questions defined by the PDI-Q and the answers, that is, the a elements, to the questions defined by the names of "QBA," "QSA" and "QAA" are represented by a bitmap index.

It is to be noted that also the questions and the answers to the questions declared in the syntaxes of FIGS. 54A-54B and 55 are distinguished into provider common filtering parameters and provider unique filtering parameters.

Further, the answers, that is, the a elements, to the questions defined by the name of "QAA" are distinguished into provider unique filtering parameters of a format in which only the provider which sets the question can grasp the substance and of a provider unique format encoded by the Base64 system.

Example of the PDI-Q

Now, an example of a PDI-Q configured based on the indexes of FIGS. 54A-54B and 55 are described with reference to FIG. 56.

It is to be noted that the questions defined by the PDI-Q illustrated in FIG. 56 are basically same as those of the PDI-Q illustrated in FIG. 7, and therefore, overlapping description of them is omitted herein to avoid redundancy.

However, in FIG. 56, the id elements of the questions defined by the names of "QBA" and "QSA" and the answers, that is, the a elements, to the questions are represented by a bitmap index, different from those in FIG. 7.

In particular, the id element of the question of "Common: 111" in the third row is represented by a bitmap string of "00000000000101." It is to be noted that <!-True=1, False=0→in the fourth row indicates that the answer to the question of "Common:111" which is a question for requesting an answer of the logic value type is represented by one of the bits of "1" (True) and "0" (False).

The id element of the question of "ProviderA:123" in the 10th row is represented by a bit string of "00000100000111." Further, "Baseball" in the 13th row, "Basketball" in the 14th row, "Soccer" in the 15th row and "Hockey" in the 16th row which are choices as candidates for an answer to the question are represented by bit strings of "0001," "0010," "0100" and "1000," respectively.

The id element of the question of "ProviderA:ProgramX: 123" in the 19th row is represented by a bit string of "00000100000101." Meanwhile, "Never" in the 21st row, "Occasionally" in the 22nd row and "Frequently" in the 23rd row which are choices as candidates for an answer to the question are represented by bit strings of "001," "010" and "100," respectively.

In this manner, in the PDI-Q indicated in FIG. 56, the id elements of the questions which request answers of the logic value type and the answer selection type and the answers to the questions, that is, the a elements, are represented by a bitmap index.

It is to be noted that the answers to the questions which request answers of the integer value type and the character string type are not selected from among choices as a plurality of, that is, two or more, candidates like answers to questions which request answers of the logic value type and the answer selection type, but are integer values or character strings inputted arbitrarily by the user, and therefore are not represented by a bitmap index. Further, although, according to the syntaxes of FIGS. 54A-54B and 55, id elements of questions which request answers of the integer value type and the character string type can be represented by a bitmap index, it is assumed here that they are not represented by a bitmap index.

Here, the following description is given under the assumption that the questions defined by a PDI-Q are those which request answers of the logic value type and the answer selection type.

Figure 53:
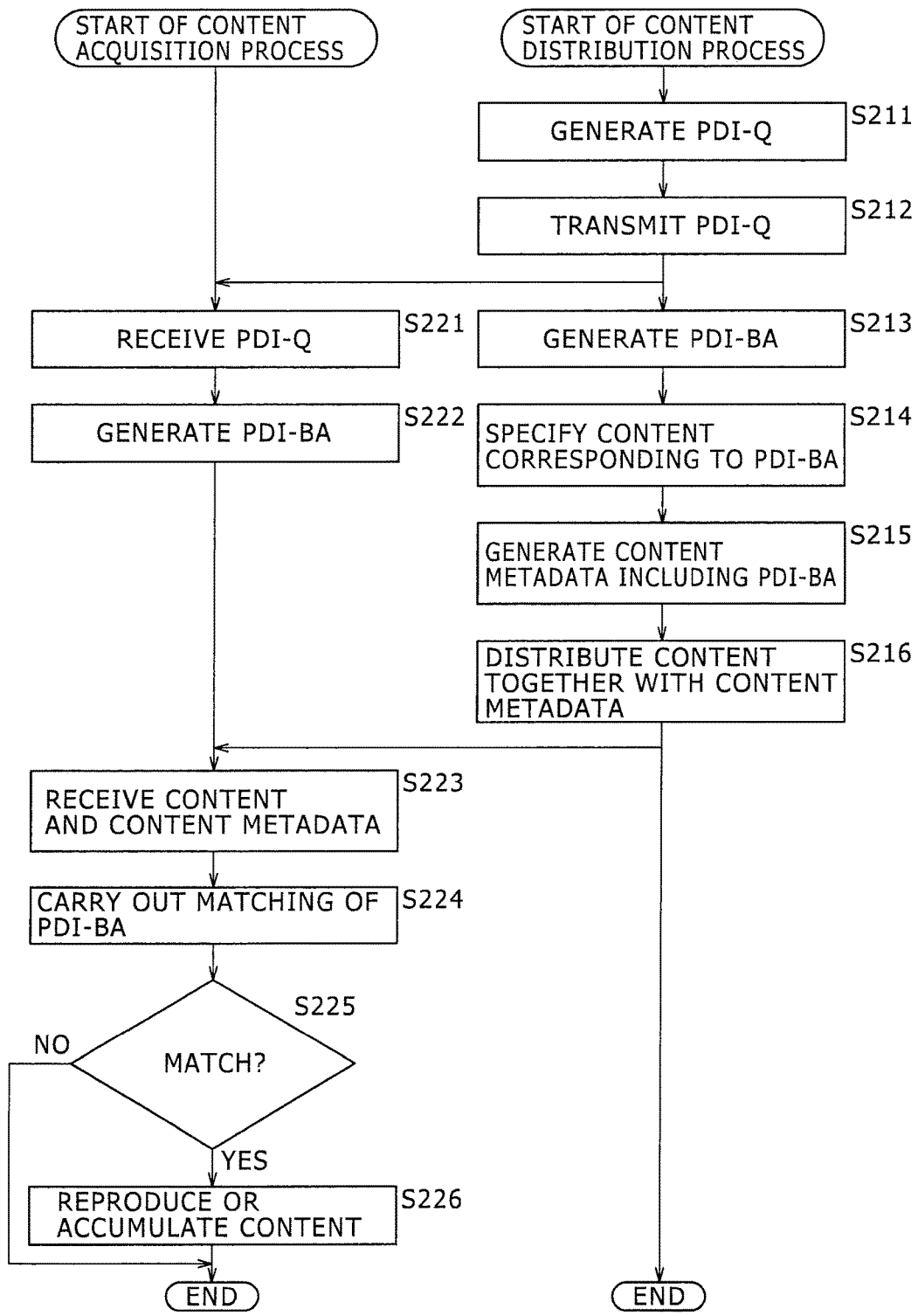
FIG. 53 is a flow chart illustrating content transmission and reception processes of the server of FIG. 51 and the client of FIG. 52.

Referring back to the flow chart of FIG. 53, at step S212, the PDI-Q generator 411 of the server 11 transmits the generated PDI-Q to the client 12 through the transmission section 42 and supplies the PDI-Q to the PDI-BA generator 412.

At step S221, the reception section 51 of client 12 receives the PDI-Q transmitted from the server 11 and supplies the received PDI-Q to the PDI-BA generator 421.

It is to be noted that the PDI-Q may be received by the client 12, for example, every time it is broadcast or transmitted after a predetermined interval of time from a broadcasting station as a provider in which the server 11 is installed. Or, the PDI-Q may be received by the client 12 when the client 12 adjusts the channel to the broadcasting station in which the server 11 is installed.

At step S222, the PDI-BA generator 421 of the client 12 generates a user side PDI-BA to the questions defined in the PDI-Q received by the reception section 51. In particular, when the PDI-Q is received from the server 11, the PDI-BA generator 421 causes the display section not shown to display screen images corresponding to questions defined in the PDI-Q and causes the user or viewer of the client 12 to input or select answers to the questions to generate a user side PDI-BA representative of the answers. In other words, the PDI-BA generator 421 interacts with the user to generate a user side PDI-BA representative of answers to the questions defined in the PDI-Q.

Here, it is assumed that the client 12 receives a PDI-Q in which only questions which request answers of the logical value type and the answer selection type in FIG. 56 and, the screen images shown in FIGS. 8, 10 and 11 are successively displayed as screen images corresponding to the question group defined in the received PDI-Q on the display section not shown of the client 12.

Further, it is assumed that, on the screen image corresponding to the question of "Common:111" described hereinabove with reference to FIG. 8, the selection button 62-1 is selected by the user as an answer to the question. Further, on the screen image corresponding to the question of "ProviderA:123" described hereinabove with reference to FIG. 10, the selection buttons 82-1, 82-2, 82-3 and 82-4 are selected as an answer to the question by the user. Further, on the screen image corresponding to the question of "ProviderA:ProgramX:123" described hereinabove with reference to FIG. 11, the selection button 92-2 is selected as an answer to the question by the user.

At this time, the user side PDI-BA generated by the PDI-BA generator 421 is such as given below:
{"00000000000101":"1"
"00000100000111":"1101"
"00000100000101":"010"}

In the user side PDI-BA described above, the first row indicates an id element of the question of "Common:111" and that "True" is selected as an answer to question.

The second row indicates an id element of the question of "PoviderA:123" and that "Baseball," "Soccer" and "Hockey" are selected as an answer to the question. While the bitmap index notation of the answers is "0001," "0100" and "1000," since a plurality of answers, that is, one to three answers, are permitted by the question of "ProviderA:123," "1101" obtained by OR coupling the bits of the answers is the bitmap index notation of the answer to the question of "ProviderA:123."

The third row indicates an id element of the question of "ProviderA:ProgramX:123" and that "Occasionally" is selected as an answer to the question. Since the question of "ProviderA:ProgramX:123" restricts the number of answers to one, a notation of OR coupling of bits in the bitmap index notation of the candidates for an answer is not used, but "010" representative of "Occasionally" becomes a bitmap index notation of the answer to the question of the "ProviderA:ProgramX:123."

It is to be noted that the values of the bits representative of the answer in the user side PDI-BA are actually mapped on a binary field.

Figure 57:
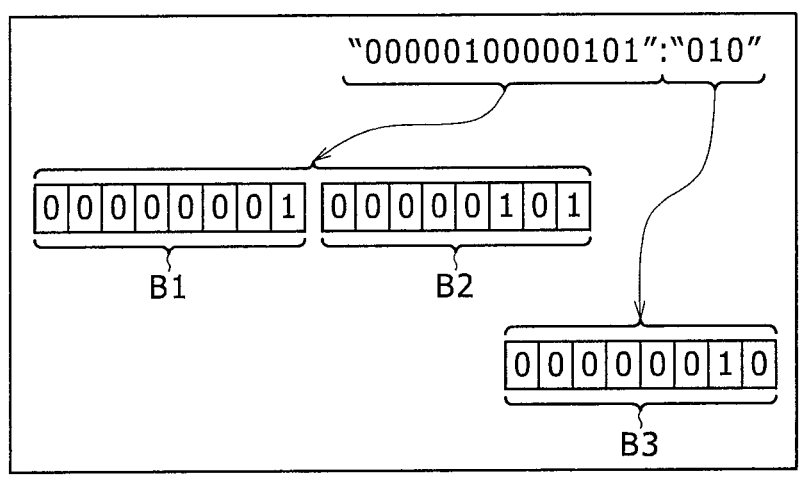
FIG. 57 is a diagrammatic view illustrating an example of mapping of a PDI-BA.

FIG. 57 illustrates an example of an answer in a user side PDI-BA mapped on a binary field.

At a right upper portion of FIG. 57, an id element of the question of "ProviderA:ProgramX:123" and an answer to the question in the user side PDI-BA described hereinabove are indicated. As seen in FIG. 57, the six high order bits of the id element of the question represented in the bitmap index notation are mapped to six low order bits of a bit string B1 of one byte, and eight low order bits of the id element of the question are mapped to bits of a bit string B2 of one byte. Further, the three bits of the answer to the question, that is, the a element, are mapped to three low order bits of a bit string B3 of one byte.

In this manner, an id element of one question in a user side PDI-BA and an answer to the question can be represented by three bytes at the most, and a question and an answer to the question can be specified only by the three bytes.

The PDI-BA generator 421 supplies the user side PDI-BA generated in this manner to the PDI-BA storage section 422 so as to be stored. The user side PDI-BA stored in the PDI-BA storage section 422 is used to decide whether or not a content distributed from the server 11 conforms to the liking of the user of the client 12 as hereinafter described.

Referring back again to the flow chart of FIG. 53, at step S213, the PDI-BA generator 412 of the server 11 generates a provider side PDI-BA to the question defined in the PDI-Q from the PDI-Q generator 411 and supplies the generated provider side PDI-BA to the metadata distributor 413. In particular, when a PDI-Q is generated in response to an operation of staff in the broadcasting station or provider side, the PDI-BA generator 412 causes the display section not shown to display such screen images corresponding to the questions defined in the PDI-Q as described hereinabove with reference to FIGS. 8, 10 and 11. Then, the PDI-BA generator 412 causes the staff of the broadcasting station to input or select answers to questions to generate a provider side PDI-BA representative of the answers. At this time, the staff of the broadcasting station would input or select answers corresponding to a content to be distributed as answers to the questions defined in the PDI-Q. In other words, the provider side PDI-BA generated by the PDI-BA generator 412 represents information or answers for allowing the user or viewer of the client 12 to view a content to be distributed later with the liking of the viewer taken into consideration.

At step S214, the metadata distributor 413 specifies or refers to, based on the provider side PDI-BA from the PDI-BA generator 412, a content corresponding to the PDI-BA from among the contents accumulated in the content accumulation section 45. The content specified here may be a content having a similarity between the answer represented by the provider side PDI-BA from the PDI-BA generator 412 and content metadata applied in advance to the accumulated content higher than a predetermined value or may be a content selected in advance as a content to be viewed by the user by the staff of the broadcasting station. It is to be noted that the content specified by the metadata distributor 413 is acquired from the content accumulation section 45 by the content distributor 46.

At step S215, the metadata distributor 413 newly generates, based on the content metadata applied in advance to the content specified at step S215 and provider side PDI-BA from the PDI-BA generator 412, content metadata including the provider side PDI-BA.

At step S216, the transmission section 42 distributes the content acquired by the content distributor 46 together with the content metadata generated by the metadata distributor 413. At this time, as the content metadata, content metadata prescribed by a standardization organization may be transmitted in addition to the content metadata generated by the metadata distributor 44.

In this manner, a content whose content metadata includes a provider side PDI-BA representative of answers intended by the provider side, or in other words, a content which conforms to the liking of the user and whose viewing is expected by the provider side is distributed as the answers to the questions defined by the PDI-Q.

It is to be noted that the processes at steps S213 to S216 need not be executed immediately after the process at step S212 but may be executed before a PDI-BA is generated by and stored into the client 12 owned by each user.

Further, while the content is distributed together with the content metadata at step S216, the content may not be distributed together with the content metadata, but otherwise, after the content metadata including the PDI-BA is transmitted to the client 12 in advance, the content corresponding to the content metadata may be distributed.

After the content and the content metadata are distributed in this manner, the reception section 51 of client 12 receives the content and the content metadata distributed from the server 11 and supplies the received content and content metadata to the content filter 423 at step S223.

At step S224, the content filter 423 carries out matching between the user side PDI-BA stored in the PDI-BA storage section 422 and the provider side PDI-BA included in the content metadata from the server 11. Example of the Matching Process by the Content Filter Here, it is assumed that the user side PDI-BA described hereinabove is generated and stored as the user side PDI-BA and a provider side PDI-BA given below is transmitted from the server 11 to the client 12.

{"00000100000111":"0001"}

This provider side PDI-BA has a basically same configuration as the user side PDI-BA described hereinabove, and therefore, detailed description thereof is omitted herein to avoid redundancy. However, this provider side PDI-BA indicates that "Baseball" is selected as an answer to the question of "ProviderA:123."

At this time, the content filter 423 compares the user side PDI-BA and the provider side PDI-BA with each other, and if they coincide with each other between the answers thereof to at least one of the questions, the content filter 423 decides that the user side PDI-BA and the provider side PDI-BA match with each other. However, if the user side PDI-BA and the provider side PDI-BA do not coincide with each other between the answers to any question, then the content filter 423 decides that they do not match with each other. In the present instance, since the answer to the question of "ProviderA:123" in the user side PDI-BA described hereinabove and the answer to the question of "ProviderA:123" in the provider side PDI-BA coincide with each other in that both of them include the bits representative of "Baseball," it is decided that the user side PDI-BA and the provider side PDI-BA match with each other.

It is assumed that a PDI-BA given below is transmitted as the provider side PDI-BA subsequently:

{"00000100000111":"0010"
"00000100000101":"001"}

This provider side PDI-BA indicates that "Baseball" is selected as an answer to the question of "ProviderA:123" and "Never" is selected as an answer to the question of "ProviderA:ProgramX:123."

In this instance, since the answer to the question in the user side PDI-BA described above and any answer to the questions in the provider side PDI-BA do not coincide with each other, it is decided that the user side PDI-BA and the provider side PDI-BA do not match with each other.

The content filter 423 carries out the matching process between the user side PDI-BA and the provider side PDI-BA in this manner.

At step S225, the content filter 423 decides whether or not the user side PDI-BA and the provider side PDI-BA match with each other. If it is decided at step S225 that the user side PDI-BA and the provider side PDI-BA match with each other, then the content filter 423 decides that the content distributed from the server 11 conforms to the liking of the user or viewer of the client 12. Then, the content filter 423 supplies the content to the content reproduction section 55 or the content accumulation section 56, and then the processing advances to S226.

In the case where the content distributed from the server 11 is supplied from the content filter 423 to the content reproduction section 55, the content reproduction section 55 reproduces the content at step S226. On the other hand, in the case where the content distributed from the server 11 is supplied from the content filter 423 to the content accumulation section 56, the content accumulation section 56 accumulates or records the content at step S226. The accumulated content is supplied to and reproduced by the content reproduction section 55 suitably in response to an operation instruction of the user.

On the other hand, if it is decided at step S225 that the user side PDI-BA and the provider side PDI-BA do not match with each other, then the content filter 423 decides that the content distributed from the server 11 does not conform to the liking of the user or viewer of the client 12 and abandons or deletes the content. The, the processing is ended.

According to the process described above, on the provider side, a PDI-Q representative of questions regarding the liking of the user is generated by the server. Then, the PDI-Q is transmitted to the client terminal, and the provider side PDI-BA representative of the answers set by the provider side to the PDI-Q distributed as content metadata of the corresponding content. Consequently, content metadata which satisfies needs at the time other than content metadata prescribed by a standardization organization can be applied to a content. On the other hand, on the user side, a user side PDI-BA representative of answers of the user to the PDI-Q from the server is generated, and matching between the thus generated user side PDI-BA and the provider side PDI-BA from the server is carried out to determine whether or not the content distributed from the server should be acquired. Consequently, a content can be filtered with content metadata which satisfies needs at the time other than content metadata prescribed by a standardization organization. Accordingly, a content which satisfies current needs can be acquired.

Meanwhile, in the case where the questions defined in the PDI-Q request answers of the logical value type and the answer selection type, when the client terminal carries out filtering of a content, the user side PDI-BA and the provider side PDI-BA represented by bitmap indices are compared with each other. Therefore, the cost in regard to the CPU load and the memory use amount is lower than that in the case where the user side PDI-A and the provider side PDI-A of text representations are compared with each other. Thus, even if a great amount of contents are distributed at a time, the distributed contents can be filtered efficiently.

It is to be noted that, while, in the foregoing description, the questions defined by the PDI-Q are only questions which request answers of the logic value type and the answer selection type, naturally they may otherwise include questions which request answers of the integer value type or the character string type. In this instance, the PDI-BAs, that is, the user side PDI-BA and provider side PDI-BA, include answers of the text representation as answers to the questions which request answers of the integer value type and the character string type. In particular, to a question whose id element is represented in a bitmap index representation, an answer of the bitmap index representation is generated, but to a question whose id element is not represented in a bitmap index representation, an answer of a text representation such as an integral value or a character string is generated.

Further, the configuration described above wherein an id element of a question and an answer to the question are represented by a bitmap index can be applied also to the broadcasting system of the second embodiment described hereinabove.

In the following, a configuration which uses a PDI-BA in the broadcasting system according to the second embodiment of the present invention described hereinabove is described.

Example of a Different Functional Configuration of the Server

First, an example of a different functional configuration of the server 11 in the broadcasting system 10 wherein metadata is represented by a bitmap index is described with reference to FIG. 58.

Figure 58:
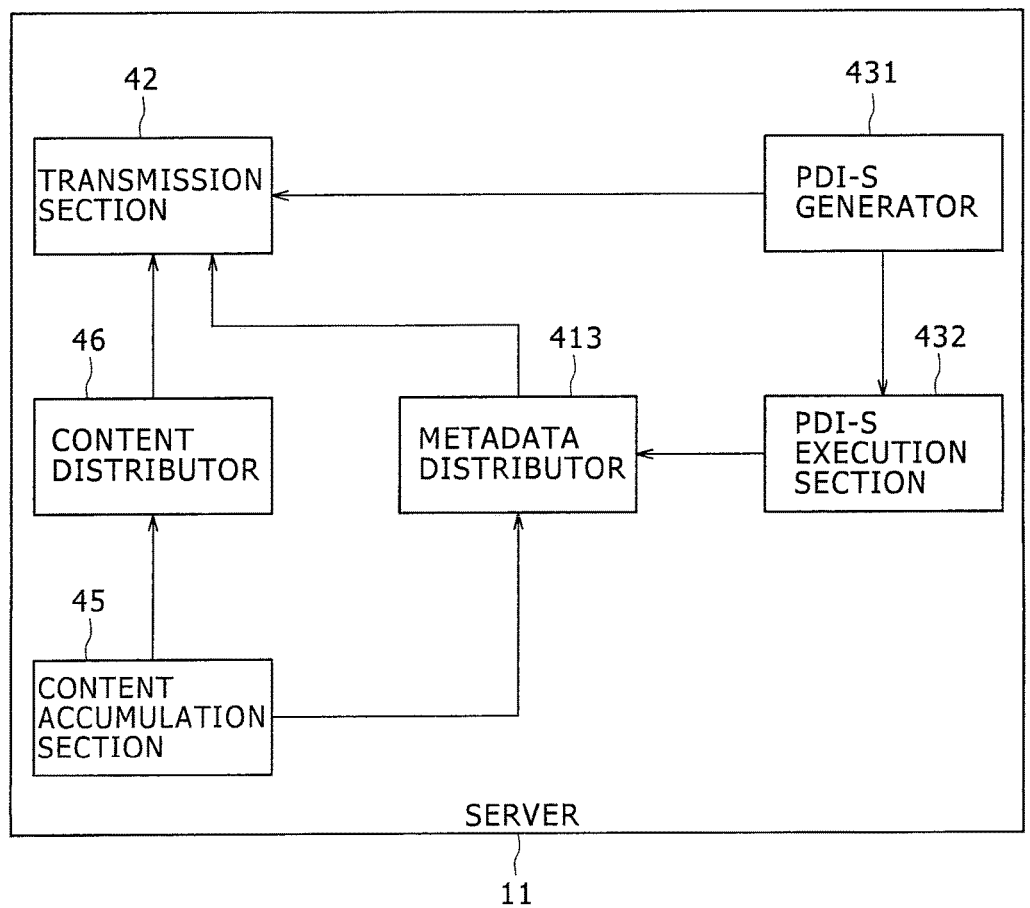
FIG. 58 is a block diagram showing a different example of a functional configuration of a server which is a modification to that of FIG. 51.

The server 11 of FIG. 58 includes a transmission section 42, a content accumulation section 45, a content distributor 46, a metadata distributor 413, a PDI-S generator 431 and a PDI-S execution section 432.

It is to be noted that, in the server 11 of FIG. 58, like elements having like functions to those of the elements provided in the server 11 of FIG. 51 are denoted by like terms and like reference characters and overlapping description of them is suitably omitted herein to avoid redundancy.

In particular, the server 11 of FIG. 58 is different from the server 11 of FIG. 51 in that it includes the PDI-S generator 431 and the PDI-S execution section 432 in place of the PDI-Q generator 411 and the PDI-BA generator 412.

The PDI-S generator 431 generates a PDI-S which is a script for obtaining a user side PDI-BA representative of answers of a user to questions regarding the liking of the user or viewer of the client 12. The PDI-S generator 431 transmits the generated PDI-S to the client 12 through the transmission section 42 and supplies the PDI-S to the PDI-S execution section 432.

The PDI-S execution section 432 executes the PDI-S from the PDI-S generator 431 to generate a provider side PDI-BA representative of answers set by the provider side to the questions regarding the liking of the user of the client 12. Then, the PDI-S execution section 432 supplies the generated provider side PDI-BA to the metadata distributor 413.

Different Example of a Functional Configuration of the Client

Now, a different example of a functional configuration of the client 12 in the broadcasting system 10 wherein metadata is represented by a bitmap index is described with reference to FIG. 59.

Figure 59:
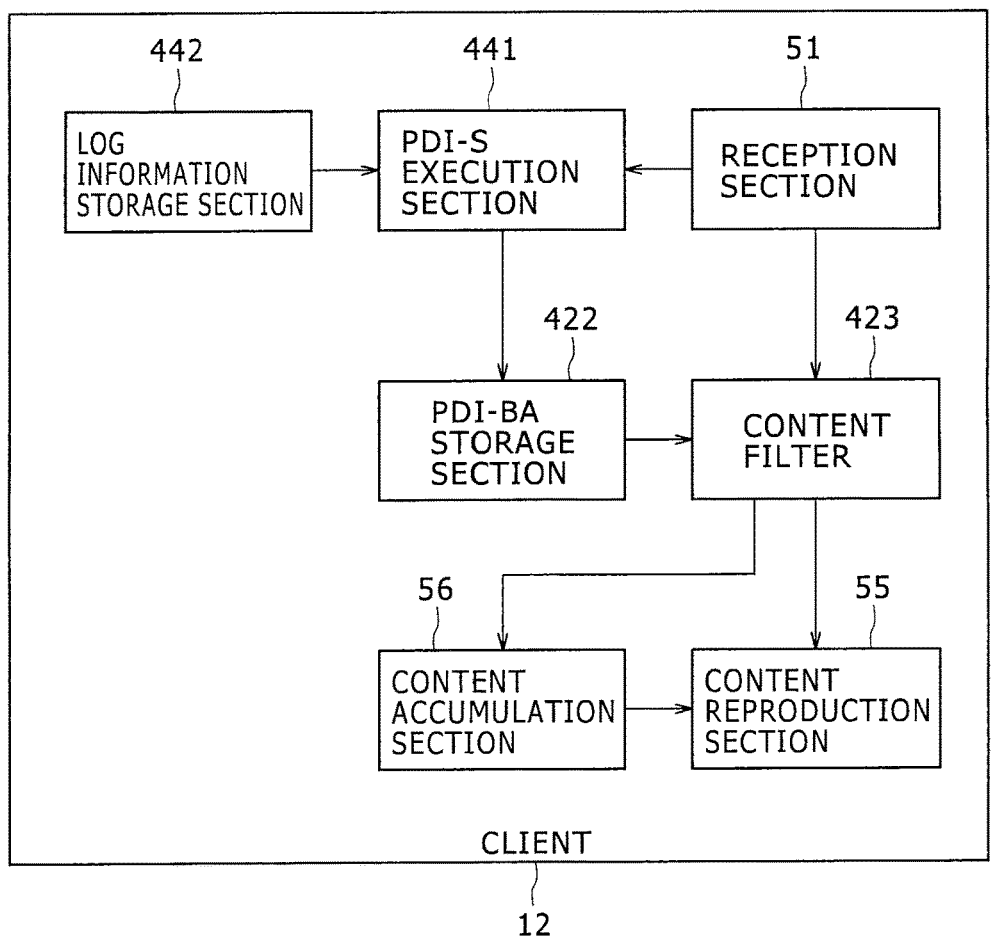
FIG. 59 is a block diagram showing a different example of a functional configuration of a client which is a modification to that of FIG. 52.

The client 12 of FIG. 59 includes a reception section 51, a content reproduction section 55, a content accumulation section 56, a PDI-BA storage section 422, a content filter 423, a PDI-S execution section 441 and a log information storage section 442.

It is to be noted that, in the client 12 of FIG. 59, like elements having like functions to those of the elements provided in the server 12 of FIG. 52 are denoted by like terms and like reference characters and overlapping description of them is suitably omitted herein to avoid redundancy.

In particular, the client 12 of FIG. 59 is different from the client 12 of FIG. 52 in that it includes the PDI-S execution section 441 in place of the PDI-BA generator 421 and additionally includes the log information storage section 442.

The PDI-S execution section 441 executes the PDI-S transmitted from the server 11 to generate a user side PDI-BA representative of answers of the user to the questions regarding the liking of the user of the client 12, and supplies the generated user side PDI-BA to the PDI-BA storage section 422. The PDI-S execution section 441 executes the PDI-S based on log information hereinafter described as occasion demands.

The log information storage section 442 stores log information representative of a behavior log of the user who owns the client 12. The log information stored in the log information storage section 442 is read out by the PDI-S execution section 441 as occasion demands.

Example of the Content Transmission and Reception Processes

Now, content transmission and reception processes and a PDI-S execution process in the broadcasting system 10 configured from the server 11 of FIG. 58 and client 12 of FIG. 59 are described with reference to flow charts of FIGS. 60 and 61.

Figure 60:
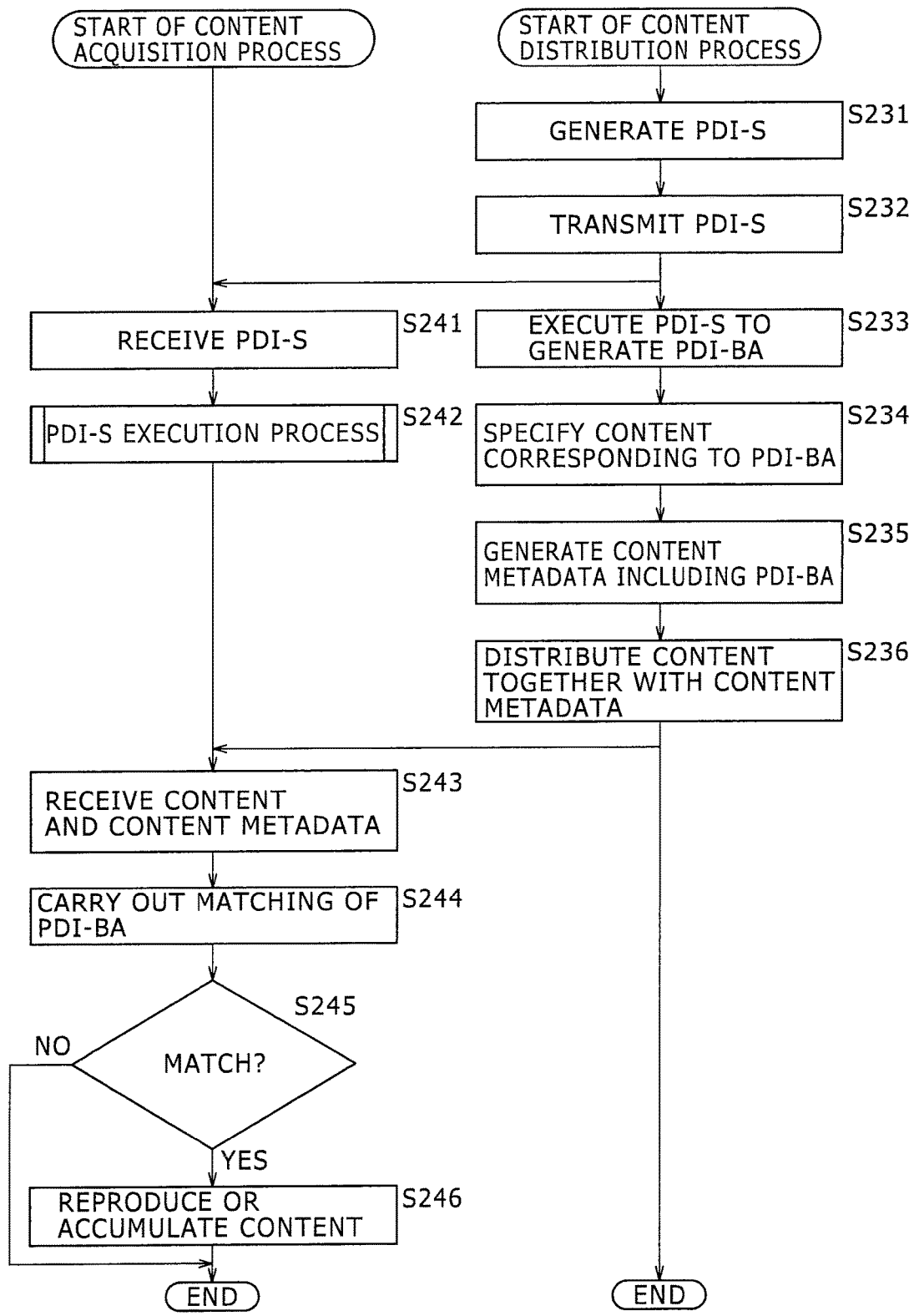
FIG. 60 is a flow chart illustrating content transmission and reception processes of the server of FIG. 58 and the client of FIG. 59.
Figure 61:
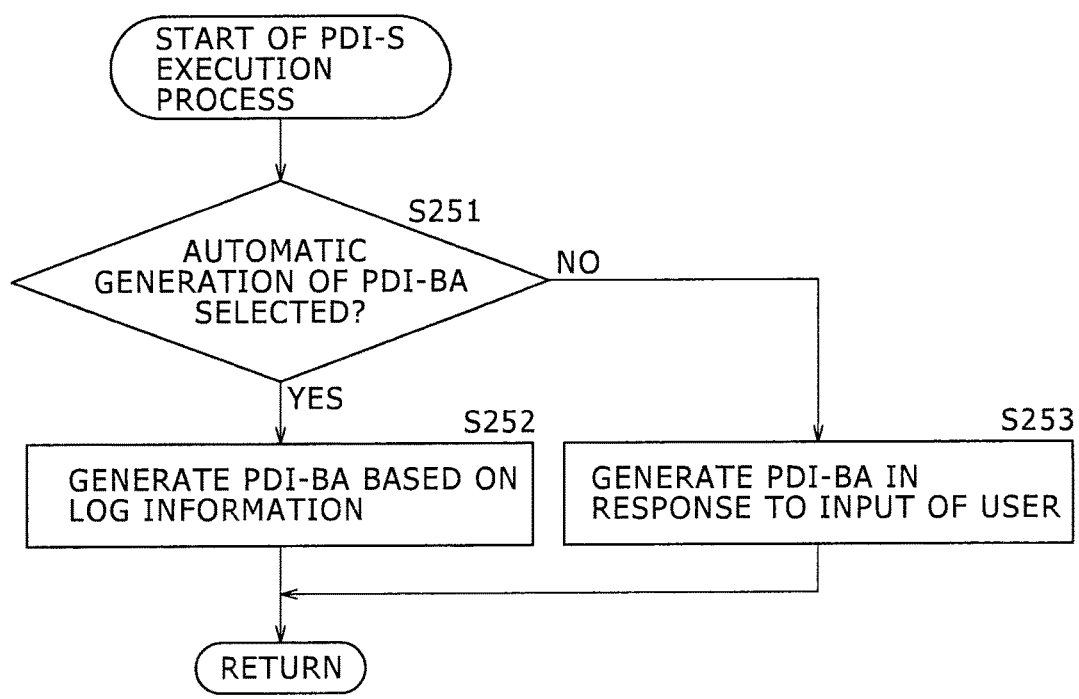
FIG. 61 is a flow chart illustrating details of a PDI-S execution process of FIG. 60.

It is to be noted that the content transmission and reception processes and the PDI-S execution process represented by the flow charts of FIGS. 60 and 61 are basically similar to the content transmission and reception processes and the PDI-S execution process executed by the broadcasting system 10 of the second embodiment described hereinabove and represented by the flow charts of FIGS. 33 and 35 except that a user side PDI-BA and a provider side PDI-BA are generated in place of a user side PDI-A and a provider side PDI-A. Therefore, overlapping description of the content transmission and reception processes and the PDI-S execution process is omitted herein to avoid redundancy. It is to be noted that generation of a user side PDI-BA and a provider side PDI-BA is carried out similarly to generation of a user side PDI-BA and a provider side PDI-BA in the content transmission and reception processes described hereinabove with reference to the flow chart of FIG. 53.

In short, according to the process described above, in the broadcasting system, on the provider side, the server generates a PDI-S for obtaining a user side PDI-BA to questions regarding the liking of the user, and the generated PDI-S is transmitted to the client terminal. Further, a provider side PDI-BA representative of an answer set by the provider side to the PDI-S is distributed as content metadata of a corresponding content. Consequently, content metadata which satisfies needs at the time other than content metadata prescribed by a standardization organization can be applied to a content. On the other hand, on the user side, the client terminal executes the PDI-S from the server to generate a user side PDI-BA and carries out matching between the generated user side PDI-A and the provider side PDI-BA from the server to determine whether or not the content distributed from the server should be acquired. Consequently, a content can be filtered with content metadata which satisfies needs at the time other than content metadata prescribed by a standardization organization. Accordingly, a content which satisfies current needs can be acquired.

Further, in the case where the questions defined by the PDI-S request answers of the logic values and the answer selection type, when a content is filtered on the client terminal, the user side PDI-BA and the provider side PDI-BA represented by bitmap indices are compared with each other. Therefore, the cost in regard to the CPU load and the memory use amount is lower than that in the case where the user side PDI-BA and the provider side PCI-BA of text representations are compared with each other. Thus, even if a great amount of contents are distributed at a time, the distributed contents can be filtered efficiently.

Further, since the client terminal can interact with the user by the PDI-S, even if a question set by provider side has the substance which requires high interactivity, the client terminal can interact sufficiently with the user. Accordingly, since a user side PDI-BA which reflects the liking of the user with a high degree of accuracy can be generated, an accurate filtering condition can be obtained, and consequently, a content which satisfies needs at the time can be acquired with a higher degree of certainty.

Incidentally, also the broadcasting system of the present embodiment described hereinabove can be applied to a broadcasting system which broadcasts by the ATSC-M/H method.

Application Example to a Broadcasting System Which Broadcasts by the ATSC-M/H System In such an instance, the PDI-BA is placed into at least one of the "Service" fragment, "Schedule" fragment and "Content" fragment among the elements which configure the Service Guide shown in FIG. 22 as described hereinabove.

FIG. 62 illustrates details of a configuration of the "Service" fragment. Referring to FIG. 62, a "PDI-BA" element is newly added to the "PrivateExt" element defined on the lowermost stage in the "Service" fragment illustrated in FIG. 62, and the PDI-BA is placed into "PDI-BA" element. More particularly, for example, a bitmap index of the "PDI-BA" element which is represented in bytes as <xs:element name="PDI-BA" type="xs:base64Binary" xmlns:xs="http://www.w3.org/2001/XMLSchema"/> by the XML schema is encoded as base64Binary.

FIG. 63 illustrates details of a configuration of the "Schedule" fragment. Referring to FIG. 63, a "PDI-BA" element is newly added to the "PrivateExt" element defined on the lowermost stage in the "Schedule" fragment illustrated in FIG. 63, and the PDI-BA is placed into "PDI-BA" element. More particularly, for example, a bitmap index of the "PDI-BA" element which is represented in bytes as <xs:element name="PDI-BA" type="xs:base64Binary" xmlns:xs="http://www.w3.org/2001/XMLSchema"/> by the XML schema is encoded as base64Binary.

FIG. 64 illustrates details of a configuration of "Content" fragment. Referring to FIG. 64, a "PDI-BA" element is newly added to the "PrivateExt" element defined on the lowermost stage in the "Content" fragment illustrated in FIG. 64, and the PDI-BA is placed into the "PDI-BA" element. More particularly, for example, a bitmap index of the "PDI-BA" element which is represented in bytes as <xs:element name="PDI-BA" type="xs:base64Binary" xmlns:xs="http://www.w3.org/2001/XMLSchema"/> by the XML schema is encoded as base64Binary.

It is to be noted that the PDI-Q or PDI-S is placed into the "Interactivity Data" fragment from among the elements which configure the Service Guide illustrated in FIG. 22 as described hereinabove.

Further, the broadcasting system of the present embodiment can be applied also to a broadcasting system which carries out NRT broadcasting.

Application Example of a Broadcasting System Which Carries Out NRT Broadcasting

In such a case, the PDI-BA, that is, the provider side PDI-BA, transmitted from the server 11 to the client 12 in the broadcasting system 10 described above is placed into and transmitted together with "PDI descriptor" newly prescribed in SMT or NRT-IT (FIG. 29).

FIG. 65 illustrates an example of the syntax of "PDI descriptor." In FIG. 65, each of the descriptors described is defined together with a bit number (No. of bits) and a format (Format).

According to the syntax illustrated in FIG. 65, the PDI-BA is described in the descriptor "PDI-BA" of variable bits.

It is to be noted that naturally the broadcasting system of the present embodiment can be applied to a broadcasting system which broadcasts by the ATSC-M/H system described hereinabove or a broadcasting system which carries out NRT broadcasting by a method other than an existing broadcasting system.

While the series of processes described above can be executed by hardware, it may otherwise be executed by software. In the case where the series of processes is executed by software, a program which constructs the software is installed from a program recording medium into a computer incorporated in hardware for exclusive use or, for example, a personal computer for universal use which can execute various functions by installing various programs.

The program recording medium in which a program which is installed in a computer and can be placed into a state in which it can be executed by the computer is stored is configured from, as seen in FIG. 2, a removable medium 31 which is a package medium formed from a magnetic disk (including a flexible disk), an optical disk (including a CD-ROM (Compact Disc-Read Only Memory), a DVD (Digital Versatile Disc) and an optical magnetic disc) or a semiconductor memory, the ROM 22 in which the program is stored temporarily or permanently or a hard disk or the like which configures the storage section 28. Storage of the program into the program recording medium is carried out through a wire or wireless communication medium such as a local area network, the Internet or a digital satellite broadcast through the communication section 29 which is an interface of a router, a modem or the like as occasion demands.

It is to be noted that, in the present specification, the steps which describe the program may be but need not necessarily be processed in a time series in the order as described, and include processes which are executed in parallel or individually without being processed in a time series.

Further, in the present specification, the term "system" is used to represent an entire apparatus composed of a plurality of apparatus.

While preferred embodiments of the present invention have been described using specific terms, such description is for illustrative purpose only, and it is to be understood that changes and variations may be made without departing from the spirit or scope of the following claims.

What is claimed is:

1. A reception apparatus, comprising:
   circuitry configured to:
   receive a digital broadcast signal, the digital broadcast signal including a question, a content, and an index associated with the content, the index being representative of an answer to the question as set by a provider of the content,
   extract the question from the received digital broadcast signal,
   generate a user answer index based on a user input responsive to the question,
   extract the index associated with the content from the received digital broadcast signal,
   determine whether the user answer index and the index associated with the content match, and
   store or output for display the content included in the digital broadcast signal based on whether the user answer index and the index associated with the content are determined to match.

2. The reception apparatus of claim 1, wherein the circuitry is configured to receive the question separately from the content and the index associated with the content.

3. The reception apparatus of claim 1, wherein the index associated with the content is received as metadata of the content.

4. The reception apparatus of claim 1, wherein the digital broadcast signal is a digital television broadcast signal and the circuitry comprises a digital television tuner configured to receive the digital broadcast signal.

5. A method of a reception apparatus for processing content, the method comprising:
   receiving a digital broadcast signal, the digital broadcast signal including a question, a content, and an index associated with the content, the index being representative of an answer to the question as set by a provider of the content;
   extracting the question from the received digital broadcast signal;
   generating a user answer index based on a user input responsive to the question;
   extracting the index associated with the content from the received digital broadcast signal;
   determining, by circuitry of the reception apparatus, whether the user answer index and the index associated with the content match; and
   storing or outputting for display, by the circuitry, the content included in the digital broadcast signal based on whether the user answer index and the index associated with the content are determined to match.

6. The method of claim 5, wherein the question is received separately from the content and the index associated with the content.

7. The method of claim 5, wherein the index associated with the content is received as metadata of the content.

8. The method of claim 5, wherein the receiving includes receiving, by a digital television tuner of the reception apparatus, a digital television broadcast signal.

9. A non-transitory computer-readable medium storing instructions which when executed by a computer cause the computer to perform a method for processing content, the method comprising:
   receiving a digital broadcast signal, the digital broadcast signal including a question, a content, and an index associated with the content, the index being representative of an answer to the question as set by a provider of the content;
   extracting the question from the received digital broadcast signal;
   generating a user answer index based on a user input responsive to the question;
   extracting the index associated with the content from the received digital broadcast signal;
   determining whether the user answer index and the index associated with the content match; and
   storing or outputting for display the content included in the digital broadcast signal based on whether the user answer index and the index associated with the content are determined to match.

10. The non-transitory computer-readable medium of claim 9, wherein the question is received separately from the content and the index associated with the content.

11. The non-transitory computer-readable medium of claim 9, wherein the index associated with the content is received as metadata of the content.

12. The non-transitory computer-readable medium of claim 9, wherein the receiving comprises causing a digital television tuner to receive a digital television broadcast signal.

* * * * *